US011224056B2

(12) United States Patent
Chakraborty et al.

(10) Patent No.: US 11,224,056 B2
(45) Date of Patent: Jan. 11, 2022

(54) CODE BLOCK GROUP-BASED AUTONOMOUS UPLINK TRANSMISSION

(71) Applicant: QUALCOMM Incorporated, San Diego, CA (US)

(72) Inventors: Kaushik Chakraborty, San Diego, CA (US); Xiaoxia Zhang, San Diego, CA (US); Jing Sun, San Diego, CA (US); Qingjiang Tian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 25 days.

(21) Appl. No.: 16/405,320

(22) Filed: May 7, 2019

(65) Prior Publication Data

US 2019/0349965 A1 Nov. 14, 2019

Related U.S. Application Data

(60) Provisional application No. 62/669,279, filed on May 9, 2018.

(51) Int. Cl.
*H04W 72/04* (2009.01)
*H04W 72/12* (2009.01)
(Continued)

(52) U.S. Cl.
CPC ....... *H04W 72/1268* (2013.01); *H04L 1/1614* (2013.01); *H04L 1/1812* (2013.01);
(Continued)

(58) Field of Classification Search
CPC ... H04L 1/0083; H04L 1/1614; H04L 1/1812; H04L 1/1854; H04L 5/0007;
(Continued)

(56) References Cited

U.S. PATENT DOCUMENTS

2006/0034274 A1 2/2006 Kakani et al.
2018/0317213 A1* 11/2018 Islam .................... H04L 1/1822
(Continued)

FOREIGN PATENT DOCUMENTS

WO WO-2020034533 A1 * 2/2020 ........... H04L 1/1614

OTHER PUBLICATIONS

Ericsson: "Physical layer procedures for NR unlicensed operation", 3GPP Draft; R1-1805011 Physical Layer Procedures for NR Unlicensed Operation, 3rd Generation Partnership Project (3GPP), Mobile Competence Centre ; 650, Route Des Lucioles ; F-06921 Sophia-Antipolis C, vol. RAN WG1, No. Sanya, China; Apr. 16, 2018-Apr. 20, 2018, Apr. 15, 2018 (Apr. 15, 2018), XP051427272, 5 pages, Retrieved from the Internet: URL:http://www.3gpp.org/ftp/Meetings%5F3GPP%5FSYNC/RAN1/Docs/ [retrieved on Apr. 15, 2018], pp. 1-4.

(Continued)

*Primary Examiner* — Phuc H Tran
(74) *Attorney, Agent, or Firm* — Holland & Hart LLP

(57) ABSTRACT

Methods, systems, and devices for wireless communications are described. A user equipment (UE) may transmit, via an autonomous uplink communication, one or more transport blocks to a base station. Each transport block may include a plurality of code block groups (CBGs). The base station may provide CBG-level feedback to the UE based at least in part on the autonomous uplink communication. In some examples, the base station may provide the CBG-level feedback in one or more downlink feedback information (DFI) packets. In some other examples, the base station may provide the CBG-level feedback via one or more uplink transmission grants. The UE may retransmit one or more CBGs from the autonomous uplink communication based at least in part on the DFI packets or uplink transmission grants.

23 Claims, 26 Drawing Sheets

(51) Int. Cl.

| | |
|---|---|
| ***H04W 16/14*** | (2009.01) |
| ***H04L 5/00*** | (2006.01) |
| ***H04L 1/16*** | (2006.01) |
| ***H04W 28/04*** | (2009.01) |
| ***H04L 1/18*** | (2006.01) |

(52) U.S. Cl.
CPC ........... *H04L 5/0007* (2013.01); *H04W 16/14* (2013.01); *H04W 28/04* (2013.01); *H04W 72/1284* (2013.01)

(58) Field of Classification Search
CPC .... H04L 5/0053; H04L 5/0055; H04W 16/14; H04W 28/04; H04W 72/1268; H04W 72/1284
See application file for complete search history.

(56) References Cited

U.S. PATENT DOCUMENTS

| | | | | |
|---|---|---|---|---|
| 2019/0268912 | A1* | 8/2019 | Myung | H04W 72/0413 |
| 2020/0162202 | A1* | 5/2020 | Goktepe | H04L 1/1671 |
| 2020/0221310 | A1* | 7/2020 | Babaei | H04L 1/1671 |
| 2020/0266922 | A1* | 8/2020 | Zhang | H04L 5/0042 |
| 2020/0396034 | A1* | 12/2020 | Chou | H04L 1/1864 |
| 2021/0006352 | A1* | 1/2021 | Marinier | H04L 1/004 |

OTHER PUBLICATIONS

Huawei et al., "Remaining issues for AUL HARQ operation", 3GPP Draft; R1-1719499, 3rd Generation Partnership Project (3GPP), Mobile Competence Centre ; 650, Route Des Lucioles ; F-06921 Sophia-Antipolis Cedex; France, vol. RAN WG1, No. Reno, USA; Nov. 27, 2017-Dec. 1, 2017, Nov. 17, 2017 (Nov. 17, 2017), XP051368807, 5 Pages, Retrieved from the Internet: URL:http://www.3gpp.org/ftp/tsg%5Fran/WG1%5FRL1/TSGR1%5F91/Docs/ [retrieved on Nov. 17, 2017], pp. 3-4.

Intel Corporation: "Remaining Details for HARQ for Autonomous Uplink Transmissions", 3GPP Draft; R1-1802361 Remaining Details for HARQ for Autonomous Uplink Transmissions, 3rd Generation Partnership Project (3GPP), Mobile Competence Centre ; 650, Route Des Lucioles ; F-06921 Sophia-An, vol. RAN WG1, No. Athens, Greece; Feb. 26, 2018-Mar. 2, 2018, Feb. 17, 2018 (Feb. 17, 2018), XP051397886, 9 Pages, Retrieved from the Internet: URL:http://www.3gpp.org/ftp/tsg%5Fran/WG1%5FRL1/TSGR1%5F92/Docs/ [retrieved on Feb. 17, 2018], pp. 1-3.

Partial International Search Report—PCT/US2019/031353—ISA/EPO—dated Aug. 14, 2019.

International Search Report and Written Opinion—PCT/US2019/031353—ISA/EPO—dated Oct. 16, 2019.

* cited by examiner

Padding
0
CBG ACK/NACK for HARQ ID C
1
CBG ACK/NACK for HARQ ID B
1
1
0
0
1
A
B
C
D
405
410
415
420
425
430
435
440
445
450
400

CODE BLOCK GROUP-BASED AUTONOMOUS UPLINK TRANSMISSION

CROSS REFERENCE

The present Application for Patent claims the benefit of U.S. Provisional Patent Application No. 62/669,279 by Chakraborty, et al., entitled "CODE BLOCK GROUP-BASED AUTONOMOUS UPLINK TRANSMISSION," filed May 9, 2018, assigned to the assignee hereof, and expressly incorporated by reference herein.

BACKGROUND

The following relates generally to wireless communications, and more specifically to code block group-based autonomous uplink transmission.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

In some examples, a UE may transmit information to a base station over one or more uplink (UL) channels, and may receive information from the base station over one or more downlink (DL) channels. In some examples, the UE may transmit in response to an uplink transmission grant sent from the base station that identifies resources the UE may use for transmission. In other examples, the UE may also transmit in an autonomous mode, e.g., without receiving an uplink transmission grant identifying specific resources that are reserved for use by the UE.

SUMMARY

The described techniques relate to improved methods, systems, devices, and apparatuses that support code block group-based autonomous uplink transmission. A user equipment (UE) may transmit, via an autonomous uplink communication, one or more transport blocks to a base station. Each transport block may include a plurality of code block groups (CBGs). The base station may provide CBG-level feedback to the UE based at least in part on the autonomous uplink communication. In some examples, the base station may provide the CBG-level feedback in one or more downlink feedback information (DFI) packets. In some other examples, the base station may provide the CBG-level feedback via one or more uplink transmission grants. The UE may retransmit one or more CBGs from the autonomous uplink communication based at least in part on the DFI packets or uplink transmission grants.

A method of wireless communication is described. The method may include transmitting, by a UE, one or more transport blocks via an autonomous uplink communication, each of the one or more transport blocks including a set of code block groups (CBGs), receiving one or more downlink feedback information (DFI) packets, at least one of the one or more DFI packets including CBG-level feedback for at least one of the one or more transport blocks and being a same size as a DFI packet that does not include CBG-level feedback, and re-transmitting CBGs for which negative feedback is indicated based on the one or more DFI packets.

An apparatus for wireless communication is described. The apparatus may include a processor, memory coupled with the processor, and instructions stored in the memory. The instructions may be executable by the processor to cause the apparatus to transmit, by a UE, one or more transport blocks via an autonomous uplink communication, each of the one or more transport blocks including a set of code block groups (CBGs), receive one or more downlink feedback information (DFI) packets, at least one of the one or more DFI packets including CBG-level feedback for at least one of the one or more transport blocks and being a same size as a DFI packet that does not include CBG-level feedback, and re-transmit CBGs for which negative feedback is indicated based on the one or more DFI packets.

Another apparatus for wireless communication is described. The apparatus may include means for transmitting, by a UE, one or more transport blocks via an autonomous uplink communication, each of the one or more transport blocks including a set of code block groups (CBGs), receiving one or more downlink feedback information (DFI) packets, at least one of the one or more DFI packets including CBG-level feedback for at least one of the one or more transport blocks and being a same size as a DFI packet that does not include CBG-level feedback, and re-transmitting CBGs for which negative feedback is indicated based on the one or more DFI packets.

A non-transitory computer-readable medium storing code for wireless communication is described. The code may include instructions executable by a processor to transmit, by a UE, one or more transport blocks via an autonomous uplink communication, each of the one or more transport blocks including a set of code block groups (CBGs), receive one or more downlink feedback information (DFI) packets, at least one of the one or more DFI packets including CBG-level feedback for at least one of the one or more transport blocks and being a same size as a DFI packet that does not include CBG-level feedback, and re-transmit CBGs for which negative feedback is indicated based on the one or more DFI packets.

In some examples of the method, apparatuses, and non-transitory computer-readable medium described herein, receiving the one or more DFI packets may include operations, features, means, or instructions for receiving a transport block-level feedback indicator for each of the one or more transport blocks.

In some examples of the method, apparatuses, and non-transitory computer-readable medium described herein, at least one of the transport block-level feedback indicators indicates a negative acknowledgement for a corresponding transport block, and where receiving the one or more DFI packets further may include operations, features, means, or instructions for receiving CBG-level feedback for the corresponding transport block.

In some examples of the method, apparatuses, and non-transitory computer-readable medium described herein, receiving the one or more DFI packets may include operations, features, means, or instructions for receiving a first DFI packet, the first DFI packet including a first portion of the CBG-level feedback and an indication that a second DFI packet may be to be transmitted and receiving the second DFI packet including a second portion of the CBG-level feedback.

Some examples of the method, apparatuses, and non-transitory computer-readable medium described herein may further include operations, features, means, or instructions for receiving the first DFI packet in a first symbol in a first slot and receiving the second DFI packet in a second symbol in the first slot.

Some examples of the method, apparatuses, and non-transitory computer-readable medium described herein may further include operations, features, means, or instructions for receiving the first DFI packet in a first slot and receiving the second DFI packet in a second slot.

In some examples of the method, apparatuses, and non-transitory computer-readable medium described herein, the first portion of CBG-level feedback includes CBG-level feedback for a first portion of the one or more transport blocks, while the second portion of CBG-level feedback includes CBG-level feedback for a second portion of the one or more transport blocks.

In some examples of the method, apparatuses, and non-transitory computer-readable medium described herein, the second DFI packet may be received a pre-specified time period after the first DFI packet.

Some examples of the method, apparatuses, and non-transitory computer-readable medium described herein may further include operations, features, means, or instructions for transmitting uplink control information, the uplink control information including an indication of CBGs for retransmission.

In some examples of the method, apparatuses, and non-transitory computer-readable medium described herein, the indication of CBGs for retransmission includes a CBG bitmap identifying CBGs to be retransmitted.

In some examples of the method, apparatuses, and non-transitory computer-readable medium described herein, the indication of CBGs for retransmission includes an indication of a retransmission mode.

In some examples of the method, apparatuses, and non-transitory computer-readable medium described herein, the indication of a retransmission mode indicates whether the UE will re-transmit negative acknowledge transport blocks or negative acknowledgement CBGs.

A method of wireless communication is described. The method may include receiving, by a base station, one or more transport blocks via an autonomous uplink communication, each of the one or more transport blocks including a set of code block groups (CBGs), transmitting one or more downlink feedback information (DFI) packets, at least one of the one or more DFI packets including CBG-level feedback for at least one of the one or more transport blocks and being a same size as a DFI packet that does not include CBG-level feedback, and receiving re-transmissions of CBGs for which negative feedback is indicated.

An apparatus for wireless communication is described. The apparatus may include a processor, memory coupled with the processor, and instructions stored in the memory. The instructions may be executable by the processor to cause the apparatus to receive, by a base station, one or more transport blocks via an autonomous uplink communication, each of the one or more transport blocks including a set of code block groups (CBGs), transmit one or more downlink feedback information (DFI) packets, at least one of the one or more DFI packets including CBG-level feedback for at least one of the one or more transport blocks and being a same size as a DFI packet that does not include CBG-level feedback, and receive re-transmissions of CBGs for which negative feedback is indicated.

Another apparatus for wireless communication is described. The apparatus may include means for receiving, by a base station, one or more transport blocks via an autonomous uplink communication, each of the one or more transport blocks including a set of code block groups (CBGs), transmitting one or more downlink feedback information (DFI) packets, at least one of the one or more DFI packets including CBG-level feedback for at least one of the one or more transport blocks and being a same size as a DFI packet that does not include CBG-level feedback, and receiving re-transmissions of CBGs for which negative feedback is indicated.

A non-transitory computer-readable medium storing code for wireless communication is described. The code may include instructions executable by a processor to receive, by a base station, one or more transport blocks via an autonomous uplink communication, each of the one or more transport blocks including a set of code block groups (CBGs), transmit one or more downlink feedback information (DFI) packets, at least one of the one or more DFI packets including CBG-level feedback for at least one of the one or more transport blocks and being a same size as a DFI packet that does not include CBG-level feedback, and receive re-transmissions of CBGs for which negative feedback is indicated.

In some examples of the method, apparatuses, and non-transitory computer-readable medium described herein, transmitting the one or more DFI packets may include operations, features, means, or instructions for transmitting a transport block-level feedback indicator for each of the one or more transport blocks.

In some examples of the method, apparatuses, and non-transitory computer-readable medium described herein, at least one of the transport block-level feedback indicators indicates a negative acknowledgement for a corresponding transport block, and where transmitting the one or more DFI packets further may include operations, features, means, or instructions for transmitting a CBG-level feedback indicator for the corresponding transport block.

In some examples of the method, apparatuses, and non-transitory computer-readable medium described herein, transmitting the one or more DFI packets may include operations, features, means, or instructions for transmitting a first DFI packet, the first DFI packet including a first portion of the CBG-level feedback and an indication that a second DFI packet may be to be transmitted and transmitting the second DFI packet including a second portion of the CBG-level feedback.

Some examples of the method, apparatuses, and non-transitory computer-readable medium described herein may further include operations, features, means, or instructions for transmitting the first DFI packet in a first symbol in a first slot and transmitting the second DFI packet in a second symbol in the first slot.

Some examples of the method, apparatuses, and non-transitory computer-readable medium described herein may further include operations, features, means, or instructions for transmitting the first DFI packet in a first slot and transmitting the second DFI packet in a second slot.

In some examples of the method, apparatuses, and non-transitory computer-readable medium described herein, the first portion of CBG-level feedback includes CBG-level feedback for a first portion of the one or more transport blocks, and the second portion of CBG-level feedback includes CBG-level feedback for a second portion of the one or more transport blocks.

Some examples of the method, apparatuses, and non-transitory computer-readable medium described herein may further include operations, features, means, or instructions for transmitting the second DFI packet a pre-specified time period after the first DFI packet.

Some examples of the method, apparatuses, and non-transitory computer-readable medium described herein may further include operations, features, means, or instructions for receiving uplink control information, the uplink control information including an indication of CBGs for retransmission.

In some examples of the method, apparatuses, and non-transitory computer-readable medium described herein, the indication of CBGs for retransmission includes a CBG bitmap identifying CBGs to be retransmitted.

In some examples of the method, apparatuses, and non-transitory computer-readable medium described herein, the indication of CBGs for retransmission includes an indication of a retransmission mode.

In some examples of the method, apparatuses, and non-transitory computer-readable medium described herein, the indication of a retransmission mode indicates whether the UE will re-transmit negative acknowledge transport blocks or negative acknowledgement CBGs.

Some examples of the method, apparatuses, and non-transitory computer-readable medium described herein may further include operations, features, means, or instructions for generating the one or more DFI packets based on an autonomous CBG configuration.

In some examples of the method, apparatuses, and non-transitory computer-readable medium described herein, the autonomous CBG configuration includes a same number of CBGs as may be included in a CBG configuration for a scheduled uplink transmission.

In some examples of the method, apparatuses, and non-transitory computer-readable medium described herein, the autonomous CBG configuration includes a number of CBGs that may be independent of a number of CBGs included in a CBG configuration for a scheduled uplink transmission.

In some examples of the method, apparatuses, and non-transitory computer-readable medium described herein, the number of CBGs included in the autonomous CBG configuration may be less than the number of CBGs included in the CBG configuration for the scheduled uplink transmission.

A method of wireless communication is described. The method may include receiving, by a base station, one or more transport blocks via an autonomous uplink communication, each of the one or more transport blocks including a set of code block groups (CBGs), transmitting feedback information, the feedback information including transport block-level feedback for at least one of the one or more transport blocks, determining to implement CBG-based retransmission of the one or more transport blocks, and transmitting an uplink transmission grant based on the determining.

An apparatus for wireless communication is described. The apparatus may include a processor, memory coupled with the processor, and instructions stored in the memory. The instructions may be executable by the processor to cause the apparatus to receive, by a base station, one or more transport blocks via an autonomous uplink communication, each of the one or more transport blocks including a set of code block groups (CBGs), transmit feedback information, the feedback information including transport block-level feedback for at least one of the one or more transport blocks, determine to implement CBG-based retransmission of the one or more transport blocks, and transmit an uplink transmission grant based on the determining.

Another apparatus for wireless communication is described. The apparatus may include means for receiving, by a base station, one or more transport blocks via an autonomous uplink communication, each of the one or more transport blocks including a set of code block groups (CBGs), transmitting feedback information, the feedback information including transport block-level feedback for at least one of the one or more transport blocks, determining to implement CBG-based retransmission of the one or more transport blocks, and transmitting an uplink transmission grant based on the determining.

A non-transitory computer-readable medium storing code for wireless communication is described. The code may include instructions executable by a processor to receive, by a base station, one or more transport blocks via an autonomous uplink communication, each of the one or more transport blocks including a set of code block groups (CBGs), transmit feedback information, the feedback information including transport block-level feedback for at least one of the one or more transport blocks, determine to implement CBG-based retransmission of the one or more transport blocks, and transmit an uplink transmission grant based on the determining.

In some examples of the method, apparatuses, and non-transitory computer-readable medium described herein, the uplink transmission grant includes an indication of at least one of the one or more transport blocks to be retransmitted.

Some examples of the method, apparatuses, and non-transitory computer-readable medium described herein may further include operations, features, means, or instructions for receiving a retransmission of at least one transport block of the one or more transport blocks based on the uplink transmission grant and transmitting a second uplink transmission grant, the second transmission grant including CBG-level feedback for the at least one transport block.

A method of wireless communication is described. The method may include receiving, by a base station, one or more transport blocks via an autonomous uplink communication, each of the one or more transport blocks including a set of code block groups (CBGs), selecting a CBG-level retransmission mode from at least two candidate CBG-level retransmission modes, and transmitting feedback information based on the selected CBG-level retransmission mode.

An apparatus for wireless communication is described. The apparatus may include a processor, memory coupled with the processor, and instructions stored in the memory. The instructions may be executable by the processor to cause the apparatus to receive, by a base station, one or more transport blocks via an autonomous uplink communication, each of the one or more transport blocks including a set of code block groups (CBGs), select a CBG-level retransmission mode from at least two candidate CBG-level retransmission modes, and transmit feedback information based on the selected CBG-level retransmission mode.

Another apparatus for wireless communication is described. The apparatus may include means for receiving, by a base station, one or more transport blocks via an autonomous uplink communication, each of the one or more transport blocks including a set of code block groups (CBGs), selecting a CBG-level retransmission mode from at least two candidate CBG-level retransmission modes, and transmitting feedback information based on the selected CBG-level retransmission mode.

A non-transitory computer-readable medium storing code for wireless communication is described. The code may include instructions executable by a processor to receive, by a base station, one or more transport blocks via an autonomous uplink communication, each of the one or more transport blocks including a set of code block groups (CBGs), select a CBG-level retransmission mode from at least two candidate CBG-level retransmission modes, and transmit feedback information based on the selected CBG-level retransmission mode.

In some examples of the method, apparatuses, and non-transitory computer-readable medium described herein, a first candidate CBG-level retransmission mode where the feedback information includes CBG-level feedback for at least one of the one or more transport blocks and a second candidate CBG-level retransmission mode where the feedback information includes a scheduled uplink grant.

In some examples of the method, apparatuses, and non-transitory computer-readable medium described herein, selecting the CBG-level retransmission mode may include operations, features, means, or instructions for selecting the first candidate CBG-level retransmission mode.

In some examples of the method, apparatuses, and non-transitory computer-readable medium described herein, transmitting the feedback information may include operations, features, means, or instructions for transmitting a transport block-level feedback indicator for each of the one or more transport blocks, where at least one of the transport block-level feedback indicators indicates a negative acknowledgement for a corresponding transport block and transmitting a CBG-level feedback indicator for the corresponding transport block.

Some examples of the method, apparatuses, and non-transitory computer-readable medium described herein may further include operations, features, means, or instructions for transmitting the first feedback information message in a first symbol in a first slot and transmitting the second feedback information message in a second symbol in the first slot.

Some examples of the method, apparatuses, and non-transitory computer-readable medium described herein may further include operations, features, means, or instructions for transmitting the first feedback information message in a first slot and transmitting the second feedback information message in a second slot.

In some examples of the method, apparatuses, and non-transitory computer-readable medium described herein, transmitting the feedback information may include operations, features, means, or instructions for transmitting the scheduled uplink grant based on determining to implement CBG-based retransmission.

In some examples of the method, apparatuses, and non-transitory computer-readable medium described herein, selecting the CBG-level retransmission mode may include operations, features, means, or instructions for selecting the second candidate CBG-level retransmission mode.

In some examples of the method, apparatuses, and non-transitory computer-readable medium described herein, transmitting the feedback information may include operations, features, means, or instructions for transmitting a first feedback information message, the first feedback information message including a first portion of the feedback information and an indication that a second feedback information message may be to be transmitted and transmitting the second feedback information message including a second portion of the feedback information.

A method of wireless communication is described. The method may include receiving, by a base station, one or more transport blocks via an autonomous uplink communication, each of the one or more transport blocks including a set of code block groups (CBGs), transmitting feedback information, the feedback information including transport block-level feedback for at least one of the one or more transport blocks, determining to implement CBG-based retransmission of the one or more transport blocks, transmitting an uplink transmission grant based on the determining, selecting a CBG-level retransmission mode from at least two candidate CBG-level retransmission modes, and transmitting feedback information based on the selected CBG-level retransmission mode.

An apparatus for wireless communication is described. The apparatus may include a processor, memory coupled with the processor, and instructions stored in the memory. The instructions may be executable by the processor to cause the apparatus to receive one or more transport blocks via an autonomous uplink communication, each of the one or more transport blocks including a set of CBGs, transmit feedback information, the feedback information including transport block-level feedback for at least one of the one or more transport blocks, determine to implement CBG-based retransmission of the one or more transport blocks, transmit an uplink transmission grant based on the determining, select a CBG-level retransmission mode from at least two candidate CBG-level retransmission modes, and transmit feedback information based on the selected CBG-level retransmission mode.

Another apparatus for wireless communication is described. The apparatus may include means for receiving, by a base station, one or more transport blocks via an autonomous uplink communication, each of the one or more transport blocks including a set of CBGs, means for transmitting feedback information, the feedback information including transport block-level feedback for at least one of the one or more transport blocks, means for determining to implement CBG-based retransmission of the one or more transport blocks, means for transmitting an uplink transmission grant based on the determining, means for selecting a CBG-level retransmission mode from at least two candidate CBG-level retransmission modes, and means for transmitting feedback information based on the selected CBG-level retransmission mode.

A non-transitory computer-readable medium storing code for wireless communication is described. The code may include instructions executable by a processor to receive one or more transport blocks via an autonomous uplink communication, each of the one or more transport blocks including a set of CBGs, transmit feedback information, the feedback information including transport block-level feedback for at least one of the one or more transport blocks, determine to implement CBG-based retransmission of the one or more transport blocks, transmit an uplink transmission grant based on the determining, select a CBG-level retransmission mode from at least two candidate CBG-level retransmission modes, and transmit feedback information based on the selected CBG-level retransmission mode.

In some examples of the method, apparatuses, and non-transitory computer-readable medium described herein, the uplink transmission grant includes an indication of at least one of the one or more transport blocks to be retransmitted.

Some examples of the method, apparatuses, and non-transitory computer-readable medium described herein may further include operations, features, means, or instructions for receiving a retransmission of at least one transport block of the one or more transport blocks based on the uplink transmission grant and transmitting a second uplink transmission grant, the second transmission grant including CBG-level feedback for the at least one transport block.

In some examples of the method, apparatuses, and non-transitory computer-readable medium described herein, a first candidate CBG-level retransmission mode where the feedback information includes CBG-level feedback for at least one of the one or more transport blocks and a second candidate CBG-level retransmission mode where the feedback information includes a scheduled uplink grant.

In some examples of the method, apparatuses, and non-transitory computer-readable medium described herein, selecting the CBG-level retransmission mode may include operations, features, means, or instructions for selecting the first candidate CBG-level retransmission mode.

In some examples of the method, apparatuses, and non-transitory computer-readable medium described herein, transmitting the feedback information may include operations, features, means, or instructions for transmitting a transport block-level feedback indicator for each of the one or more transport blocks, where at least one of the transport block-level feedback indicators indicates a negative acknowledgement for a corresponding transport block and transmitting a CBG-level feedback indicator for the corresponding transport block.

Some examples of the method, apparatuses, and non-transitory computer-readable medium described herein may further include operations, features, means, or instructions for transmitting the first feedback information message in a first symbol in a first slot and transmitting the second feedback information message in a second symbol in the first slot.

Some examples of the method, apparatuses, and non-transitory computer-readable medium described herein may further include operations, features, means, or instructions for transmitting the first feedback information message in a first slot and transmitting the second feedback information message in a second slot.

In some examples of the method, apparatuses, and non-transitory computer-readable medium described herein, transmitting the feedback information may include operations, features, means, or instructions for transmitting the scheduled uplink grant based on determining to implement CBG-based retransmission.

In some examples of the method, apparatuses, and non-transitory computer-readable medium described herein, selecting the CBG-level retransmission mode may include operations, features, means, or instructions for selecting the second candidate CBG-level retransmission mode.

In some examples of the method, apparatuses, and non-transitory computer-readable medium described herein, transmitting the feedback information may include operations, features, means, or instructions for transmitting a first feedback information message, the first feedback information message including a first portion of the feedback information and an indication that a second feedback information message may be to be transmitted and transmitting the second feedback information message including a second portion of the feedback information.

DETAILED DESCRIPTION

Figure 1:
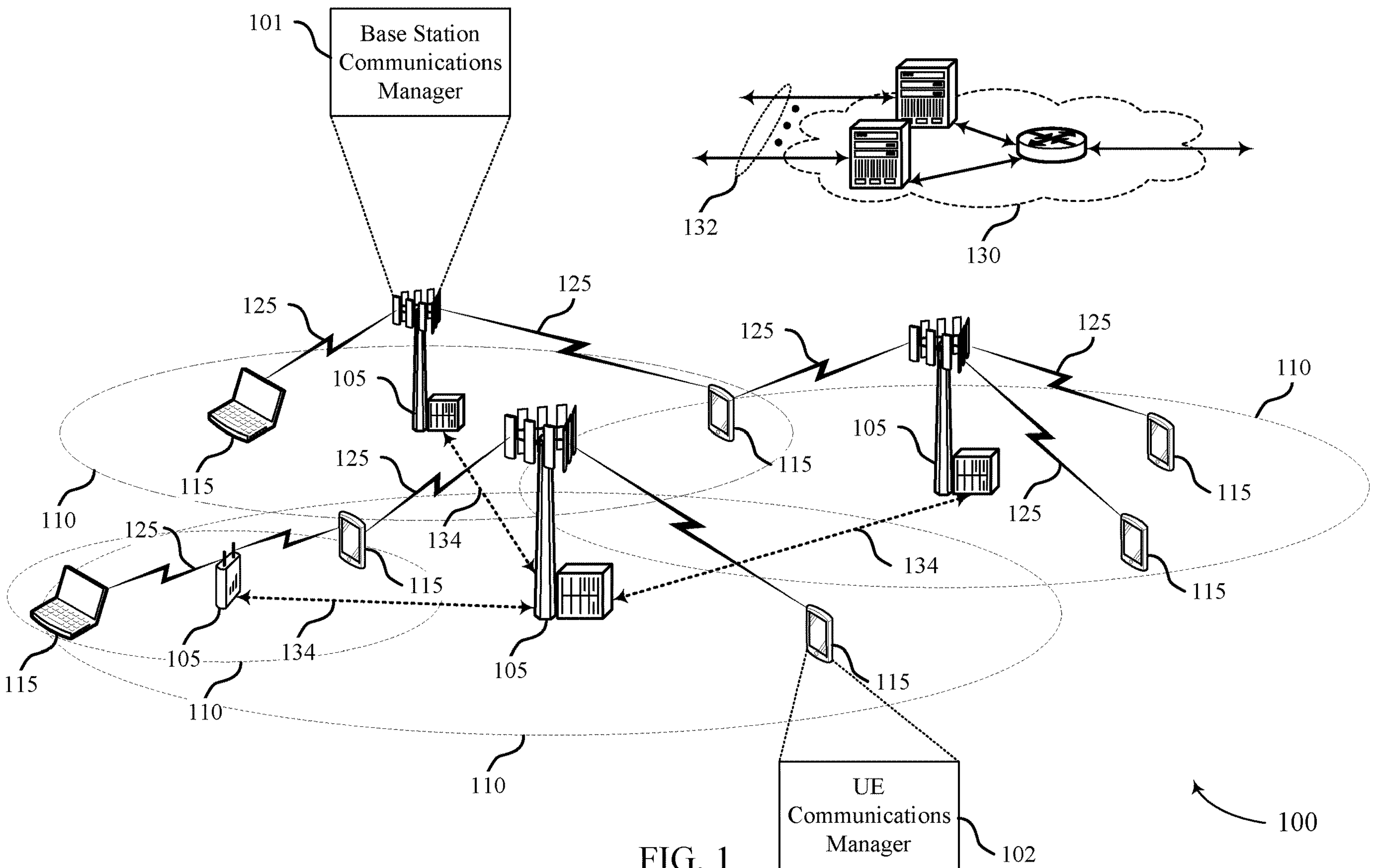
FIG. 1 illustrates an example of a system for wireless communications that supports code block group-based autonomous uplink transmission in accordance with aspects of the present disclosure.

Wireless communication schemes may use either licensed or unlicensed frequency bands. In wireless communication schemes using licensed frequency bands, a base station may grant transmission opportunities to a user equipment (UE), and the UE may transmit based on the grant. The UE in licensed frequency bands may be unable to transmit in the absence of the receipt of a transmission grant. In contrast, in wireless communication schemes using unlicensed frequency bands, UEs may transmit without receiving explicit permission from a base station. Transmission without receiving a transmission grant may be referred to as autonomous uplink (AUL) transmission. In unlicensed frequency bands, AUL transmission allows the UE to transmit whenever it can access the uplink channel, without depending on the base station to first access the downlink channel to provide the uplink grant.

A UE may transmit a message including one or more transport blocks to a base station via an autonomous uplink transmission. Each transport block may include a plurality of code block groups (CBGs). In some examples, the base station may not properly receive the entirety of each transport block. For example, the base station may not properly receive one or more CBGs in a transport block. The base station may provide feedback information indicating that the transport block was not properly received. The UE may then retransmit the transport block in a subsequent uplink communication.

However, retransmission of transport blocks in accordance with such a scheme may be inefficient. For example, the base station may properly receive all but one CBG in a transport block. The CBG may be only a small portion of the transport block, but the UE may retransmit the entire transport block. Thus, the UE may retransmit a large amount of information that has already been properly received by the base station, thereby preventing the UE from transmitting information that the base station has not yet received. Alternatively or additionally, the UE may transmit additional autonomous uplink communications, increasing the likelihood of collisions and decreasing system throughput.

In order to improve the efficiency of the system, the base station may provide CBG-level feedback information, and the UE may transmit only the CBGs that the base station did not properly receive.

In some examples, the base station may transmit one or more downlink feedback information (DFI) packets. Each DFI packet may include transport block-level feedback for one or more transport blocks in an autonomous uplink communication and CBG-level feedback for at least one of the one or more transport blocks. The CBG-level feedback may be, for example, a bitmap indicating, for each CBG in a transport block, an acknowledgement status for the corresponding CBG (e.g., acknowledged or negatively acknowledged). In some examples, the DFI packet may include CBG-level feedback only for transport blocks indicated to have been negatively acknowledged. In some examples, the CBG-level feedback may be split across two or more DFI packets, which may be transmitted in different symbols on the same slot or in different slots. The UE may then retransmit the indicated CBGs in one or more subsequent autonomous uplink communications.

In some examples, the base station may transmit one or more uplink transmission grants including CBG-level feedback information. The CBG-level feedback may identify one or more CBGs to be retransmitted. The uplink transmission grant(s) may also identify resources the UE may use to retransmit the one or more CBGs. The UE may then retransmit the identified CBGs using the resources identified in the uplink transmission grant(s).

Aspects of the disclosure are initially described in the context of a wireless communications system. Aspects of the disclosure are further illustrated by and described with reference to apparatus diagrams, system diagrams, and flowcharts that relate to code block group-based autonomous uplink transmission.

FIG. 1 illustrates an example of a wireless communications system 100 that supports code block group-based autonomous uplink transmission in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an Si or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s$=1/30,720,000 seconds. Time intervals of a communications resource may be organized according to radio frames each having a duration of 10 milliseconds (ms), where the frame period may be expressed as $T_f$=307,200 $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or DFT-s-OFDM).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

One or more of the base stations 105 may include a base station communications manager 101, which may provide CBG-level feedback to UEs 115. The base station communications manager 101 may receive an autonomous uplink communication. The autonomous uplink communication may include one or more transport blocks, and each transport block may include a plurality of CBGs. The base station communications manager 101 may properly receive a first subset of the CBGs, and may not properly receive a second subset of the CBGs.

The base station communications manager 101 may generate feedback information for each of the one or more transport blocks. In some examples, the feedback information for each of the one or more transport blocks may be a bitmap identifying an acknowledgement status for each of the one or more transport blocks. The bitmap may indicate an acknowledgement (positive acknowledgement) for each transport block that was properly received (e.g., for each transport block for which each CBG was properly received), and may indicate a negative acknowledgement for each transport block that was not properly receive (e.g., for each transport block for which at least one CBG was not properly received). The base station communications manager 101 may cause the base station 105 to transmit the transport block-level feedback information to the UE 115, e.g., in a DFI packet.

The base station communications manager 101 may generate CBG-level feedback for CBGs in at least one of the one or more transport blocks. In some examples, the base station communications manager 101 may generate CBG-level feedback for CBGs only in transport blocks for which a negative acknowledgment was indicated in the transport block-level feedback information.

In some examples, the base station communications manager 101 may cause the base station 105 to transmit the CBG-level feedback to the UE 115 in one or more DFI packets. Each of the one or more DFI packets may also include the transport block-level feedback information. The CBG-level feedback may be, for example, a bitmap indicating an acknowledgement status for each CBG in a transport block.

In some examples, the base station communications manager 101 may cause the base station 105 to transmit the CBG-level feedback to the UE 115 in one or more uplink transmission grants. The uplink transmission grants may also identify resources (e.g., time and frequency resources) that the UE 115 may use to retransmit one or more CBGs. For example, the base station communications manager 101 may cause the base station 105 to transmit a first uplink transmission grant identifying one or more transport blocks to be retransmitted, and resources that may be used to retransmit the one or more transport blocks. The base station communications manager 101 may receive a retransmission of the one or more transport blocks. The base station communications manager 101 may cause the base station 105 to transmit a second uplink transmission grant based at least in part on the retransmission of the one or more transport blocks. The second uplink transmission grant may identify one or more CBGs in the retransmitted transport blocks to be retransmitted. In some examples, the base station communications manager 101 may determine whether to implement CBG-level retransmission, and may cause the base station 105 to transmit the CBG-level feedback in the one or more uplink transmission grants only when a positive determination is made.

In some examples, the base station communications manager 101 may determine a retransmission mode for autonomous uplink transmissions, e.g., by selecting a retransmission mode from two or more candidate retransmission modes. When a first candidate retransmission mode is selected, the base station communications manager 101 may cause the base station 105 to transmit the CBG-level feedback to the UE 115 in one or more DFI packets. When a second candidate retransmission mode is selected, the base station communications manager 101 may cause the base station 105 to transmit the CBG-level feedback to the UE 115 in one or more uplink transmission grants.

UEs 115 may include a UE communications manager 102, which may retransmit one or more CBGs in response to CBG-level feedback information. The UE communications manager 102 may cause the UE 115 to transmit an autonomous uplink communication to a base station 105. The autonomous uplink communication may include one or more transport blocks, and each transport block may include a plurality of CBGs.

The UE communications manager 102 may receive feedback information from the base station 105. The feedback information may include one or more DFI packets. The DFI packets may include transport block-level feedback information and CBG-level feedback information. The UE communications manager 102 may cause the UE 115 to retransmit one or more CBGs in a subsequent autonomous uplink communication based at least in part on the one or more DFI packets.

In some examples, the feedback information may include one or more uplink transmission grants. For example, the UE communications manager 102 may receive a first uplink transmission grant identifying one or more transport blocks from the autonomous uplink communication to be retransmitted. The first uplink transmission grant may also identify resources the UE 115 may use for retransmission of the one or more transport blocks. The UE communications manager 102 may cause the UE 115 to retransmit the one or more transport blocks using the identified resources. The UE communications manager 102 may thereafter receive a second uplink transmission grant identifying one or more CBGs in the one or more retransmitted transport blocks to be retransmitted. The second uplink transmission grant may also identify resources the UE 115 may use for retransmission of the one or more CBGs. The UE communications manager 102 may cause the UE 115 to retransmit the one or more CBGs using the identified resources.

In some examples, the UE communications manager 102 may cause the UE 115 to transmit uplink control information (UCI). In some examples, the UCI may include an indication of the CBGs to be retransmitted. For example, the UCI may include a bitmap identifying CBGs in a transport block to be retransmitted. In some other examples, the UCI may indicate whether the UE 115 will retransmit entire retransmission blocks or will retransmit only the CBGs identified in the DFI packets as corresponding to a negative acknowledgement.

Figure 2:
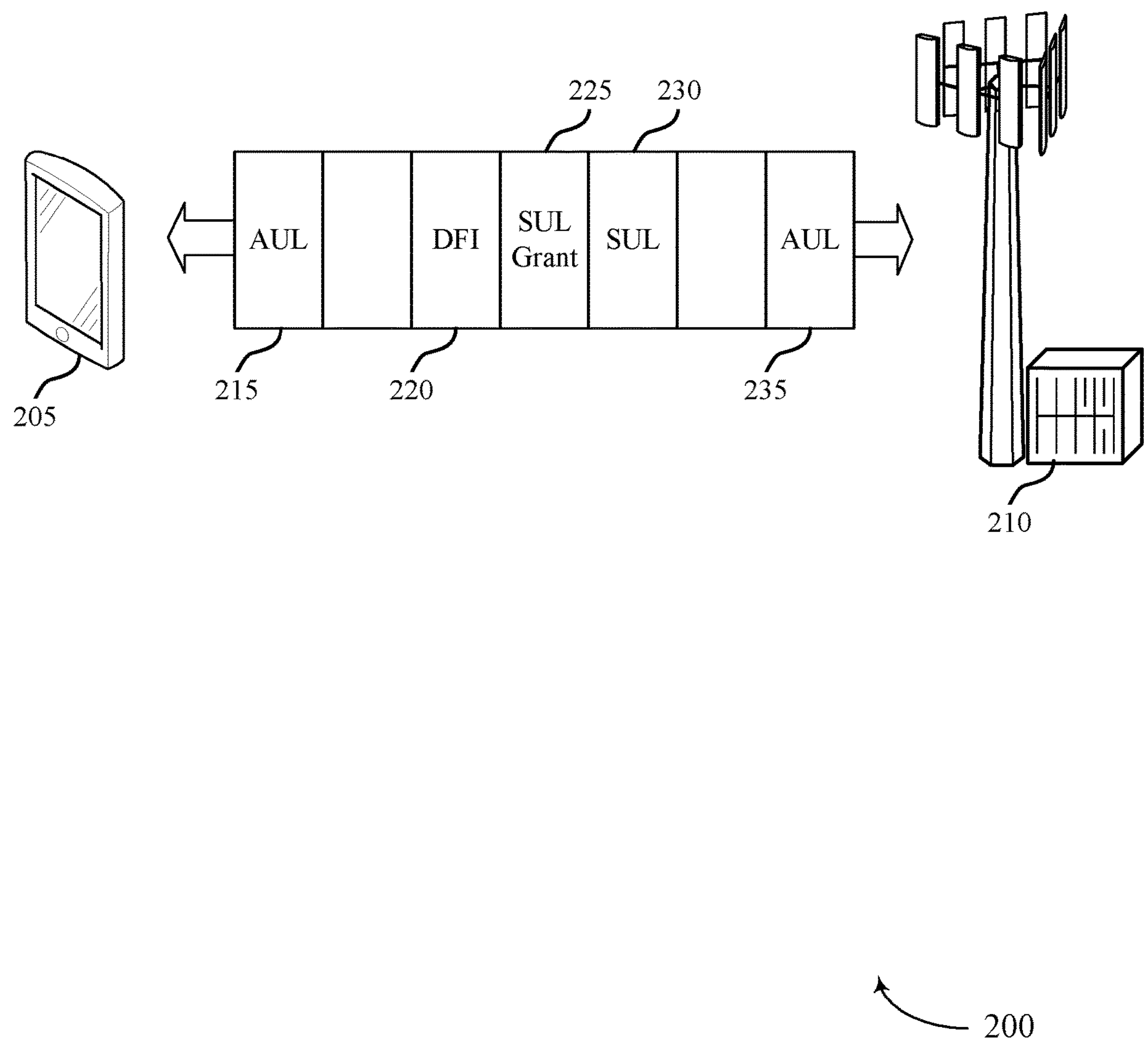
FIG. 2 illustrates an example of a wireless communications system that supports various forms of autonomous uplink transmission in accordance with aspects of the present disclosure.

FIG. 2 illustrates an example of a wireless communications system 200 that supports various forms of autonomous uplink transmission in accordance with aspects of the present disclosure. In some examples, wireless communications system 200 may implement aspects of wireless communication system 100.

The wireless communications system 200 may include a UE 205 and a base station 210. The UE 205 may be an example of aspects of UE 115 described with reference to FIG. 1. The base station 210 may be an example of aspects of base station 105 described with reference to FIG. 1. The UE 205 may transmit uplink communications to the base station 210 over an uplink channel, and may receive downlink communications from the base station 210 over a downlink channel.

The UE 205 may be configured to transmit autonomous uplink (AUL) transmissions. For example, the UE 205 may transmit a first AUL transmission 215 without receiving an uplink transmission grant. The UE 205 may also transmit scheduled uplink (SUL) transmissions.

The first AUL transmission 215 may include one or more transport blocks, and each transport block may include a plurality of CBGs. When the UE 205 transmits the first AUL transmission 215, the base station 210 may or may not properly receive every CBG in every transport block in the first AUL transmission 215. The base station 210 may transmit DFI 220 to indicate which transport blocks were not properly received and may need to be re-transmitted. For example, the DFI 220 may indicate, for each transport block in the first AUL transmission 215, whether the transport block was properly received (acknowledgement (ACK)) or not properly received (negative acknowledgement (NACK)). The UE 205 may then retransmit the transport blocks that were not properly received, e.g., in a second AUL transmission 235.

However, sole reliance on transport block-level feedback alone may be inefficient. For example, the first AUL transmission 215 may include $N_{TB}$ transport blocks, and each transport block may include $N_{CBG}$ CBGs. If one CBG in each of n transport blocks is not properly received, the DFI 220 may indicate that none of the transport blocks were properly received. In such an example, the UE 205 may have to retransmit $n \times N_{CBG}$ CBGs in the second AUL transmission 235. However, only the n CBGs that were not properly received need to be retransmitted. Transmitting only these n CBGs may free up $(n \times N_{CBG})$-n CBGs which may be used to transmit additional information. In order to improve the efficiency of the system, the base station 210 may provide CBG-level feedback to the UE 205. This approach may enable better bandwidth efficiency, increased performance, and/or reduced latencies at the UE 205, and may reduce the processing overhead for a processor or other hardware within UE 205.

In some examples, the DFI 220 may include CBG-level feedback for one or more of the transport blocks in the first AUL transmission 215. For example, the DFI 220 may include transport block-level feedback (e.g., a bitmap indicating an acknowledgement status) for each transport block in the first AUL transmission 215. The DFI 220 may also include CBG-level feedback (e.g., a bitmap indicating an acknowledgement status) for each CBG in at least one of the transport blocks in the first AUL transmission 215. In some examples, the DFI 220 may include CBG-level feedback for each transport block for which a negative acknowledgement is indicated.

In some examples, the DFI 220 may include one DFI packet. The DFI packet may include the transport block-level feedback, the CBG-level feedback, and padding (e.g., zero padding) to match the size of a DFI packet without CBG-level feedback. The DFI packet may also include one or more transition indicators. When all of the CBG-level feedback cannot fit into the single DFI packet, a subset of the CBG-level feedback may be selected based at least in part on an order in the first AUL transmission 215, a priority level, a number of CBGs that were not properly received in a transport block, a modulation and coding scheme (MCS), or a combination thereof.

In some other examples, the DFI 220 may include two or more DFI packets. The two or more DFI packets may be transmitted in different symbols of the same slot, or in different slots. The two or more DFI packets may be separated by a pre-defined gap (e.g., a number of symbols or a number of slots). Each DFI packet may include transport block-level feedback and a portion of the CBG-level feedback (e.g., CBG-level feedback for a portion of the transport blocks). Each DFI packet may also include padding and one or more transition indicators. Each DFI packet may also include a subsequent DFI indicator to indicate whether a subsequent DFI packet will be transmitting (e.g., a “0” in the subsequent DFI indicator may indicate that that DFI packet is the last DFI packet in the DFI 220).

The UE 205 may retransmit one or more CBGs in the second AUL transmission 235 based at least in part on the DFI 220. In some examples, the UE 205 may transmit uplink control information (UCI) prior to the second AUL transmission 235. In some examples, the UCI may include a CBG transmission indication (CBGTI). The CBGTI may identify one or more CBGs to be retransmitted in the second AUL transmission 235. For example, the CBGTI may be a bitmap indicating which CBGs are configured for the second AUL transmission 235. In some other examples, the UCI may include an indication of a retransmission mode (e.g., whether the UE 205 will retransmit entire transport blocks or only the CBGs identified in the DFI 220). The UCI may indicate a transport block-level retransmission mode when the UE 205 is unable to decode the DFI 220.

In some other examples, the DFI 220 may include only transport block-level feedback for the transport blocks in the first AUL transmission 215. The base station 210 may then determine to implement CBG-level feedback, and may transmit CBG-level feedback using a SUL transmission grant. For example, the base station 210 may transmit a first SUL grant 225 to the UE 205. The first SUL grant 225 may identify resources (e.g., time and frequency resources) that the UE 205 may use to retransmit one or more transport blocks. The first SUL grant 225 may also identify one or more transport blocks to be retransmitted. The UE 205 may retransmit the transport blocks using the identified resources in a first SUL transmission 230. The UE 205 may transmit the first SUL transmission 230 based at least in part on the DFI 220 and the first SUL grant 225.

The base station 210 may transmit a second SUL grant based at least in part on the first SUL transmission 230. The second SUL grant may identify one or more CBGs in the transport blocks transmitted in the first SUL transmission 230 to be retransmitted. The second SUL grant may also identify resources the UE 205 may use to retransmit the one or more CBGs. The UE 205 may retransmit the CBGs identified in the second SUL grant in a second SUL transmission based at least in part on the second SUL grant.

Figure 3:
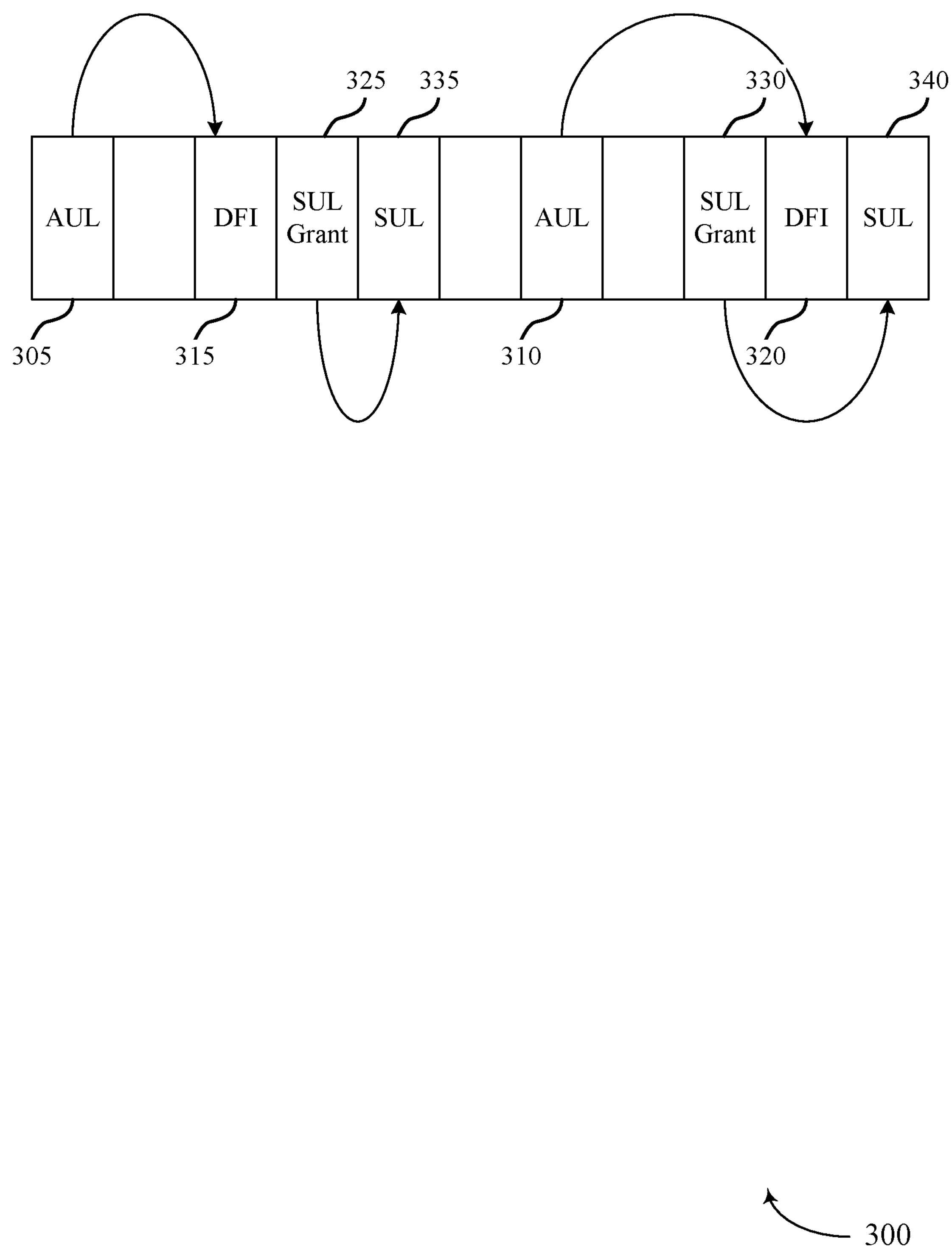
FIG. 3 illustrates an example of a transmission sequence in a wireless communications system that supports various forms of autonomous uplink transmission in accordance with aspects of the present disclosure.

FIG. 3 illustrates an example of a transmission sequence 300 in a wireless communications system that supports various forms of autonomous uplink transmission in accordance with aspects of the present disclosure. In some examples, the wireless communications system may implement aspects of wireless communication system 100.

The transmission sequence 300 may show uplink communications transmitted by a first wireless device (e.g., a UE such as UE 115 described with reference to FIG. 1) to a second wireless device (e.g., a base station such as base station 105 described with reference to FIG. 1), and downlink transmissions transmitted by the second wireless device to the first wireless device. The transmission sequence 300 illustrates communications in accordance with a scheduled uplink scheme and an autonomous uplink scheme.

In connection with the autonomous uplink scheme, the first wireless device may transmit a first AUL transmission 305 and a second AUL transmission 310. Each AUL transmission may include one or more transport blocks. Each transport block may include a plurality of CBGs. For example, a transport block may include a plurality of code blocks, with each code block being separated from the subsequent code block by a cyclic redundancy check (CRC). The transport block may be subdivided into a plurality of CBGs, with each CBG including one or more code blocks and one or more CRCs. In some examples, a code block may be split between two CBGs. In some examples, AUL transmissions may be configured with M CBGs.

In response to receiving the AUL transmissions, the second wireless device may transmit one or more DFI packets. For example, in response to receiving the first AUL transmission 305, the second wireless device may transmit first DFI packets 315. The first DFI packets 315 may include transport block-level feedback for the one or more transport blocks in the first AUL transmission 305. In some examples, the first DFI packets 315 may also include CBG-level feedback for the plurality of CBGs in at least one of the one or more transport blocks. Likewise, the second wireless device may transmit second DFI packets 320 in response to receiving and based at least in part on the second AUL transmission 310.

In connection with a scheduled uplink scheme, the second wireless device may transmit a first SUL grant 325 and a second SUL grant 330. Each SUL grant may include an identification of resources (e.g., time and frequency resources) that the first wireless device may use to transmit uplink data. For example, the first wireless device may transmit a first SUL transmission 335 using resources identified in the first SUL grant 325, and may transmit a second SUL transmission 340 using resources identified in the second SUL grant 330. Each SUL transmission may include a plurality of CBGs. For example, each SUL transmission may be configured with N CBGs.

In some examples, the number M of CBGs in AUL transmission and the number N of CBGs in SUL transmissions may be configured independently. In some other examples, AUL transmissions and SUL transmissions may be configured with the same number of CBGs, such that M=N. In some other examples, the number M of CBGs in AUL transmissions may be configured based at least in part on the number N of CBGs in SUL transmissions. For example, the number M of CBGs in AUL transmissions may be configured to be less than or equal to the number N of CBGs in SUL transmissions.

In some examples, AUL transmissions may be independent from SUL transmissions. For example, the first wireless device may transmit a first AUL transmission 305 to the second wireless device, and the second wireless device may respond by transmitting the first DFI packets 315. The DFI packets may be configured as described with reference to FIGS. 4-9. The first DFI packets 315 may identify one or more CBGs to be retransmitted (e.g., because they were not properly received). The first DFI packets 315 may include CBG-level feedback indicating the one or more CBGs to be retransmitted. The first wireless device may retransmit the one or more CBGs in the second AUL transmission 310.

In some examples, SUL transmissions may be used for retransmission of transport blocks and/or CBGs transmitted in AUL transmissions. For example, the first wireless device may transmit a first AUL transmission 305 to the second wireless device, and the second wireless device may respond by transmit a first DFI packet 315. The first DFI packet 315 may be configured as described with reference to FIG. 10. The DFI packet 315 may indicate transport block-level feedback for one or more transport blocks in the first AUL transmission.

The second wireless device may then determine whether to implement CBG-level feedback for the first AUL transmission 305. When the second wireless device determines not to implement CBG-level feedback for the first AUL transmission 305, the second wireless device may take no further action, and the first wireless device may retransmit one or more transport blocks in the second AUL transmission 310 based at least in part on the transport block-level feedback in DFI packet 315.

When the second wireless device determines to implement CBG-level feedback for the first AUL transmission 305, the second wireless device may transmit a first SUL grant 325. The SUL grant 325 may identify resources that the first wireless device may use to retransmit one or more transport blocks, and may also identify one or more transport blocks to be retransmitted. The first wireless device may transmit a first SUL transmission 335 to the second wireless device based at least in part on the first DFI packet 315 and/or the first SUL grant 325. For example, the first SUL transmission 335 may include the transport blocks identified in the first DFI packet 315 and/or the first SUL grant 325, and may be transmitted using resources identified in the first SUL grant 325.

The second wireless device may transmit a second SUL grant 330 based at least in part on the first SUL transmission 335. The second SUL grant 330 may identify resources that the first wireless device may use to retransmit one or more CBGs in the transport blocks in the first SUL transmission 335, and may also identify one or more CBGs to be retransmitted. When the number M of CBGs for AUL transmissions is no more than the number N of CBGs configured for SUL transmissions, the second wireless device may use either N or M CBGs to schedule the one or more CBGs. In some examples, the second wireless device may include an indication of which number to use in downlink control information. The second wireless device may transmit a second SUL transmission 340 to the second wireless device based at least in part on the second SUL grant 330.

Figure 4:
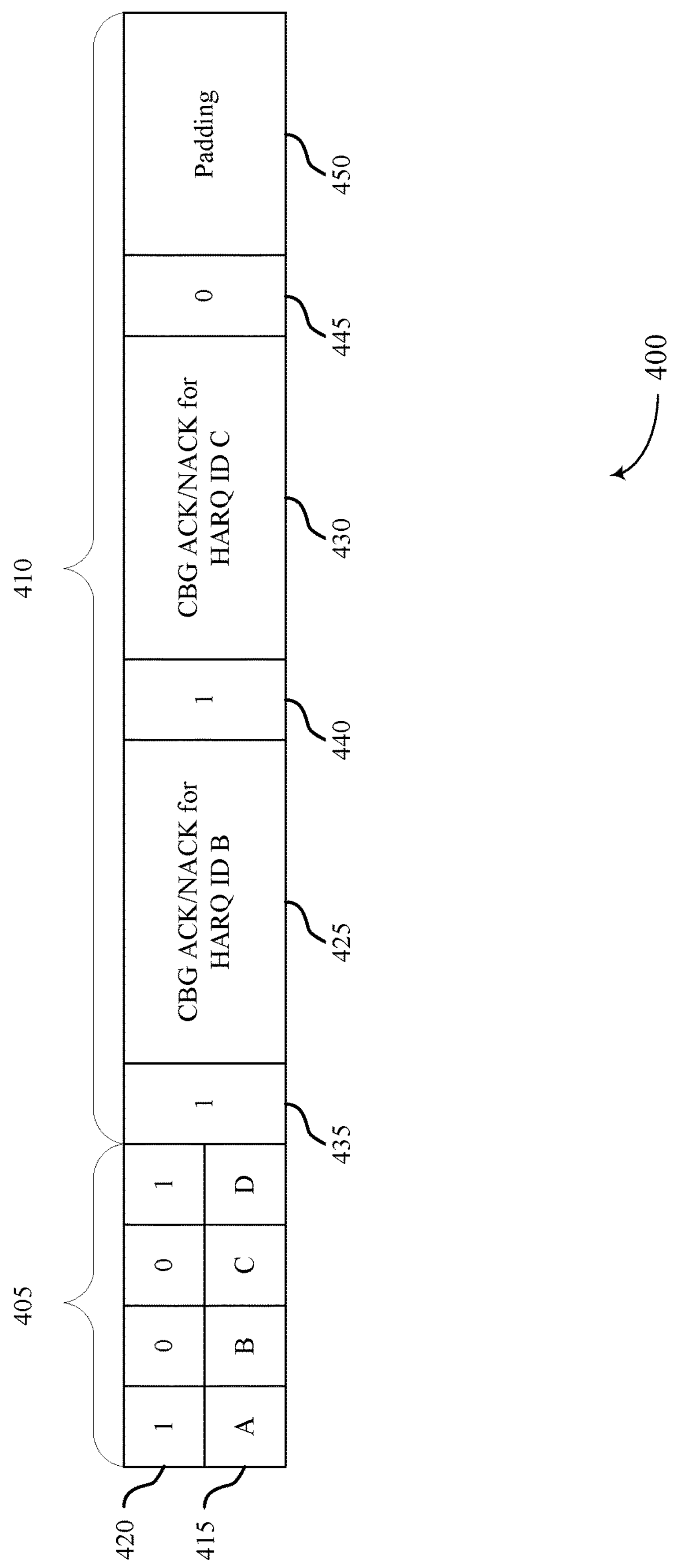
FIG. 4 illustrates an example of a downlink feedback information (DFI) configuration in a wireless communications system that supports code block group-based autonomous uplink transmission in accordance with aspects of the present disclosure.

FIG. 4 illustrates an example of a DFI configuration 400 in a wireless communications system that supports code block group-based autonomous uplink transmission in accordance with aspects of the present disclosure. In some examples, the wireless communications system may implement aspects of wireless communication system 100.

The DFI configuration 400 may include transport block-level feedback 405 and CBG-level feedback 410. In some other examples, the DFI configuration 400 may include only CBG-level feedback.

The transport block-level feedback 405 may include a bitmap indicating an acknowledgement status for one or more transport blocks. The one or more transport blocks may correspond to the one or more transport blocks included in a prior AUL transmission. The bitmap may include a HARQ identification (HARQ ID) 415 and an acknowledgement status 420 corresponding to the HARQ ID 415. For example, the transport block-level feedback 405 in the configuration 400 indicates that the acknowledgement status of HARQ IDs A and D are acknowledged, which indicates that all CBGs in the transport blocks corresponding to HARQ IDs A and D were properly received. In contrast, the transport block-level feedback 405 in the configuration 400 indicates that the acknowledgement status of HARQ IDs B and C are negative acknowledged, which indicates that at least one of the CBGs in each of the transport blocks corresponding to HARQ IDs B and C were not properly received.

The CBG-level feedback 410 may include an indication of the acknowledgement status for each CBG for the transport blocks corresponding to HARQ IDs having a negative acknowledgement status. The CBG-level feedback 410 may not include such an indication for the transport blocks corresponding to HARQ IDs having positive acknowledgement status because in order to have a positive transport-block level acknowledgement status, each CBG may necessarily have a positive CBG-level acknowledgement status.

The CBG-level feedback 410 may include a first CBG-level bitmap 425 and a second CBG-level bitmap 430. The first CBG-level bitmap 425 may include an indication of an acknowledgement status for each CBG in the transport block corresponding to HARQ ID B, and the second CBG-level bitmap 430 may include an indication of an acknowledgement status for each CBG in the transport block corresponding to HARQ ID C.

The CBG-level feedback 410 may also include one or more transition indicators. For example, the CBG-level feedback 410 includes a first transition indicator 435, a second transition indicator 440, and a third transition indicator 445. The first transition indicator 435 includes a 1, indicating that the next entry in the DFI configuration 400 (i.e., first CBG-level bitmap 425) is a CBG-level acknowledgement status indicator. The second transition indicator 440 likewise includes a 1, indicating that the next entry in the DFI configuration 400 (i.e., second CBG-level bitmap 430) is a CBG-level acknowledgement status indicator. The third transition indicator 445 includes a 0, indicating that no further CBG-level acknowledgement status indicators are included in the DFI configuration 400.

The CBG-level feedback 410 may also include padding 450. The padding may include a number of zero bits such that the DFI configuration 400 matches the size of a standard (e.g., transport block-level) DFI transmission.

The CBG-level feedback 410 may not include indications of the acknowledgement status for CBGs in transport blocks corresponding to HARQ IDs having a positive acknowledgement status. In some examples, when the transport block-level feedback 405 indicates that all transport blocks in the prior AUL transmission were properly received, the CBG-level feedback 410 may not include any CBG-level bitmaps such as the first CBG-level bitmap 425 or the second CBG-level bitmap 430, and may instead include only a transition indicator (e.g., transition indicator 4445 indicating that no CBG-level acknowledgement status indicators are included in the DFI packet) and padding 450.

In some examples, the DFI configuration 400 may be unable to indicate a CBG-level acknowledgement status for each transport block corresponding to a negative acknowledgement. For example, the CBG-level feedback 410 may be able to include a maximum of Y CBG-level bitmaps, but the transport block-level feedback 405 may indicate that more than Y transport blocks include CBGs which were not properly received. In such examples, Y transport blocks may be selected for inclusion in the CBG-level feedback 410. The Y transport blocks may be selected based at least in part on an order. For example, the first Y transport blocks associated with a negative acknowledgement in the transport block-level feedback 405. In some examples, the Y transport blocks may be selected based at least in part on a priority level of the transport blocks and/or CBGs which were not properly received, a number of CBGs in each transport block that were not properly received, and/or a modulation and coding scheme (MCS).

In some other examples, a two stage DFI configuration may be used as described with reference to FIGS. 5-7 when a single DFI is unable to indicate a CBG-level acknowledgement status for each transport block corresponding to a negative acknowledgement.

Figure 5:
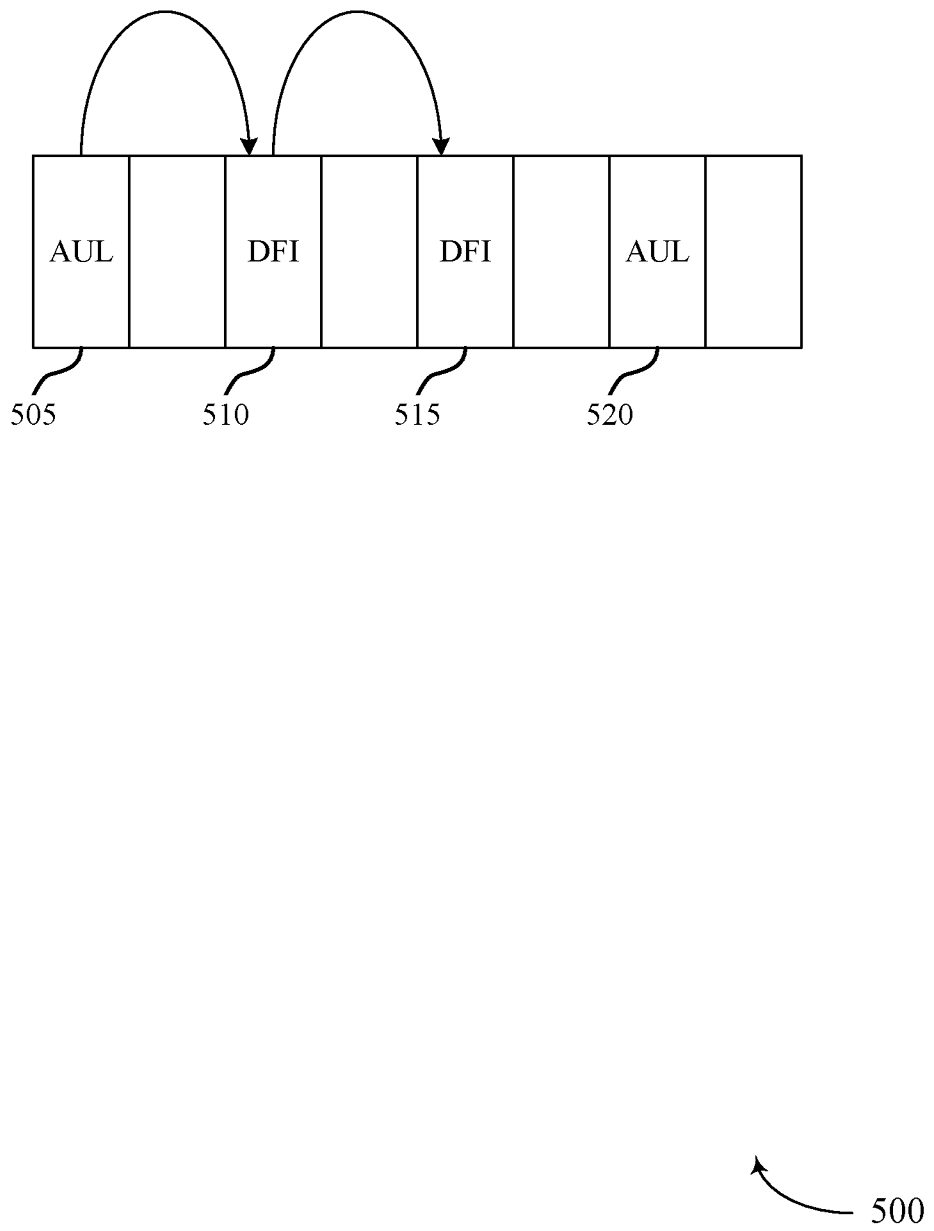
FIG. 5 illustrates an example of a transmission sequence in a wireless communications system that supports code block group-based autonomous uplink transmission, including multi-stage DFI-based autonomous uplink transmission, in accordance with aspects of the present disclosure.

FIG. 5 illustrates an example of a transmission sequence 500 in a wireless communications system that supports code block group-based autonomous uplink transmission, including multi-stage DFI-based autonomous uplink transmission, in accordance with aspects of the present disclosure. In some examples, the wireless communications system may implement aspects of wireless communication system 100.

The transmission sequence 500 may show uplink communications transmitted by a first wireless device (e.g., a UE such as UE 115 described with reference to FIG. 1) to a second wireless device (e.g., a base station such as base station 105 described with reference to FIG. 1), and downlink transmissions transmitted by the second wireless device to the first wireless device. In particular, the transmission sequence 500 may show the second wireless device transmitting a two stage DFI to the first wireless device.

The first wireless device may transmit a first autonomous uplink (AUL) transmission 505 on an uplink channel. The first AUL transmission 505 may include one or more transport blocks, and each of the one or more transport blocks may include a plurality of code block groups, as described with reference to FIG. 3.

The second wireless device may transmit first DFI 510 and second DFI 515 to the first wireless device. The first DFI 510 and second DFI 515 may be transmitted based at least in part on the first AUL transmission 505. In some examples, various communications may occur between the transmission of the first AUL transmission 505 and the transmission of the first DFI 510, and/or between the transmission of the first DFI 510 and the transmission of the second DFI 515, including communications related to scheduled uplink transmissions (e.g., uplink grants or uplink transmissions).

The second wireless device may transmit the first DFI 510 and the second DFI 515 based at least in part on determining that the CBG-level feedback does not fit into a single DFI packet. The second wireless device may also determine that additional DFI resources are available. When additional DFI resources are not available, a subset of the CBG-level feedback may be transmitted as described with reference to FIG. 4. In some examples, two or more DFIs may be transmitted to convey the CBG-level feedback.

In some examples, the first DFI 510 and the second DFI 515 may be transmitted in different slots. In some other examples, the first DFI 510 and the second DFI 515 may be transmitted in different symbols in the same slot. A pre-specified gap (e.g., a number of symbols or slots, which may correspond to a period of time) may elapse between the transmission of the first DFI 510 and the transmission of the second DFI 515, which may enable the first wireless device to determine that the first DFI 510 and the second DFI 515 are related to the same AUL transmission.

Each of the first DFI 510 and the second DFI 515 may include transport block-level feedback. For example, each of the first DFI 510 and the second DFI 515 may include a bitmap indicating an acknowledgement status for the one or more transport blocks in the first AUL transmission 505, as described with reference to FIG. 4. In some examples, each of the first DFI 510 and the second DFI may include the same bitmap.

Each of the first DFI 510 and the second DFI 515 may include CBG-level feedback. For example, each of the first DFI 510 and the second DFI 515 may include CBG-level bitmaps for transport blocks that were not properly received. For example, the first DFI 510 may include a first group of CBG-level bitmaps for a first group of transport blocks, and the second DFI may include a second group of CBG-level bitmaps for a second group of transport blocks. Each of the first DFI 510 and the second DFI 515 may include transition indicators as described with reference to FIG. 4.

The first DFI 510 and the second DFI 515 may also include a subsequent DFI indicator. The subsequent DFI indicator for the first DFI 510 may be a "1", indicating that a subsequent DFI related to the first AUL transmission 505 will be transmitted. The subsequent DFI indicator for the second DFI 515 may be a "0", indicating that the current DFI is the last DFI related to the first AUL transmission 505 (e.g., no subsequent DFI related to the first AUL transmission 505 will be transmitted).

Figure 6:
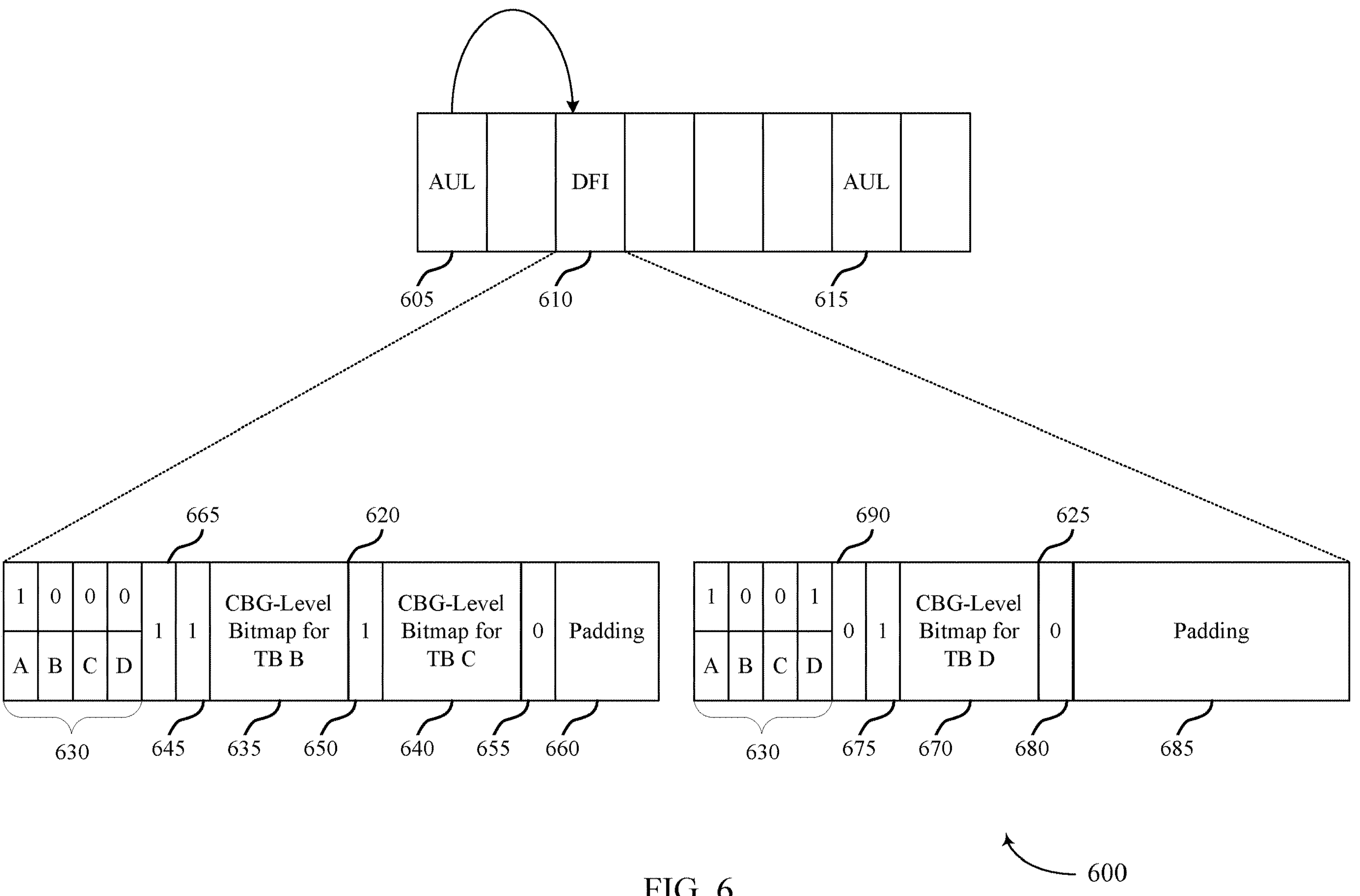
FIG. 6 illustrates an example of a transmission sequence in a wireless communications system that supports code block group-based autonomous uplink transmission in accordance with aspects of the present disclosure.

FIG. 6 illustrates an example of a transmission sequence 600 in a wireless communications system that supports code block group-based autonomous uplink transmission in accordance with aspects of the present disclosure. In some examples, the wireless communications system may implement aspects of wireless communication system 100.

The transmission sequence 600 may show uplink communications transmitted by a first wireless device (e.g., a UE such as UE 115 described with reference to FIG. 1) to a second wireless device (e.g., a base station such as base station 105 described with reference to FIG. 1), and downlink transmissions transmitted by the second wireless device to the first wireless device. In particular, the transmission sequence 600 may show the second wireless device transmitting a two stage DFI to the first wireless device during a single slot.

The first wireless device may transmit a first autonomous uplink (AUL) transmission 605 on an uplink channel. The second wireless device may transmit a DFI 610 on a downlink channel based at least in part on the first AUL transmission 605. The DFI 610 may be transmitted in a single slot. The first wireless device may transmit a second AUL transmission 615 on the uplink channel based at least in part on the DFI 610.

The DFI 610 may be a two stage DFI. The two-stage DFI 610 may include a first DFI 620 and a second DFI 625. The first DFI 620 may be transmitted in a first symbol (or set of symbols) in the first slot, and the second DFI 625 may be transmitted in a second symbol (or set of symbols) in the first slot. The first symbol may or may not be the first sequential symbol in the first slot, and the second slot may be any symbol after the first symbol. The first DFI 620 may be separated from the second DFI 625 by a pre-specified gap (e.g., a number of symbols, which may correspond to a period of time).

The first DFI 620 may include transport block-level feedback 630. The transport block-level feedback 630 may include a bitmap indicating an acknowledgement status for one or more transport blocks, as described above with reference to FIG. 4. The transport block-level feedback 630 indicates that all CBGs in transport block A were properly received, but that at least one CBG in each of transport blocks B, C, and D were not properly received. The second DFI 625 may also include the transport block-level feedback 630. In some other examples, the second DFI 625 may include a different set of transport block-level feedback.

The first DFI 620 may also include CBG-level feedback for one or more CBGs. For example, the first DFI 620 may include a first CBG-level bitmap 635 for transport block B and a second CBG-level bitmap 640 for transport block C. The first CBG-level bitmap 635 and the second CBG-level bitmap 640 may be examples of aspects of first CBG-level bitmap 425 and a second CBG-level bitmap 430 as described with reference to FIG. 4.

The first DFI 620 may also include one or more transition indicators as described above with reference to FIG. 4. For example, the first DFI 620 may include a first transition indicator 645 prior to first CBG-level bitmap 635, a second transition indicator 650 after the first CBG-level bitmap 635, and a third transition indicator 655 after the first CBG-level bitmap 640. The first transition indicator 645 includes a 1, indicating that the next entry in the first DFI 620 (i.e., first CBG-level bitmap 635) is a CBG-level acknowledgement status indicator. The second transition indicator 650 likewise includes a 1, indicating that the next entry in the first DFI 620 (i.e., second CBG-level bitmap 640) is a CBG-level acknowledgement status indicator. The third transition indicator 655 includes a 0, indicating that no further CBG-level acknowledgement status indicators are included in the first DFI 620. The first DFI 620 may also include padding 660 after the third transition indicator 655. The padding 660 may be an example of aspects of padding 450 described with reference to FIG. 4.

The first DFI 620 may also include a first subsequent DFI indicator 665. The first subsequent DFI indicator 665 may be a "1", indicating that a subsequent DFI (i.e., the second DFI 625) related to the first AUL transmission 605 will be transmitted. The first wireless device may determine that a subsequent DFI is to be transmitted based at least in part on the first subsequent DFI indicator 665, and may identify the subsequent DFI based at least in part on the pre-specified gap (e.g., number of symbols and/or period of time).

The second DFI 625 may include CBG-level feedback for one or more CBGs. The CBG-level feedback in the second DFI 625 may differ from the CBG-level feedback in the first DFI 620. For example, the CBG-level feedback in the first DFI 620 may include CBG-level feedback for a first group of transport blocks (e.g., transport blocks B and C), and the CBG-level feedback in the second DFI 625 may include CBG-level feedback for a second group of transport blocks (e.g., transport block D). In some other examples, CBG-level feedback for a transport block (e.g., transport block C) may be split between the first DFI 620 and the second DFI 625.

The second DFI 625 may include a third CBG-level bitmap 670 for transport block D. The third CBG-level bitmap 670 may be an example of aspects of first CBG-level bitmap 425 or second CBG-level bitmap 430 as described with reference to FIG. 4. The second DFI 625 may also include one or more transition indicators as described above with reference to FIG. 4. For example, the second DFI 620 may include a fourth transition indicator 675 prior to the third CBG-level bitmap 670 and a fifth transition indicator 680 after the third CBG-level bitmap 670. The fourth transition indicator 675 includes a 1, indicating that the next entry in the second DFI 620 (i.e., third CBG-level bitmap 670) is a CBG-level acknowledgement status indicator. The fifth transition indicator 680 includes a 0, indicating that no further CBG-level acknowledgement status indicators are included in the second DFI 625. The second DFI 625 may also include padding 685 after the fifth transition indicator 680. The padding 685 may be an example of aspects of padding 450 described with reference to FIG. 4.

The second DFI 620 may also include a second subsequent DFI indicator 690. The second subsequent DFI indicator 690 may be a "0", indicating that no subsequent DFI related to the first AUL transmission 605 will be transmitted (e.g., that the second DFI 625 is the last DFI related to the first AUL transmission 605). The first wireless device may determine that no subsequent DFI is to be transmitted based at least in part on the second subsequent DFI indicator 690. The first wireless device may identify one or more transport blocks and/or CBGs for retransmission in the second AUL transmission 615 based at least in part on the first DFI 620 and the second DFI 625.

Figure 7:
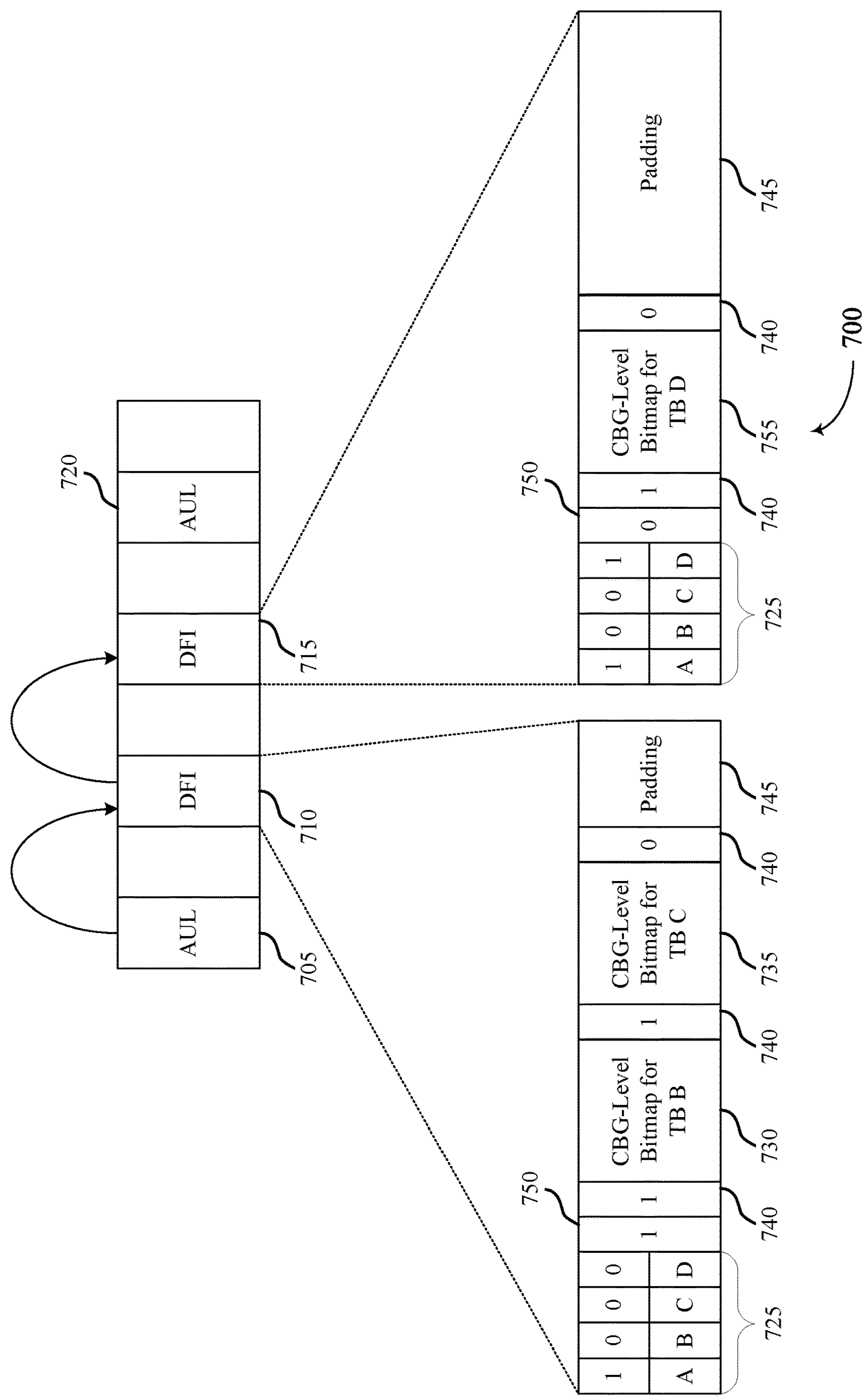
FIG. 7 illustrates an example of a transmission sequence in a wireless communications system that supports code block group-based autonomous uplink transmission in accordance with aspects of the present disclosure.

FIG. 7 illustrates an example of a transmission sequence 700 in a wireless communications system that supports code block group-based autonomous uplink transmission in accordance with aspects of the present disclosure. In some examples, the wireless communications system may implement aspects of wireless communication system 100.

The transmission sequence 700 may show uplink communications transmitted by a first wireless device (e.g., a UE such as UE 115 described with reference to FIG. 1) to a second wireless device (e.g., a base station such as base station 105 described with reference to FIG. 1), and downlink transmissions transmitted by the second wireless device to the first wireless device. In particular, the transmission sequence 700 may show the second wireless device transmitting a two stage DFI to the first wireless device in different slots.

The first wireless device may transmit a first autonomous uplink (AUL) transmission 705 on an uplink channel. The second wireless device may transmit a first DFI 710 and a second DFI 715 on a downlink channel based at least in part on the first AUL transmission 705. The first DFI 710 may be transmitted in a first slot, and the second DFI 715 may be transmitted in a second slot. The first wireless device may transmit a second AUL transmission 720 on the uplink channel based at least in part on the first DFI 710 and the second DFI 715.

The first DFI 710 may be an example of aspects of first DFI 620 described with reference to FIG. 6. The second DFI 715 may be an example of aspects of second DFI 625 described with reference to FIG. 6. The first DFI 710 may be separated from the second DFI 715 by a pre-specified gap (e.g., a number of slots, which may correspond to a period of time).

The first DFI 710 and the second DFI 715 may include transport block-level feedback 725. In some other examples, the first DFI 710 may include transport block-level feedback for a first group of transport blocks, and the second DFI 715 may include transport block-level feedback for a second group of transport blocks that overlaps with the first group of transport blocks. In some other examples, the second DFI 715 may include an indication that links the transport block-level feedback in the first DFI 710 to the second DFI 715.

The first DFI 710 may include CBG-level feedback for one or more transport blocks, e.g., a first CBG-level bitmap 730 for transport block B and a second CBG-level bitmap 735 for transport block C. The first DFI 710 may also include one or more transition indicators 740, padding 745, and a subsequent DFI indicator 750, as described with reference to FIG. 6.

The second DFI 715 may include CBG-level feedback for one or more transport blocks, e.g., a third CBG-level bitmap 755 for transport block D. The second DFI 715 may also include one or more transition indicators 740, padding 745, and a subsequent DFI indicator 750, as described with reference to FIG. 6.

Figure 8:
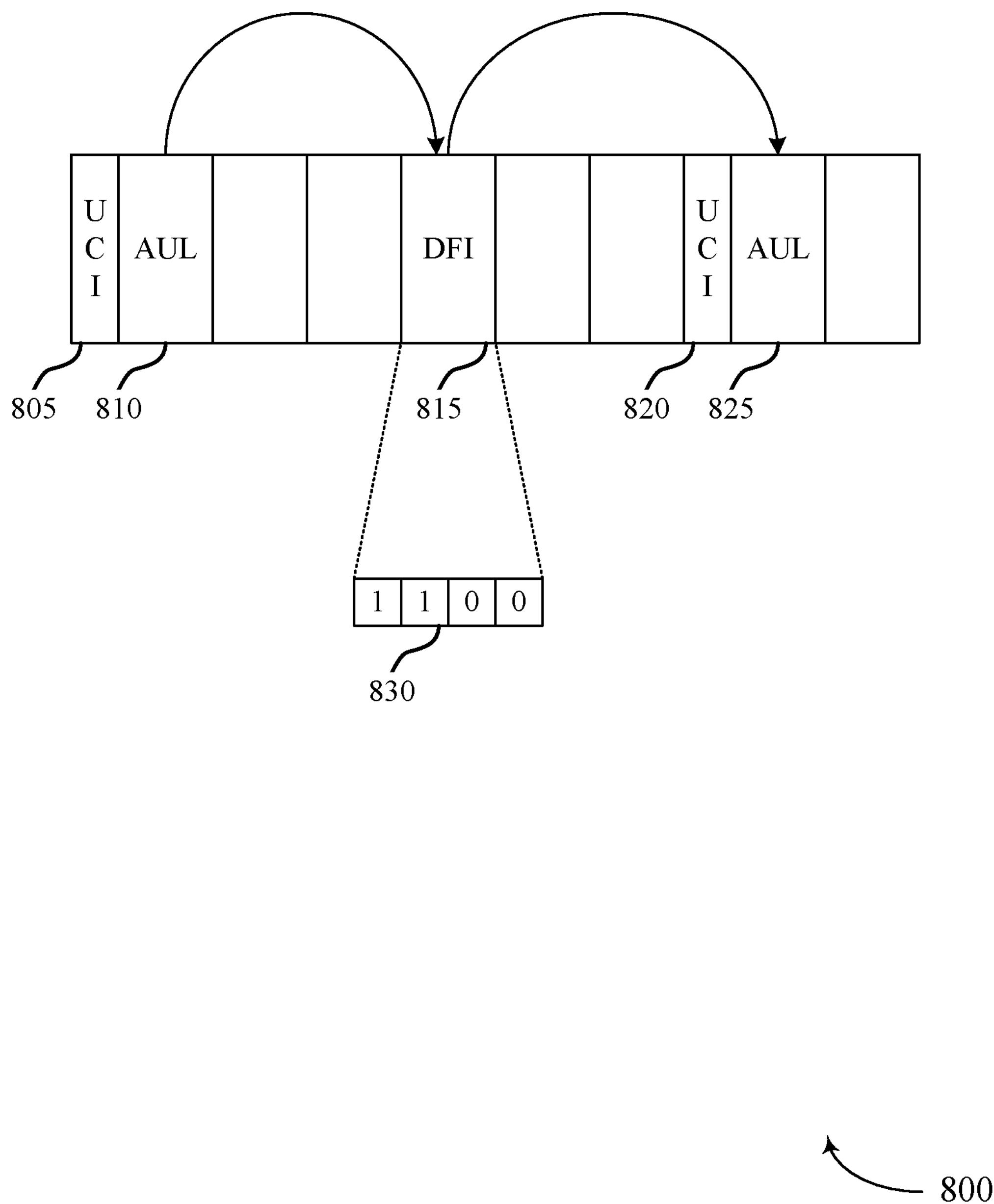
FIG. 8 illustrates an example of a transmission sequence in a wireless communications system that supports code block group-based autonomous uplink transmission in accordance with aspects of the present disclosure.

FIG. 8 illustrates an example of a transmission sequence 800 in a wireless communications system that supports code block group-based autonomous uplink transmission in accordance with aspects of the present disclosure. In some examples, the wireless communications system may implement aspects of wireless communication system 100.

The transmission sequence 800 may show uplink communications transmitted by a first wireless device (e.g., a UE such as UE 115 described with reference to FIG. 1) to a second wireless device (e.g., a base station such as base station 105 described with reference to FIG. 1), and downlink transmissions transmitted by the second wireless device to the first wireless device.

The first wireless device may transmit first uplink control information (UCI) 805 followed by a first autonomous uplink (AUL) transmission 810. The first AUL transmission 810 may include one or more transport blocks, and each of the one or more transport blocks may include a plurality of code block groups, as described with reference to FIG. 3.

The second wireless device may transmit DFI 815 to the first wireless device. The DFI 815 may be transmitted based at least in part on the first AUL transmission 810. In some examples, various communications may occur between the transmission of the first AUL transmission 810 and the transmission of the DFI 815, including communications related to scheduled uplink transmissions (e.g., uplink grants or uplink transmissions).

The DFI 815 may include CBG-level feedback for at least one CBG in the first AUL transmission 810. The DFI 815 may have a configuration such as DFI configuration 400 as described with reference to FIG. 4, DFI configuration of a DFI 610 as described with reference to FIG. 6, or DFI configuration of a DFI 710, 715 as described with reference to FIG. 7.

The first wireless device may transmit second uplink control information (UCI) 820 to the second wireless device. In some examples, various communications may occur between the transmission of the DFI 815 and the transmission of the second UCI 820, including communications related to scheduled uplink transmissions (e.g., uplink grants or uplink transmissions).

The second UCI 820 may indicate a retransmission mode. For example, the DFI 815 may identify one or more CBGs included in the first AUL transmission 810 were not properly received (e.g., by including a negative acknowledgement for the one or more CBGs in the DFI 815). The second UCI 820 may indicate whether the first wireless device will re-transmit only the one or more CBGs identified as not having been properly received, or whether the first wireless device will re-transmit entire transport blocks including the one or more CBGs identified as not having been properly received.

In some examples, the second UCI 820 may include a CBGTI to indicate which CBGs will be re-transmitted. The CBGTI may be included in the second UCI 820 when CBG-based transmission is configured for AUL transmissions.

In some examples, the CBGTI may be a bitmap indicating which CBGs will be re-transmitted. For example, DFI 815 may include a DFI bitmap 830 (1100), indicating that the first two CBGs were properly received and the last two CBGs were not properly received. The second UCI 820 may include a CBGTI bitmap (0011), indicating that the first two CBGs will not be re-transmitted and the last two CBGs will be transmitted. The CBGTI bitmap may include the same number of bits as the number of CBGs included in the first AUL transmission 810.

In some other examples, the second UCI 820 may include a flag indicating whether the first wireless device will retransmit the entire transport block or will follow the DFI 815 by re-transmitting only the CBGs which were not properly received. The first wireless device may configure the flag based at least in part on whether the first wireless device is able to properly decode DFI 815. When the first wireless device is not able to decode DFI 815, the first wireless device may indicate that transport block level retransmission will be applied. In some examples, the flag may be a 0 when transport block-level retransmission will be applied, and may be a 1 when CBG retransmission will follow the DFI 815.

The first wireless device may transmit a second AUL transmission 825. The second AUL transmission 825 may re-transmit at least some of the information transmitted in the first AUL transmission 810. The second AUL transmission 825 may be configured as indicated in the second UCI 820. For example, when the second UCI 820 indicates that transport block level retransmission will be applied, the second AUL transmission 825 may include one or more of the transport blocks included in the first AUL transmission 810. When the second UCI 820 indicates that CBG-level retransmission will be applied, the second AUL transmission 825 may include one or more of the CBGs included in the first AUL transmission 810. In some examples, the second AUL transmission 825 may include CBGs identified in a CBGTI bitmap of the second UCI 820.

The first UCI 805 may include the same information described with reference to the second UCI 820, but may be based on a previous DFI transmission. The first AUL transmission 810 may include retransmissions of transport blocks or CBGs as indicated in the first UCI 805.

Figure 9:
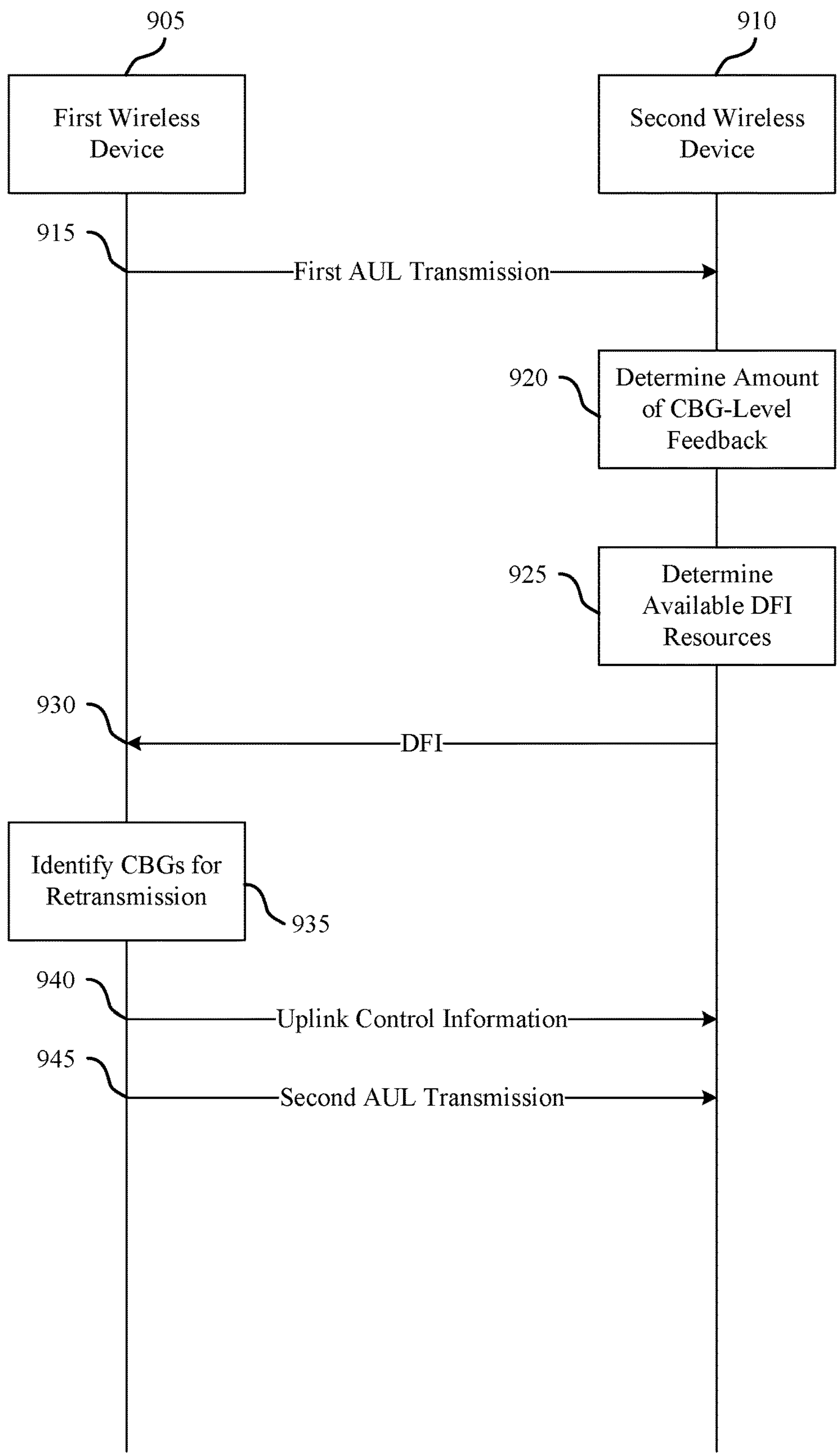
FIG. 9 illustrates an example of a communication flow in a wireless communications system that supports code block group-based autonomous uplink transmission in accordance with aspects of the present disclosure.

FIG. 9 illustrates an example of a communication flow 900 in a wireless communications system that supports code block group-based autonomous uplink transmission in accordance with aspects of the present disclosure. In some examples, the wireless communications system may implement aspects of wireless communication system 100.

The communication flow 900 shows communications between a first wireless device 905 and a second wireless device 910. The first wireless device may be an example of aspects of a UE 115 as described with reference to FIG. 1. The second wireless device may be an example of aspects of a base station 105 as described with reference to FIG. 1. The first wireless device may transmit to the second wireless device over one or more uplink channels, and the second wireless device may transmit to the first wireless device over one or more downlink channels.

The first wireless device may transmit a first AUL transmission 915 to the second wireless device. The first AUL transmission 915 may include one or more transport blocks, and each of the one or more transport blocks may include a plurality of code block groups, as described with reference to FIG. 3.

The second wireless device may determine an amount of CBG-level feedback for the first AUL transmission 915 at 920. The second wireless device may first identify CBGs that should be retransmitted. For example, the second wireless device may determine, for each CBG in the first AUL transmission 915, whether the CBG was properly received or should be retransmitted. The second wireless device may then identify the number of transport blocks for which CBG-level feedback should be transmitted based at least in part on the identified CBGs. For example, the second wireless device may identify each transport block that includes one of the identified CBGs as a transport block for which CBG-level feedback should be transmitted. The second wireless device may use the amount of CBG-level feedback to determine whether to transmit a single DFI, as described with reference to FIG. 4, or two or more DFIs, as described with reference to FIGS. 5-7.

The second wireless device may determine the resources available for transmission of DFI at 925. In some examples, the second wireless device may determine that resources are only available for transmission of a first amount of CBG-level feedback (e.g., a single DFI), but the amount of CBG-level feedback to be sent is greater than the first amount of CBG-level feedback. In such examples, the second wireless device may need to select CBG-level feedback to be included in transmitted DFIs. The second wireless device may select the first amount of CBG-level feedback based at least in part on an order of transport blocks and/or CBGs in the first AUL transmission 915, a priority level of the transport blocks and/or CBGs which were not properly received, a number of CBGs in each transport block that were not properly received, and/or a modulation and coding scheme (MCS).

The second wireless device may transmit DFI 930 to the first wireless device. In some examples, the DFI 930 may be an example of aspects of a single stage DFI as described with reference to FIG. 4. In some other examples, the DFI 930 may be an example of aspects of a multi-stage DFI 930 as described with reference to FIGS. 5-7.

The first wireless device may identify CBGs for retransmission at 935. In some examples, the first wireless device may identify the CBGs for retransmission based at least in part on the DFI 930. In some examples, the first wireless device may identify the CBGs for retransmission based at least in part on a retransmission mode. For example, in a first retransmission mode, the first wireless device may determine to retransmit all CBGs in a transport block for which a negative acknowledgement was received. In a second retransmission mode, the first wireless device may determine to retransmit only CBGs for which a negative acknowledgement was received. In some examples, the first wireless device may select a subset of the CBGs for which a negative acknowledgement was received for retransmission.

The first wireless device may transmit UCI 940 to the second wireless device. In some examples, the UCI 940 may include a flag indicating whether the first wireless device will retransmit the entire transport block or will follow the DFI 930 by re-transmitting only the CBGs which were not properly received, as described with reference to FIG. 8. In some examples, the UCI 940 may include a CBGTI as described with reference to FIG. 8, e.g., bitmap indicating which CBGs will be re-transmitted. The CBGs identified in the bitmap may be the CBGs identified at 935.

The first wireless device may transmit a second AUL transmission 945 to the second wireless device. The second AUL transmission 945 may include retransmission of one or more transport blocks and/or CBGs included in the first AUL transmission 915. The inclusion of entire transport blocks or only specific CBGs may correspond to the retransmission mode indicated in the UCI 940.

Figure 10:
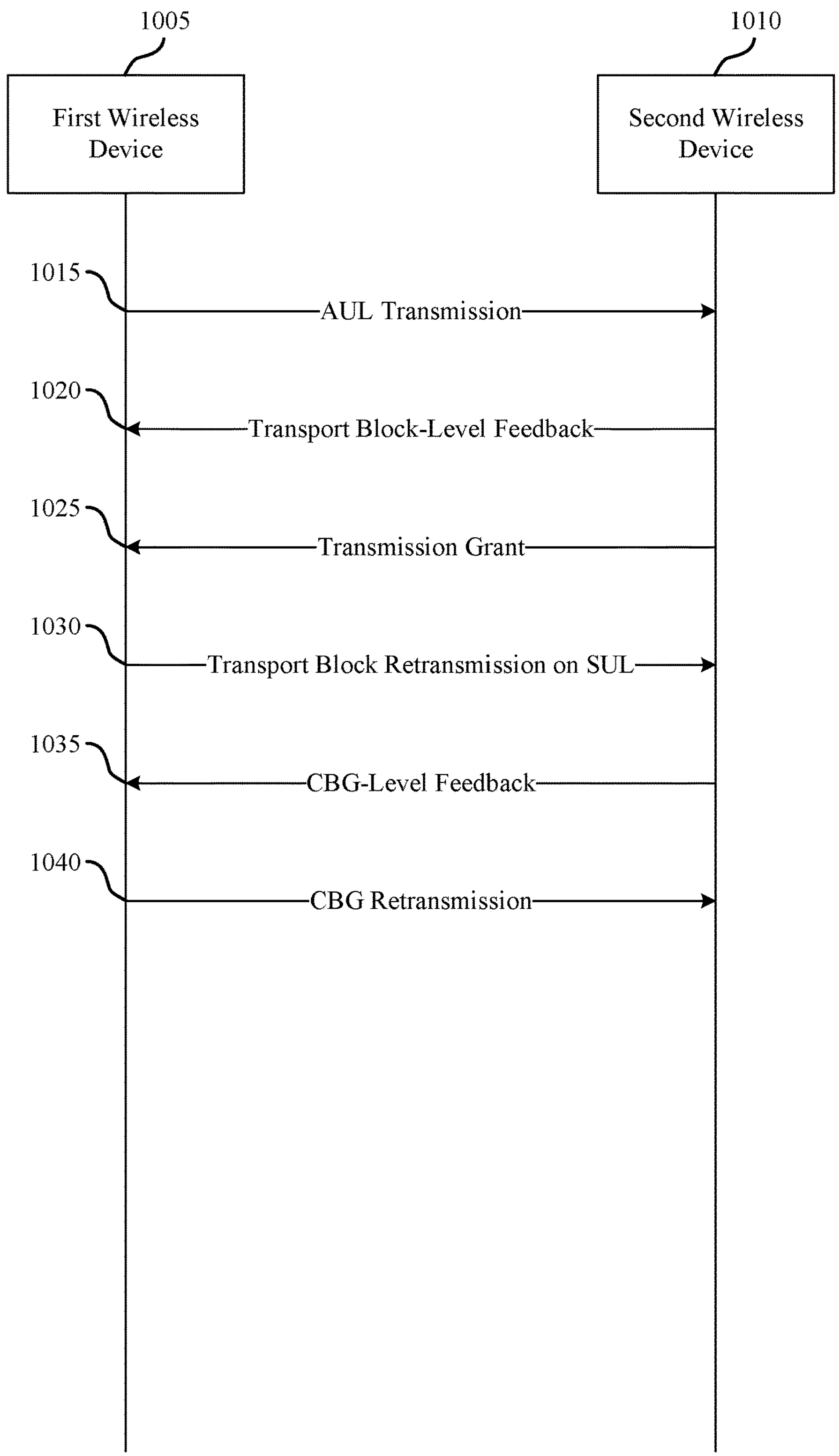
FIG. 10 illustrates an example of a communication flow in a wireless communications system that supports code block group-based autonomous uplink transmission in accordance with aspects of the present disclosure.

FIG. 10 illustrates an example of a communication flow 1000 in a wireless communications system that supports code block group-based autonomous uplink transmission in accordance with aspects of the present disclosure. In some examples, the wireless communications system may implement aspects of wireless communication system 100.

The communication flow 1000 shows communications between a first wireless device 1005 and a second wireless device 1010. The first wireless device may be an example of aspects of a UE 115 as described with reference to FIG. 1. The second wireless device may be an example of aspects of a base station 105 as described with reference to FIG. 1. The first wireless device may transmit to the second wireless device over one or more uplink channels, and the second wireless device may transmit to the first wireless device over one or more downlink channels.

The first wireless device may transmit an AUL transmission 1015 to the second wireless device. The AUL transmission 1015 may include one or more transport blocks, and each of the one or more transport blocks may include a plurality of code block groups, as described with reference to FIG. 3.

The second wireless device 1010 may transmit transport block-level feedback 1020 to the first wireless device 1005. The transport block-level feedback 1020 may include transport block-level feedback (e.g., an acknowledgement status) for one or more transport blocks included in the AUL transmission 1015. For example, the transport block-level feedback may include a bitmap indicating an acknowledgement status for one or more transport blocks in the AUL transmission 1015, as described above with reference to FIG. 4. The transport block-level feedback 1020 may be included in a DFI, which may be a standard transport block-level DFI.

The second wireless device 1010 may transmit a transmission grant 1025 to the first wireless device 1005. The transmission grant 1025 may identify resources (e.g., time and frequency resources) on an uplink channel that the first wireless device 1005 may use for uplink transmissions. In some examples, the transmission grant 1025 may also identify a transport block that is to be retransmitted using the resources. The transport block may be a transport block identified in the transport block-level feedback 1020 as not having been properly received.

The first wireless device 1005 may transmit a transport block retransmission 1030 to the second wireless device 1010. The transport block retransmission 1030 may include a transport block that was transmitted in AUL transmission 1015. The transport block retransmission 1030 may be transmitted using the resources identified in the transmission grant 1025.

The second wireless device 1010 may transmit CBG-level feedback 1035 to the first wireless device 1005. The CBG-level feedback 1035 may indicate an acknowledgement status for each CBG in the transport block transmitted in the transport block retransmission 1030. For example, the CBG-level feedback 1035 may include a CBG-level bitmap for the transport block, which may be an example of aspects of first CBG-level bitmap 425 or second CBG-level bitmap 430 as described with reference to FIG. 4. In some examples, the CBG-level feedback 1035 may be transmitted in a DFI packet. In some other examples, the CBG-level feedback 1035 may be transmitted in a second transmission grant which also identifies resources (e.g., time and frequency resources) that the first wireless device 1005 may use to retransmit any CBGs which were not properly received.

The first wireless device 1005 may transmit a CBG retransmission 1040 to the second wireless device 1010. The CBG retransmission 1040 may include one or more CBGs in the transport block transmitted in the transport block retransmission 1030, and may not include one or more other CBGs in the transport block transmitted in the transport block retransmission 1030. For example, the CBG retransmission 1040 may include the CBGs identified in the CBG-level feedback 1035 as not having been properly received.

Figure 11:
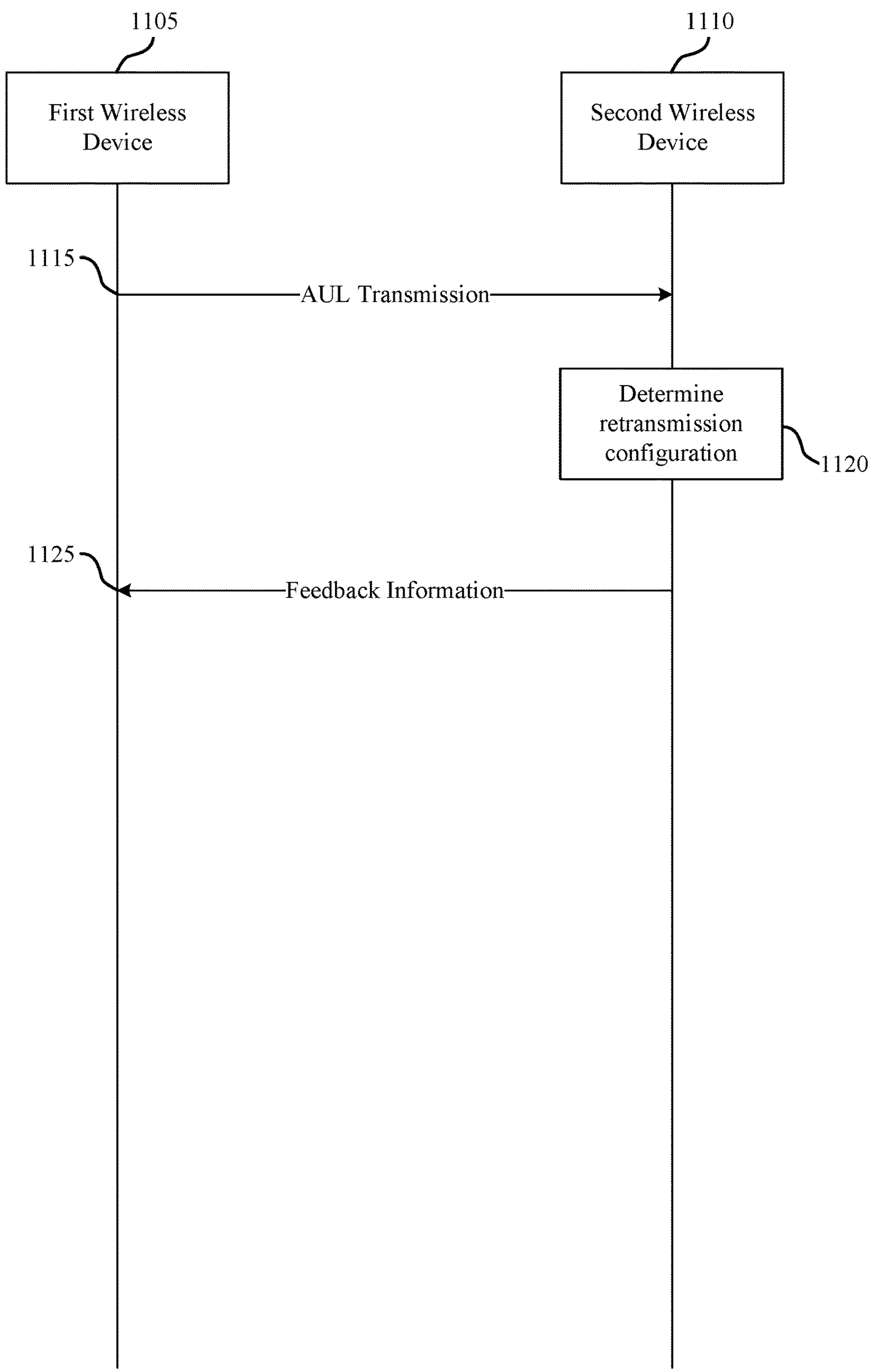
FIG. 11 illustrates an example of a communication flow in a wireless communications system that supports code block group-based autonomous uplink transmission in accordance with aspects of the present disclosure.

FIG. 11 illustrates an example of a communication flow 1100 in a wireless communications system that supports code block group-based autonomous uplink transmission in accordance with aspects of the present disclosure. In some examples, the wireless communications system may implement aspects of wireless communication system 100.

The communication flow 1100 shows communications between a first wireless device 1105 and a second wireless device 1110. The first wireless device may be an example of aspects of a UE 115 as described with reference to FIG. 1. The second wireless device may be an example of aspects of a base station 105 as described with reference to FIG. 1. The first wireless device may transmit to the second wireless device over one or more uplink channels, and the second wireless device may transmit to the first wireless device over one or more downlink channels.

The first wireless device 1105 may transmit an AUL transmission 1115 to the second wireless device. The AUL transmission 1115 may include one or more transport blocks, and each of the one or more transport blocks may include a plurality of code block groups, as described with reference to FIG. 3.

The second wireless device 1110 may determine a retransmission configuration at 1120. The retransmission configuration may be selected from at least two candidate retransmission configurations. A first candidate CBG-level retransmission configuration may be a configuration in which feedback includes CBG-level feedback for at least one of the transport blocks in the AUL transmission 1115 as described, for example, with reference to FIGS. 4 through 9. A second candidate CBG-level retransmission configuration may be a configuration in which feedback includes a scheduled uplink grant as described, for example, with reference to FIG. 10.

The second wireless device 1110 may transmit feedback information 1125 to the first wireless device 1105. The type of feedback information 1125 transmitted by the second wireless device 1110 may vary based at least in part on the selected candidate retransmission configuration. For example, when the second wireless device 1110 is configured in accordance with the first candidate CBG-level retransmission configuration, the feedback information 1125 may include DFI including CBG-level feedback information for one or more transport blocks in the AUL transmission 1115. For example, the feedback information 1125 may be an example of aspects of DFI configuration 400 as described with reference to FIG. 4, DFI 620 as described with reference to FIG. 6, or first DFI 710 and second DFI 715 as described with reference to FIG. 7. The first wireless device 1005 and second wireless device 1010 may thereafter continue communications as described, for example, with reference to FIG. 9. When the second wireless device 1110 is configured in accordance with the second candidate CBG-level retransmission configuration, the feedback information 1125 may include a transmission grant. For example, the feedback information 1125 may be an example of aspects of transport block-level feedback 1020 and transmission grant 1025 as described with reference to FIG. 10. The first wireless device 1005 and second wireless device 1010 may thereafter continue communications as described, for example, with reference to FIG. 10.

Figure 12:
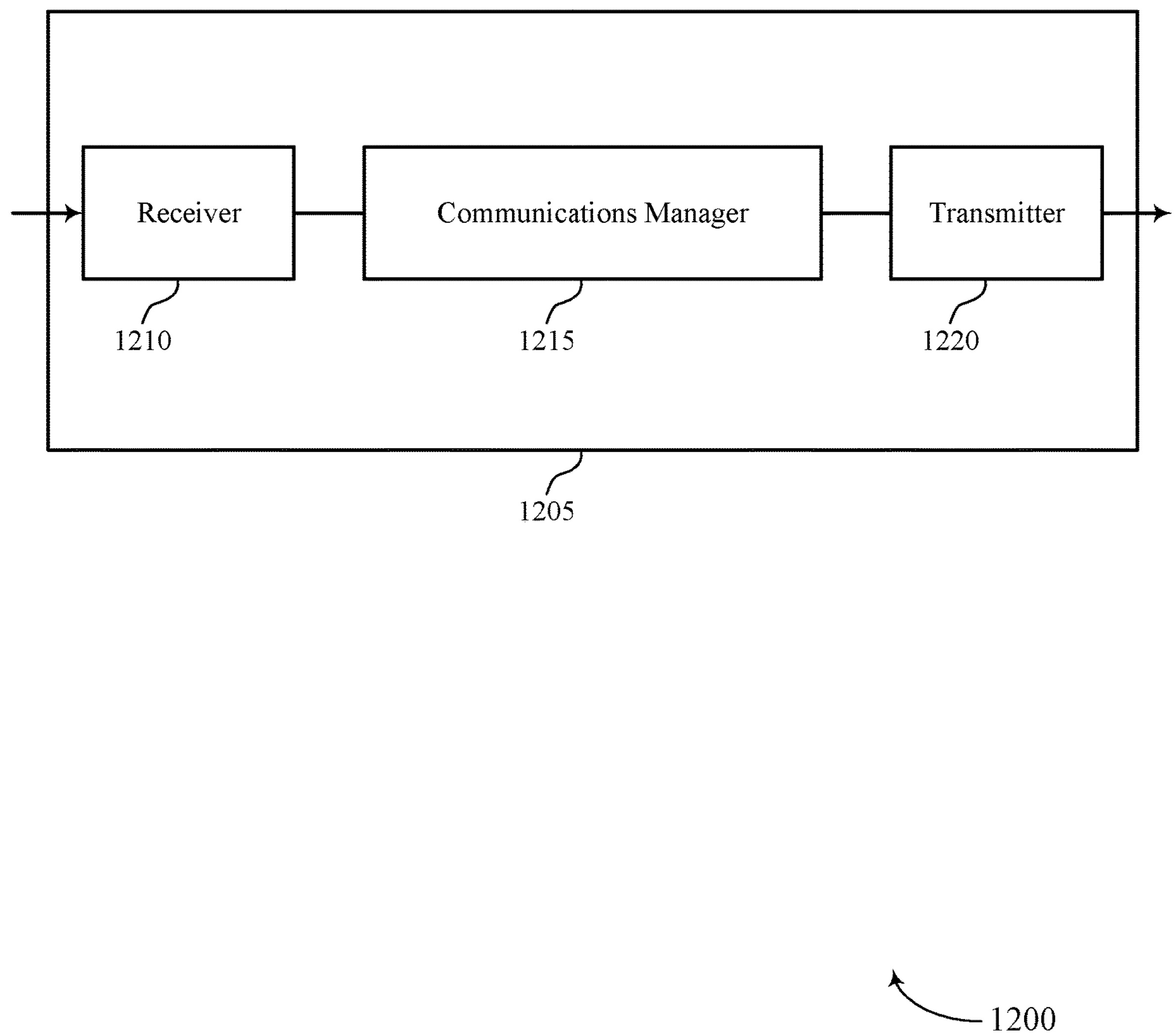
FIGS. 12 and 13 show block diagrams of devices that support code block group-based autonomous uplink transmission in accordance with aspects of the present disclosure.

FIG. 12 shows a block diagram 1200 of a device 1205 that supports code block group-based autonomous uplink transmission in accordance with aspects of the present disclosure. The device 1205 may be an example of aspects of a UE 115 as described herein. The device 1205 may include a receiver 1210, a communications manager 1215, and a transmitter 1220. The device 1205 may also include a processor. Each of these components may be in communication with one another (e.g., via one or more buses).

The receiver 1210 may receive information such as packets, user data, or control information associated with various information channels (e.g., control channels, data channels, and information related to code block group-based autonomous uplink transmission, etc.). Information may be passed on to other components of the device 1205. The receiver 1210 may be an example of aspects of the transceiver 1520 described with reference to FIG. 15. The receiver 1210 may utilize a single antenna or a set of antennas.

The communications manager 1215 may transmit, at a UE, one or more transport blocks via an autonomous uplink communication, each of the one or more transport blocks including a set of CBGs, receive one or more DFI packets, at least one of the one or more DFI packets including CBG-level feedback for at least one of the one or more transport blocks and being a same size as a DFI packet that does not include CBG-level feedback, and re-transmit CBGs for which negative feedback is indicated based on the one or more DFI packets. The communications manager 1215 may be an example of aspects of the communications manager 1510 described herein.

The communications manager 1215, or its sub-components, may be implemented in hardware, code (e.g., software or firmware) executed by a processor, or any combination thereof. If implemented in code executed by a processor, the functions of the communications manager 1215, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1215, or its sub-components, may be physically located at various positions, including being distributed such that portions of functions are implemented at different physical locations by one or more physical components. In some examples, the communications manager 1215, or its sub-components, may be a separate and distinct component in accordance with various aspects of the present disclosure. In some examples, the communications manager 1215, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1220 may transmit signals generated by other components of the device 1205. In some examples, the transmitter 1220 may be collocated with a receiver 1210 in a transceiver module. For example, the transmitter 1220 may be an example of aspects of the transceiver 1520 described with reference to FIG. 15. The transmitter 1220 may utilize a single antenna or a set of antennas.

Figure 13:
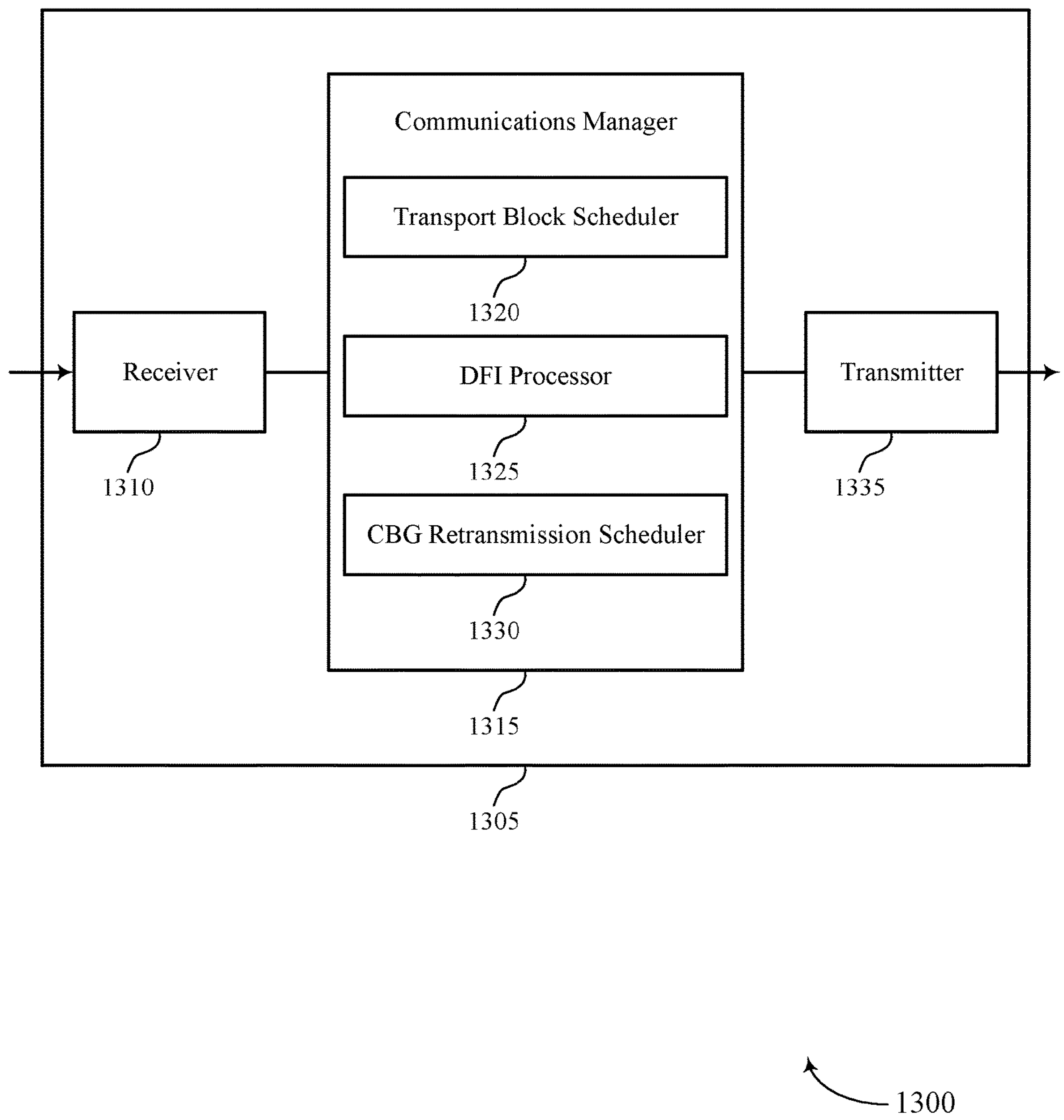

FIG. 13 shows a block diagram 1300 of a device 1305 that supports code block group-based autonomous uplink transmission in accordance with aspects of the present disclosure. The device 1305 may be an example of aspects of a device 1205 or a UE 115 as described herein. The device 1305 may include a receiver 1310, a communications manager 1315, and a transmitter 1335. The device 1305 may also include a processor. Each of these components may be in communication with one another (e.g., via one or more buses).

The receiver 1310 may receive information such as packets, user data, or control information associated with various information channels (e.g., control channels, data channels, and information related to code block group-based autonomous uplink transmission, etc.). Information may be passed on to other components of the device 1305. The receiver 1310 may be an example of aspects of the transceiver 1520 described with reference to FIG. 15. The receiver 1310 may utilize a single antenna or a set of antennas.

The communications manager 1315 may be an example of aspects of the communications manager 1215 as described herein. The communications manager 1315 may include a transport block scheduler 1320, a DFI processor 1325, and a CBG retransmission scheduler 1330. The communications manager 1315 may be an example of aspects of the communications manager 1510 described herein.

The transport block scheduler 1320 may transmit one or more transport blocks via an autonomous uplink communication, each of the one or more transport blocks including a set of CBGs.

The DFI processor 1325 may receive one or more DFI packets, at least one of the one or more DFI packets including CBG-level feedback for at least one of the one or more transport blocks and being a same size as a DFI packet that does not include CBG-level feedback.

The CBG retransmission scheduler 1330 may re-transmit CBGs for which negative feedback is indicated based on the one or more DFI packets.

The transmitter 1335 may transmit signals generated by other components of the device 1305. In some examples, the transmitter 1335 may be collocated with a receiver 1310 in a transceiver module. For example, the transmitter 1335 may be an example of aspects of the transceiver 1520 described with reference to FIG. 15. The transmitter 1335 may utilize a single antenna or a set of antennas.

Figure 14:
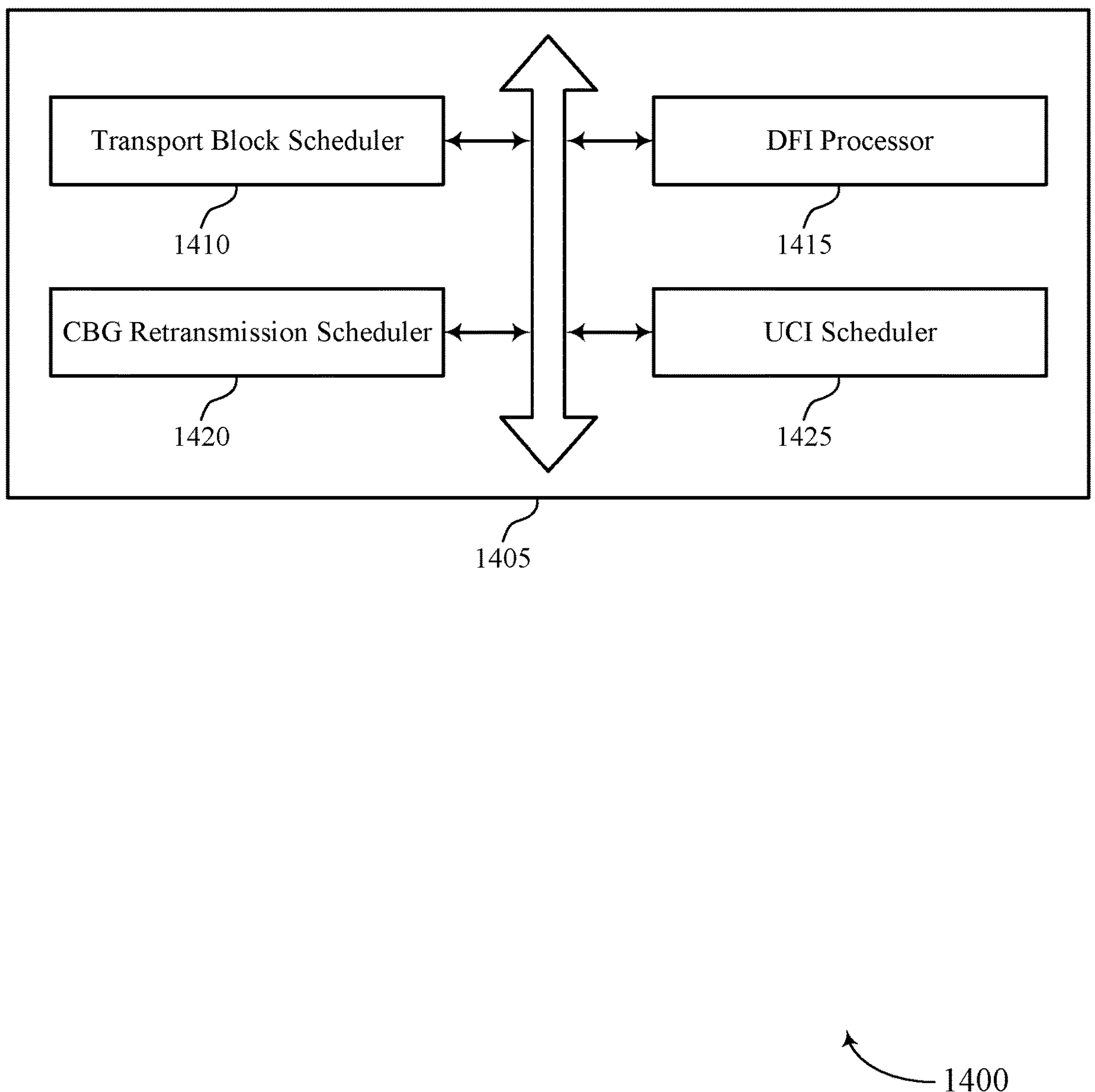
FIG. 14 shows a block diagram of a communications manager that supports code block group-based autonomous uplink transmission in accordance with aspects of the present disclosure.

FIG. 14 shows a block diagram 1400 of a communications manager 1405 that supports code block group-based autonomous uplink transmission in accordance with aspects of the present disclosure. The communications manager 1405 may be an example of aspects of a communications manager 1215, a communications manager 1315, or a communications manager 1510 described herein. The communications manager 1405 may include a transport block scheduler 1410, a DFI processor 1415, a CBG retransmission scheduler 1420, and an UCI scheduler 1425. Each of these modules may communicate, directly or indirectly, with one another (e.g., via one or more buses).

The transport block scheduler 1410 may transmit one or more transport blocks via an autonomous uplink communication, each of the one or more transport blocks including a set of CBGs.

The DFI processor 1415 may receive one or more DFI packets, at least one of the one or more DFI packets including CBG-level feedback for at least one of the one or more transport blocks and being a same size as a DFI packet that does not include CBG-level feedback.

In some examples, the DFI processor 1415 may receive a transport block-level feedback indicator for each of the one or more transport blocks. In some examples, the DFI processor 1415 may receive CBG-level feedback for the corresponding transport block. In some examples, the DFI processor 1415 may receive a first DFI packet, the first DFI packet including a first portion of the CBG-level feedback and an indication that a second DFI packet is to be transmitted. In some examples, the DFI processor 1415 may receive the second DFI packet including a second portion of the CBG-level feedback.

In some examples, the DFI processor 1415 may receive the first DFI packet in a first symbol in a first slot. In some examples, the DFI processor 1415 may receive the second DFI packet in a second symbol in the first slot. In some examples, the DFI processor 1415 may receive the first DFI packet in a first slot. In some examples, the DFI processor 1415 may receive the second DFI packet in a second slot.

In some cases, the first portion of CBG-level feedback includes CBG-level feedback for a first portion of the one or more transport blocks, while the second portion of CBG-level feedback includes CBG-level feedback for a second portion of the one or more transport blocks.

In some cases, the second DFI packet is received a pre-specified time period after the first DFI packet.

The CBG retransmission scheduler 1420 may re-transmit CBGs for which negative feedback is indicated based on the one or more DFI packets. The UCI scheduler 1425 may transmit uplink control information, the uplink control information including an indication of CBGs for retransmission.

In some cases, the indication of CBGs for retransmission includes a CBG bitmap identifying CBGs to be retransmitted. In some cases, the indication of CBGs for retransmission includes an indication of a retransmission mode. In some cases, the indication of a retransmission mode indicates whether the UE will re-transmit negative acknowledge transport blocks or negative acknowledgement CBGs.

Figure 15:
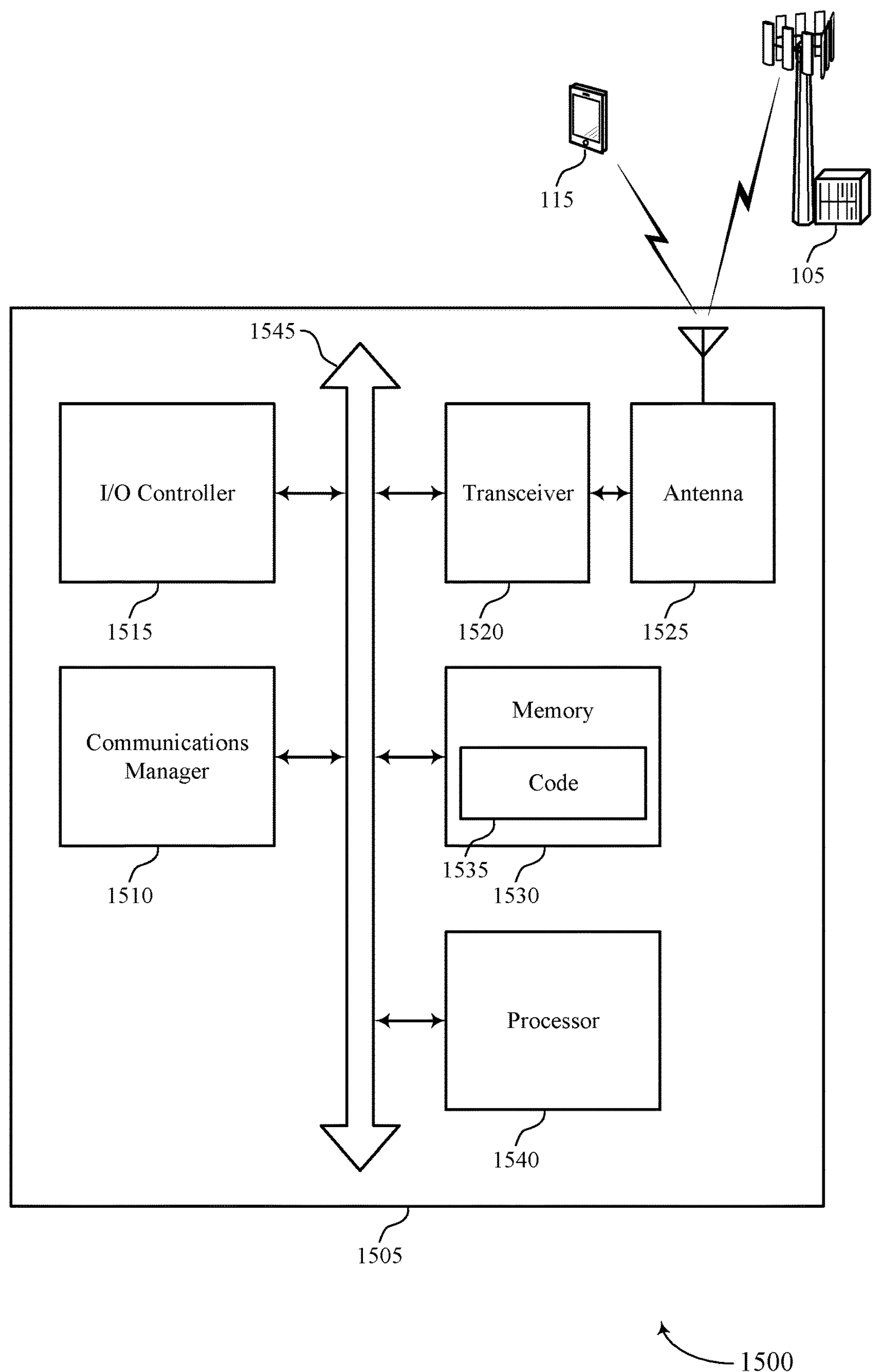
FIG. 15 shows a diagram of a system including a device that supports code block group-based autonomous uplink transmission in accordance with aspects of the present disclosure.

FIG. 15 shows a diagram of a system 1500 including a device 1505 that supports code block group-based autonomous uplink transmission in accordance with aspects of the present disclosure. The device 1505 may be an example of or include the components of device 1205, device 1305, or a UE 115 as described herein. The device 1505 may include components for bi-directional voice and data communications including components for transmitting and receiving communications, including a communications manager 1510, an I/O controller 1515, a transceiver 1520, an antenna 1525, memory 1530, and a processor 1540. These components may be in electronic communication via one or more buses (e.g., bus 1545).

The communications manager 1510 may transmit one or more transport blocks via an autonomous uplink communication, each of the one or more transport blocks including a set of CBGs, receive one or more DFI packets, at least one of the one or more DFI packets including CBG-level feedback for at least one of the one or more transport blocks and being a same size as a DFI packet that does not include CBG-level feedback, and re-transmit CBGs for which negative feedback is indicated based on the one or more DFI packets.

The I/O controller 1515 may manage input and output signals for the device 1505. The I/O controller 1515 may also manage peripherals not integrated into the device 1505. In some cases, the I/O controller 1515 may represent a physical connection or port to an external peripheral. In some cases, the I/O controller 1515 may utilize an operating system such as iOS®, ANDROID®, MS-DOS®, MS-WINDOWS®, OS/2®, UNIX®, LINUX®, or another known operating system. In other cases, the I/O controller 1515 may represent or interact with a modem, a keyboard, a mouse, a touchscreen, or a similar device. In some cases, the I/O controller 1515 may be implemented as part of a processor. In some cases, a user may interact with the device 1505 via the I/O controller 1515 or via hardware components controlled by the I/O controller 1515.

The transceiver 1520 may communicate bi-directionally, via one or more antennas, wired, or wireless links as described above. For example, the transceiver 1520 may represent a wireless transceiver and may communicate bi-directionally with another wireless transceiver. The transceiver 1520 may also include a modem to modulate the packets and provide the modulated packets to the antennas for transmission, and to demodulate packets received from the antennas.

In some cases, the wireless device may include a single antenna 1525. However, in some cases the device may have more than one antenna 1525, which may be capable of concurrently transmitting or receiving multiple wireless transmissions.

The memory 1530 may include RAM and ROM. The memory 1530 may store computer-readable, computer-executable code 1535 including instructions that, when executed, cause the processor to perform various functions described herein. In some cases, the memory 1530 may contain, among other things, a BIOS which may control basic hardware or software operation such as the interaction with peripheral components or devices.

The processor 1540 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1540 may be configured to operate a memory array using a memory controller. In other cases, a memory controller may be integrated into the processor 1540. The processor 1540 may be configured to execute computer-readable instructions stored in a memory (e.g., the memory 1530) to cause the device 1505 to perform various functions (e.g., functions or tasks supporting code block group-based autonomous uplink transmission).

The code 1535 may include instructions to implement aspects of the present disclosure, including instructions to support wireless communications. The code 1535 may be stored in a non-transitory computer-readable medium such as system memory or other type of memory. In some cases, the code 1535 may not be directly executable by the processor 1540 but may cause a computer (e.g., when compiled and executed) to perform functions described herein.

Figure 16:
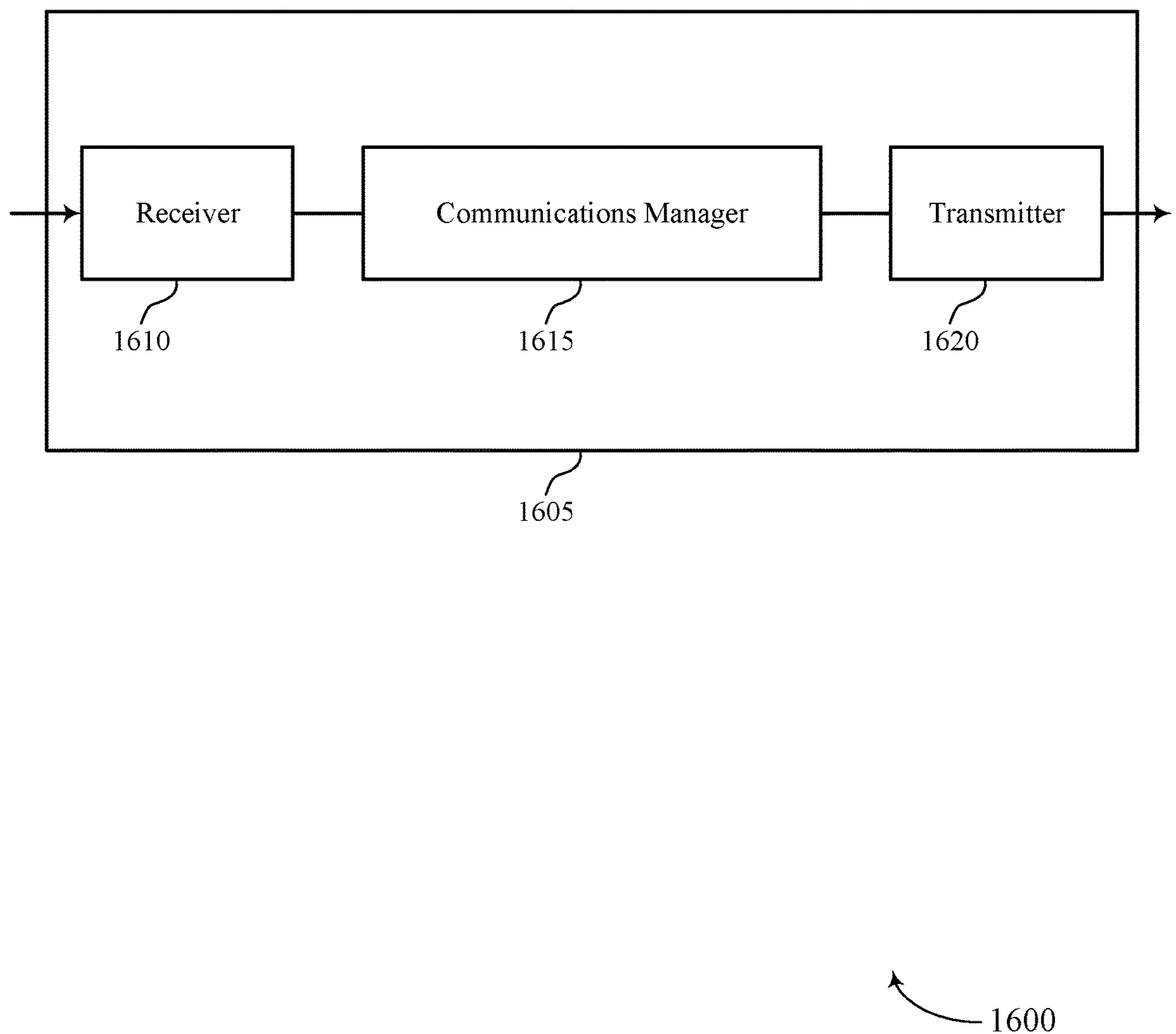
FIGS. 16 and 17 show block diagrams of devices that support code block group-based autonomous uplink transmission in accordance with aspects of the present disclosure.

FIG. 16 shows a block diagram 1600 of a device 1605 that supports code block group-based autonomous uplink transmission in accordance with aspects of the present disclosure. The device 1605 may be an example of aspects of a base station 105 as described herein. The device 1605 may include a receiver 1610, a communications manager 1615, and a transmitter 1620. The device 1605 may also include a processor. Each of these components may be in communication with one another (e.g., via one or more buses).

The receiver 1610 may receive information such as packets, user data, or control information associated with various information channels (e.g., control channels, data channels, and information related to code block group-based autonomous uplink transmission, etc.). Information may be passed on to other components of the device 1605. The receiver 1610 may be an example of aspects of the transceiver 1920 described with reference to FIG. 19. The receiver 1610 may utilize a single antenna or a set of antennas.

The communications manager 1615 may receive, at a base station, one or more transport blocks via an autonomous uplink communication, each of the one or more transport blocks including a set of CBGs, transmit one or more DFI packets, at least one of the one or more DFI packets including CBG-level feedback for at least one of the one or more transport blocks and being a same size as a DFI packet that does not include CBG-level feedback, and receive re-transmissions of CBGs for which negative feedback is indicated. The communications manager 1615 may also receive, at a base station, one or more transport blocks via an autonomous uplink communication, each of the one or more transport blocks including a set of CBGs, transmit feedback information, the feedback information including transport block-level feedback for at least one of the one or more transport blocks, determine to implement CBG-based retransmission of the one or more transport blocks, and transmit an uplink transmission grant based on the determining. The communications manager 1615 may also receive, at a base station, one or more transport blocks via an autonomous uplink communication, each of the one or more transport blocks including a set of CBGs, select a CBG-level retransmission mode from at least two candidate CBG-level retransmission modes, and transmit feedback information based on the selected CBG-level retransmission mode. The communications manager 1615 may be an example of aspects of the communications manager 1910 described herein.

The communications manager 1615, or its sub-components, may be implemented in hardware, code (e.g., software or firmware) executed by a processor, or any combination thereof. If implemented in code executed by a processor, the functions of the communications manager 1615, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1615, or its sub-components, may be physically located at various positions, including being distributed such that portions of functions are implemented at different physical locations by one or more physical components. In some examples, the communications manager 1615, or its sub-components, may be a separate and distinct component in accordance with various aspects of the present disclosure. In some examples, the communications manager 1615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1620 may transmit signals generated by other components of the device 1605. In some examples, the transmitter 1620 may be collocated with a receiver 1610 in a transceiver module. For example, the transmitter 1620 may be an example of aspects of the transceiver 1920 described with reference to FIG. 19. The transmitter 1620 may utilize a single antenna or a set of antennas.

Figure 17:
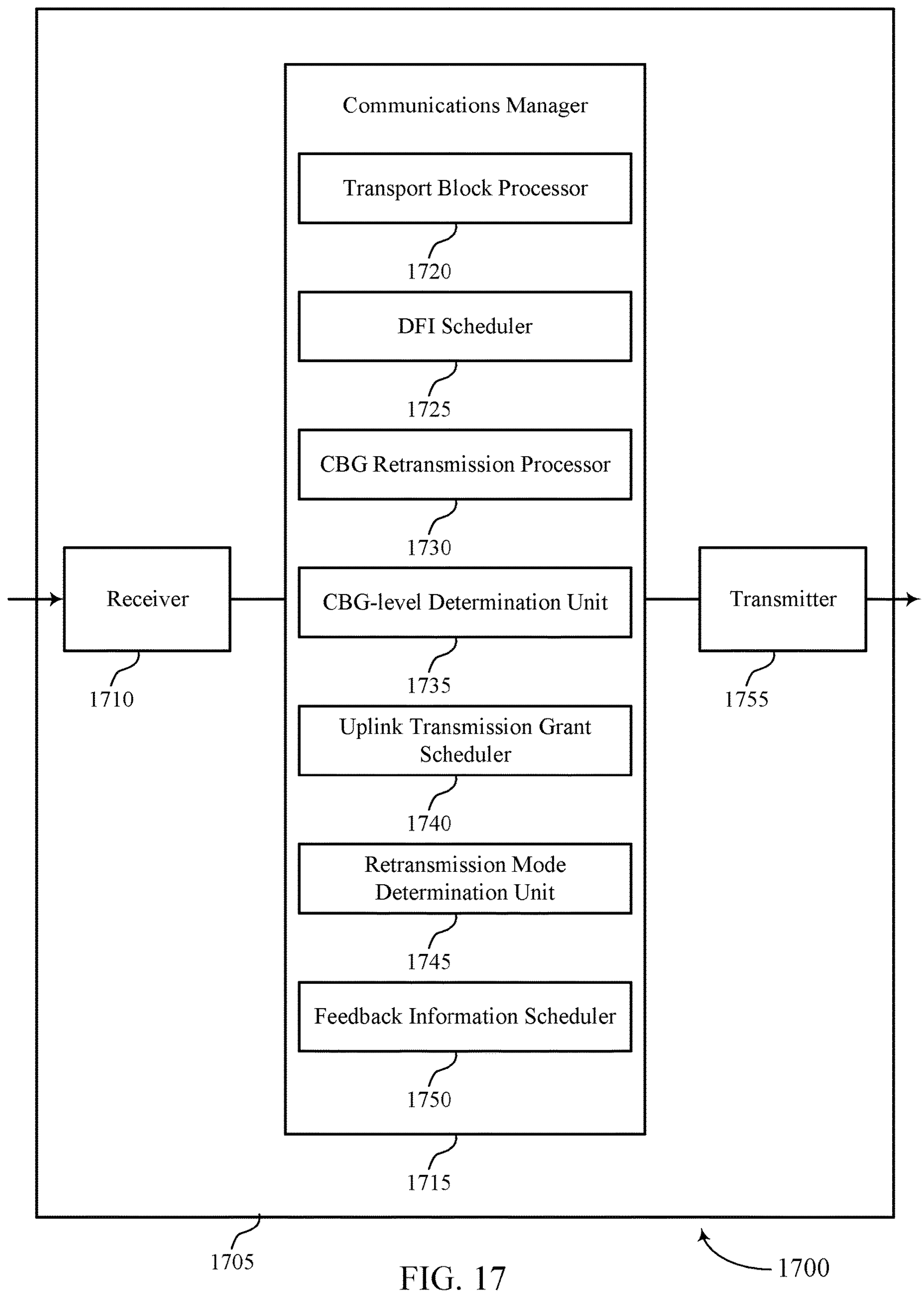

FIG. 17 shows a block diagram 1700 of a device 1705 that supports code block group-based autonomous uplink transmission in accordance with aspects of the present disclosure. The device 1705 may be an example of aspects of a device 1605 or a base station 105 as described herein. The device 1705 may include a receiver 1710, a communications manager 1715, and a transmitter 1755. The device 1705 may also include a processor. Each of these components may be in communication with one another (e.g., via one or more buses).

The receiver 1710 may receive information such as packets, user data, or control information associated with various information channels (e.g., control channels, data channels, and information related to code block group-based autonomous uplink transmission, etc.). Information may be passed on to other components of the device 1705. The receiver 1710 may be an example of aspects of the transceiver 1920 described with reference to FIG. 19. The receiver 1710 may utilize a single antenna or a set of antennas.

The communications manager 1715 may be an example of aspects of the communications manager 1615 as described herein. The communications manager 1715 may include a transport block processor 1720, a DFI scheduler 1725, a CBG retransmission processor 1730, a CBG-level determination unit 1735, an uplink transmission grant scheduler 1740, a retransmission mode determination unit 1745, and a feedback information scheduler 1750. The communications manager 1715 may be an example of aspects of the communications manager 1910 described herein.

The transport block processor 1720 may receive one or more transport blocks via an autonomous uplink communication, each of the one or more transport blocks including a set of CBGs.

The DFI scheduler 1725 may transmit one or more DFI packets, at least one of the one or more DFI packets including CBG-level feedback for at least one of the one or more transport blocks and being a same size as a DFI packet that does not include CBG-level feedback.

The CBG retransmission processor 1730 may receive re-transmissions of CBGs for which negative feedback is indicated.

The transport block processor 1720 may receive one or more transport blocks via an autonomous uplink communication, each of the one or more transport blocks including a set of CBGs.

The DFI scheduler 1725 may transmit feedback information, the feedback information including transport block-level feedback for at least one of the one or more transport blocks.

The CBG-level determination unit 1735 may determine to implement CBG-based retransmission of the one or more transport blocks. The uplink transmission grant scheduler 1740 may transmit an uplink transmission grant based on the determining by the CBG-level determination unit 1735.

The transport block processor 1720 may receive, at a base station, one or more transport blocks via an autonomous uplink communication, each of the one or more transport blocks including a set of CBGs. The retransmission mode determination unit 1745 may select a CBG-level retransmission mode from at least two candidate CBG-level retransmission modes. The feedback information scheduler 1750 may transmit feedback information based on the selected CBG-level retransmission mode.

The transmitter 1755 may transmit signals generated by other components of the device 1705. In some examples, the transmitter 1755 may be collocated with a receiver 1710 in a transceiver module. For example, the transmitter 1755 may be an example of aspects of the transceiver 1920 described with reference to FIG. 19. The transmitter 1755 may utilize a single antenna or a set of antennas.

Figure 18:
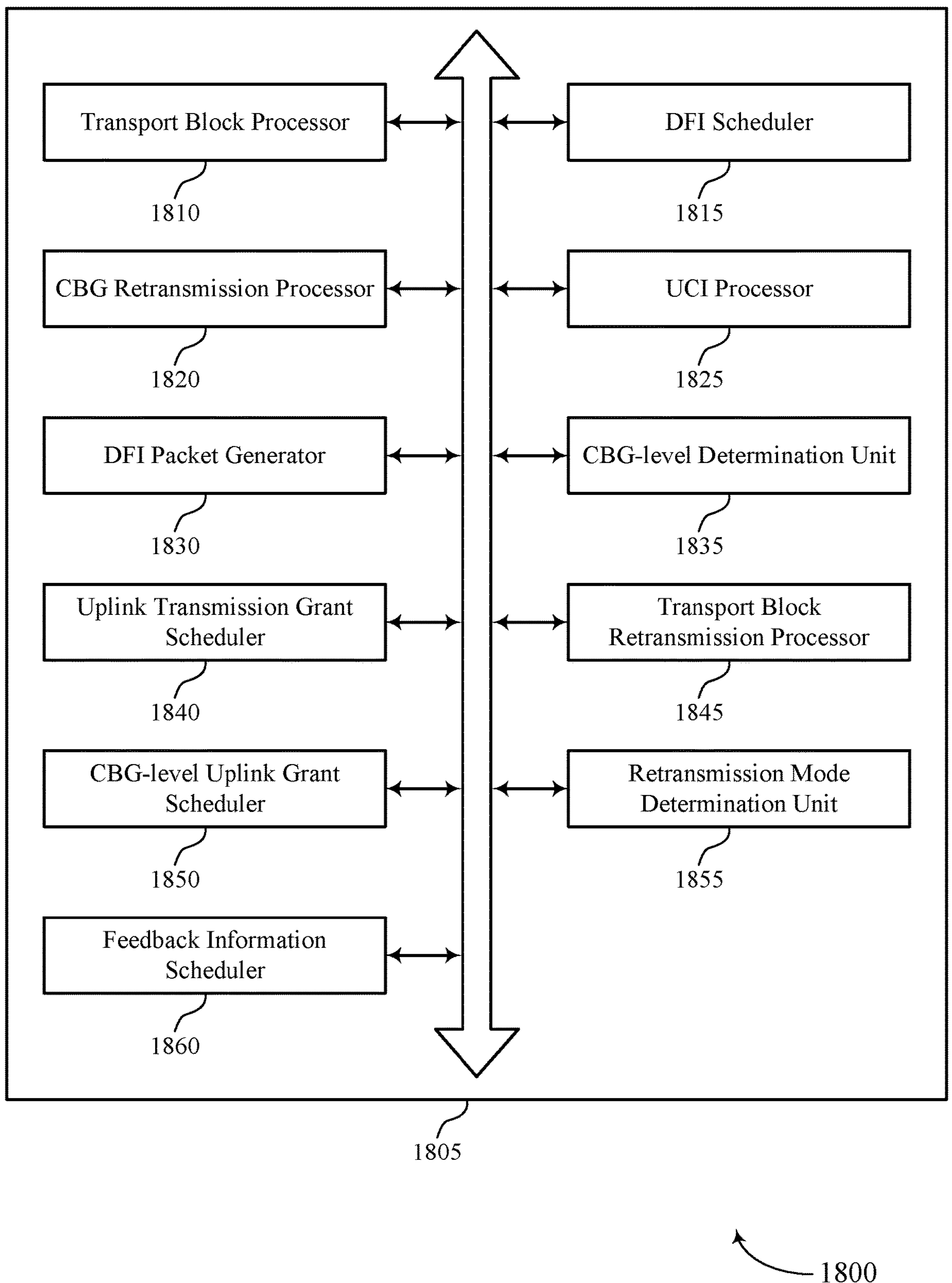
FIG. 18 shows a block diagram of a communications manager that supports code block group-based autonomous uplink transmission in accordance with aspects of the present disclosure.

FIG. 18 shows a block diagram 1800 of a communications manager 1805 that supports code block group-based autonomous uplink transmission in accordance with aspects of the present disclosure. The communications manager 1805 may be an example of aspects of a communications manager 1615, a communications manager 1715, or a communications manager 1910 described herein. The communications manager 1805 may include a transport block processor 1810, a DFI scheduler 1815, a CBG retransmission processor 1820, an UCI processor 1825, a DFI packet generator 1830, a CBG-level determination unit 1835, an uplink transmission grant scheduler 1840, a transport block retransmission processor 1845, a CBG-level uplink grant scheduler 1850, a retransmission mode determination unit 1855, and a feedback information scheduler 1860. Each of these modules may communicate, directly or indirectly, with one another (e.g., via one or more buses).

The transport block processor 1810 may receive, at a base station, one or more transport blocks via an autonomous uplink communication, each of the one or more transport blocks including a set of CBGs. In some examples, the transport block processor 1810 may receive, at a base station, one or more transport blocks via an autonomous uplink communication, each of the one or more transport blocks including a set of CBGs. In some examples, the transport block processor 1810 may receive, at a base station, one or more transport blocks via an autonomous uplink communication, each of the one or more transport blocks including a set of CBGs.

The DFI scheduler 1815 may transmit one or more DFI packets, at least one of the one or more DFI packets including CBG-level feedback for at least one of the one or more transport blocks and being a same size as a DFI packet that does not include CBG-level feedback.

In some examples, the DFI scheduler 1815 may transmit feedback information, the feedback information including transport block-level feedback for at least one of the one or more transport blocks. In some examples, the DFI scheduler 1815 may transmit a transport block-level feedback indicator for each of the one or more transport blocks. In some examples, the DFI scheduler 1815 may transmit a CBG-level feedback indicator for the corresponding transport block. In some examples, the DFI scheduler 1815 may transmit a first DFI packet, the first DFI packet including a first portion of the CBG-level feedback and an indication that a second DFI packet is to be transmitted. In some examples, the DFI scheduler 1815 may transmit the second DFI packet including a second portion of the CBG-level feedback.

In some examples, the DFI scheduler 1815 may transmit the first DFI packet in a first symbol in a first slot. In some examples, the DFI scheduler 1815 may transmit the second DFI packet in a second symbol in the first slot. In some examples, the DFI scheduler 1815 may transmit the first DFI packet in a first slot. In some examples, the DFI scheduler 1815 may transmit the second DFI packet in a second slot.

In some examples, the DFI scheduler 1815 may transmit the second DFI packet a pre-specified time period after the first DFI packet.

In some cases, the first portion of CBG-level feedback includes CBG-level feedback for a first portion of the one or more transport blocks, and the second portion of CBG-level feedback includes CBG-level feedback for a second portion of the one or more transport blocks.

The CBG retransmission processor 1820 may receive re-transmissions of CBGs for which negative feedback is indicated. The CBG-level determination unit 1835 may determine to implement CBG-based retransmission of the one or more transport blocks.

The uplink transmission grant scheduler 1840 may transmit an uplink transmission grant based on the determining. In some cases, the uplink transmission grant includes an indication of at least one of the one or more transport blocks to be retransmitted.

The retransmission mode determination unit 1855 may select a CBG-level retransmission mode from at least two candidate CBG-level retransmission modes. In some examples, selecting the CBG-level retransmission mode includes selecting the first candidate CBG-level retransmission mode. In some examples, selecting the CBG-level retransmission mode includes selecting the second candidate CBG-level retransmission mode. In some cases, a first candidate CBG-level retransmission mode where the feedback information includes CBG-level feedback for at least one of the one or more transport blocks. In some cases, a second candidate CBG-level retransmission mode where the feedback information includes a scheduled uplink grant.

The feedback information scheduler 1860 may transmit feedback information based on the selected CBG-level retransmission mode. In some examples, the feedback information scheduler 1860 may transmit a transport block-level feedback indicator for each of the one or more transport blocks, where at least one of the transport block-level feedback indicators indicates a negative acknowledgement for a corresponding transport block.

In some examples, the feedback information scheduler 1860 may transmit a CBG-level feedback indicator for the corresponding transport block. In some examples, the feedback information scheduler 1860 may transmit the first feedback information message in a first symbol in a first slot. In some examples, the feedback information scheduler 1860 may transmit the second feedback information message in a second symbol in the first slot.

In some examples, the feedback information scheduler 1860 may transmit the first feedback information message in a first slot. In some examples, the feedback information scheduler 1860 may transmit the second feedback information message in a second slot.

In some examples, the feedback information scheduler 1860 may transmit a scheduled uplink grant based on determining to implement CBG-based retransmission.

In some examples, the feedback information scheduler 1860 may transmit a first feedback information message, the first feedback information message including a first portion of the feedback information and an indication that a second feedback information message is to be transmitted. In some examples, the feedback information scheduler 1860 may transmit the second feedback information message including a second portion of the feedback information.

The UCI processor 1825 may receive uplink control information, the uplink control information including an indication of CBGs for retransmission. In some cases, the indication of CBGs for retransmission includes a CBG bitmap identifying CBGs to be retransmitted. In some cases, the indication of CBGs for retransmission includes an indication of a retransmission mode. In some cases, the indication of a retransmission mode indicates whether the UE will re-transmit negative acknowledge transport blocks or negative acknowledgement CBGs.

The DFI packet generator 1830 may generate the one or more DFI packets based on an autonomous CBG configuration. In some cases, the autonomous CBG configuration includes a same number of CBGs as is included in a CBG configuration for a scheduled uplink transmission. In some cases, the autonomous CBG configuration includes a number of CBGs that is independent of a number of CBGs included in a CBG configuration for a scheduled uplink transmission. In some cases, the number of CBGs included in the autonomous CBG configuration is less than the number of CBGs included in the CBG configuration for the scheduled uplink transmission.

The transport block retransmission processor 1845 may receive a retransmission of at least one transport block of the one or more transport blocks based on the uplink transmission grant.

The CBG-level uplink grant scheduler 1850 may transmit a second uplink transmission grant, the second transmission grant including CBG-level feedback for the at least one transport block.

Figure 19:
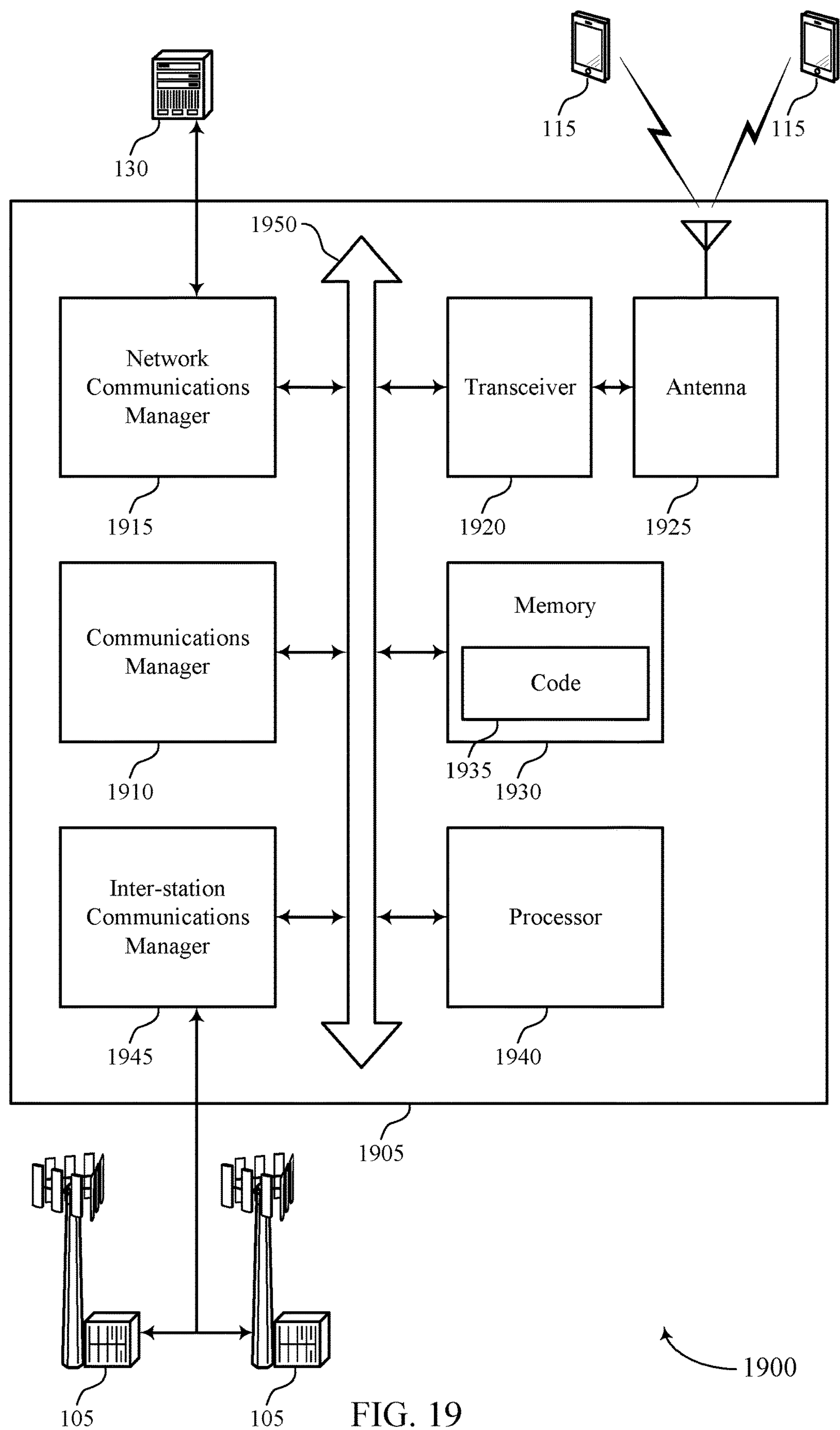
FIG. 19 shows a diagram of a system including a device that supports code block group-based autonomous uplink transmission in accordance with aspects of the present disclosure.

FIG. 19 shows a diagram of a system 1900 including a device 1905 that supports code block group-based autonomous uplink transmission in accordance with aspects of the present disclosure. The device 1905 may be an example of or include the components of device 1605, device 1705, or a base station 105 as described herein. The device 1905 may include components for bi-directional voice and data communications including components for transmitting and receiving communications, including a communications manager 1910, a network communications manager 1915, a transceiver 1920, an antenna 1925, memory 1930, a processor 1940, and an inter-station communications manager 1945. These components may be in electronic communication via one or more buses (e.g., bus 1950).

The communications manager 1910 may receive one or more transport blocks via an autonomous uplink communication, each of the one or more transport blocks including a set of CBGs, transmit one or more DFI packets, at least one of the one or more DFI packets including CBG-level feedback for at least one of the one or more transport blocks and being a same size as a DFI packet that does not include CBG-level feedback, and receive re-transmissions of CBGs for which negative feedback is indicated. The communications manager 1910 may also receive one or more transport blocks via an autonomous uplink communication, each of the one or more transport blocks including a set of CBGs, transmit feedback information, the feedback information including transport block-level feedback for at least one of the one or more transport blocks, determine to implement CBG-based retransmission of the one or more transport blocks, and transmit an uplink transmission grant based on the determining. The communications manager 1910 may also receive one or more transport blocks via an autonomous uplink communication, each of the one or more transport blocks including a set of CBGs, select a CBG-level retransmission mode from at least two candidate CBG-level retransmission modes, and transmit feedback information based on the selected CBG-level retransmission mode.

The network communications manager 1915 may manage communications with the core network (e.g., via one or more wired backhaul links). For example, the network communications manager 1915 may manage the transfer of data communications for client devices, such as one or more UEs 115.

The transceiver 1920 may communicate bi-directionally, via one or more antennas, wired, or wireless links as described above. For example, the transceiver 1920 may represent a wireless transceiver and may communicate bi-directionally with another wireless transceiver. The transceiver 1920 may also include a modem to modulate the packets and provide the modulated packets to the antennas for transmission, and to demodulate packets received from the antennas.

In some cases, the wireless device may include a single antenna 1925. However, in some cases the device may have more than one antenna 1925, which may be capable of concurrently transmitting or receiving multiple wireless transmissions.

The memory 1930 may include RAM, ROM, or a combination thereof. The memory 1930 may store computer-readable code 1935 including instructions that, when executed by a processor (e.g., the processor 1940) cause the device to perform various functions described herein. In some cases, the memory 1930 may contain, among other things, a BIOS which may control basic hardware or software operation such as the interaction with peripheral components or devices.

The processor 1940 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1940 may be configured to operate a memory array using a memory controller. In some cases, a memory controller may be integrated into processor 1940. The processor 1940 may be configured to execute computer-readable instructions stored in a memory (e.g., the memory 1930) to cause the device #{device} to perform various functions (e.g., functions or tasks supporting code block group-based autonomous uplink transmission).

The inter-station communications manager 1945 may manage communications with other base station 105, and may include a controller or scheduler for controlling communications with UEs 115 in cooperation with other base stations 105. For example, the inter-station communications manager 1945 may coordinate scheduling for transmissions to UEs 115 for various interference mitigation techniques such as beamforming or joint transmission. In some examples, the inter-station communications manager 1945 may provide an X2 interface within an LTE/LTE-A wireless communication network technology to provide communication between base stations 105.

The code 1935 may include instructions to implement aspects of the present disclosure, including instructions to support wireless communications. The code 1935 may be stored in a non-transitory computer-readable medium such as system memory or other type of memory. In some cases, the code 1935 may not be directly executable by the processor 1940 but may cause a computer (e.g., when compiled and executed) to perform functions described herein.

Figure 20:
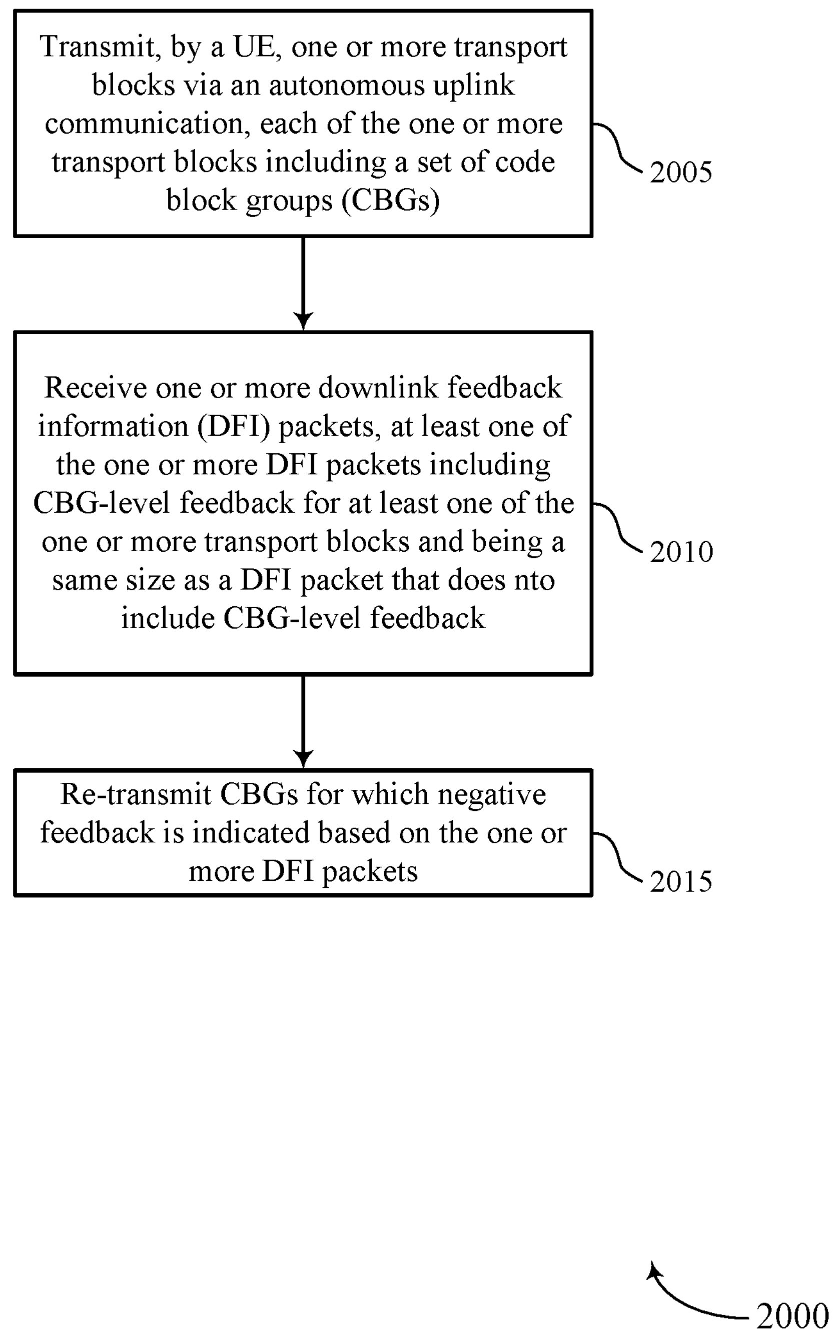
FIGS. 20 through 26 show flowcharts illustrating methods that support code block group-based autonomous uplink transmission in accordance with aspects of the present disclosure.

FIG. 20 shows a flowchart illustrating a method 2000 that supports code block group-based autonomous uplink transmission in accordance with aspects of the present disclosure. The operations of method 2000 may be implemented by a UE 115 or its components as described herein. For example, the operations of method 2000 may be performed by a communications manager as described with reference to FIGS. 12 through 15. In some examples, a UE may execute a set of instructions to control the functional elements of the UE to perform the functions described below. Additionally or alternatively, a UE may perform aspects of the functions described below using special-purpose hardware.

At 2005, the UE may transmit one or more transport blocks via an autonomous uplink communication, each of the one or more transport blocks including a set of code block groups (CBGs). The operations of 2005 may be performed according to the methods described herein. In some examples, aspects of the operations of 2005 may be performed by a transport block scheduler as described with reference to FIGS. 12 through 15.

At 2010, the UE may receive one or more downlink feedback information (DFI) packets, at least one of the one or more DFI packets including CBG-level feedback for at least one of the one or more transport blocks and being a same size as a DFI packet that does not include CBG-level feedback. The operations of 2010 may be performed according to the methods described herein. In some examples, aspects of the operations of 2010 may be performed by a DFI processor as described with reference to FIGS. 12 through 15.

At 2015, the UE may re-transmit CBGs for which negative feedback is indicated based on the one or more DFI packets. The operations of 2015 may be performed according to the methods described herein. In some examples, aspects of the operations of 2015 may be performed by a CBG retransmission scheduler as described with reference to FIGS. 12 through 15.

Figure 21:
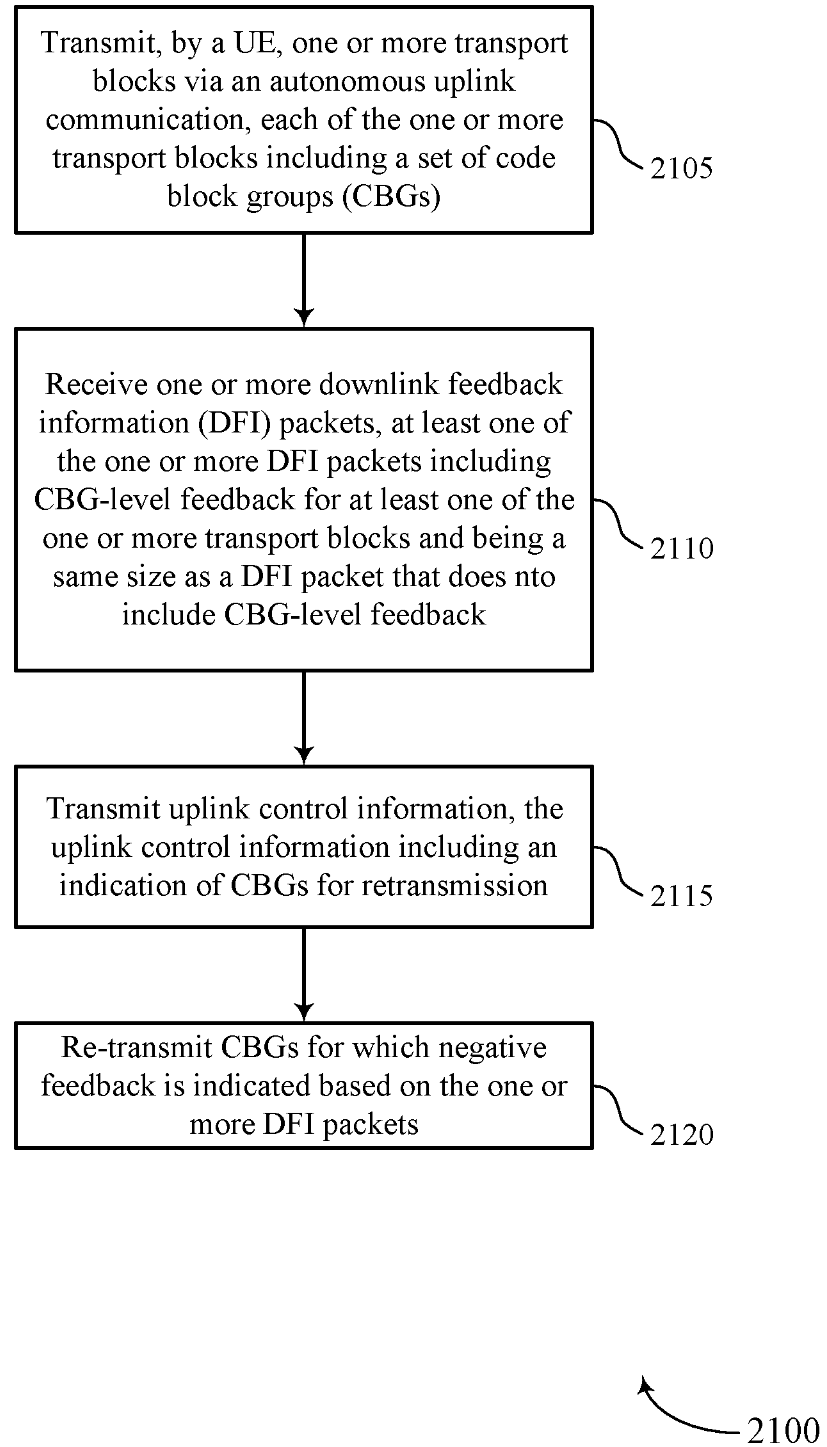

FIG. 21 shows a flowchart illustrating a method 2100 that supports code block group-based autonomous uplink transmission in accordance with aspects of the present disclosure. The operations of method 2100 may be implemented by a UE 115 or its components as described herein. For example, the operations of method 2100 may be performed by a communications manager as described with reference to FIGS. 12 through 15. In some examples, a UE may execute a set of instructions to control the functional elements of the UE to perform the functions described below. Additionally or alternatively, a UE may perform aspects of the functions described below using special-purpose hardware.

At 2105, the UE may transmit one or more transport blocks via an autonomous uplink communication, each of the one or more transport blocks including a set of code block groups (CBGs). The operations of 2105 may be performed according to the methods described herein. In some examples, aspects of the operations of 2105 may be performed by a transport block scheduler as described with reference to FIGS. 12 through 15.

At 2110, the UE may receive one or more downlink feedback information (DFI) packets, at least one of the one or more DFI packets including CBG-level feedback for at least one of the one or more transport blocks and being a same size as a DFI packet that does not include CBG-level feedback. The operations of 2110 may be performed according to the methods described herein. In some examples, aspects of the operations of 2110 may be performed by a DFI processor as described with reference to FIGS. 12 through 15.

At 2115, the UE may transmit uplink control information, the uplink control information including an indication of CBGs for retransmission. The operations of 2115 may be performed according to the methods described herein. In some examples, aspects of the operations of 2115 may be performed by an UCI scheduler as described with reference to FIGS. 12 through 15.

At 2120, the UE may re-transmit CBGs for which negative feedback is indicated based on the one or more DFI packets. The operations of 2120 may be performed according to the methods described herein. In some examples, aspects of the operations of 2120 may be performed by a CBG retransmission scheduler as described with reference to FIGS. 12 through 15.

Figure 22:
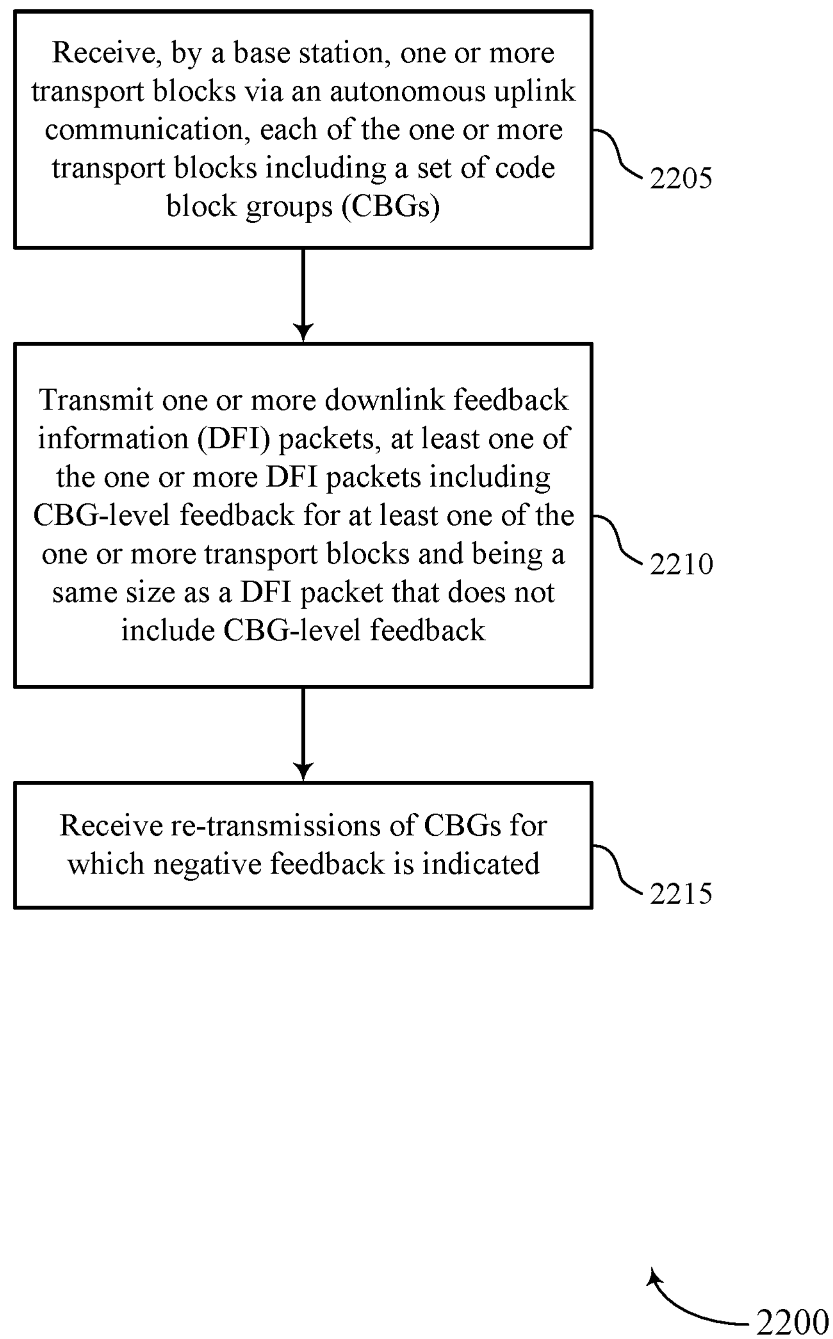

FIG. 22 shows a flowchart illustrating a method 2200 that supports code block group-based autonomous uplink transmission in accordance with aspects of the present disclosure. The operations of method 2200 may be implemented by a base station 105 or its components as described herein. For example, the operations of method 2200 may be performed by a communications manager as described with reference to FIGS. 16 through 19. In some examples, a base station may execute a set of instructions to control the functional elements of the base station to perform the functions described below. Additionally or alternatively, a base station may perform aspects of the functions described below using special-purpose hardware.

At 2205, the base station may receive one or more transport blocks via an autonomous uplink communication, each of the one or more transport blocks including a set of code block groups (CBGs). The operations of 2205 may be performed according to the methods described herein. In some examples, aspects of the operations of 2205 may be performed by a transport block processor as described with reference to FIGS. 16 through 19.

At 2210, the base station may transmit one or more downlink feedback information (DFI) packets, at least one of the one or more DFI packets including CBG-level feedback for at least one of the one or more transport blocks and being a same size as a DFI packet that does not include CBG-level feedback. The operations of 2210 may be performed according to the methods described herein. In some examples, aspects of the operations of 2210 may be performed by a DFI scheduler as described with reference to FIGS. 16 through 19.

At 2215, the base station may receive re-transmissions of CBGs for which negative feedback is indicated. The operations of 2215 may be performed according to the methods described herein. In some examples, aspects of the operations of 2215 may be performed by a CBG retransmission processor as described with reference to FIGS. 16 through 19.

Figure 23:
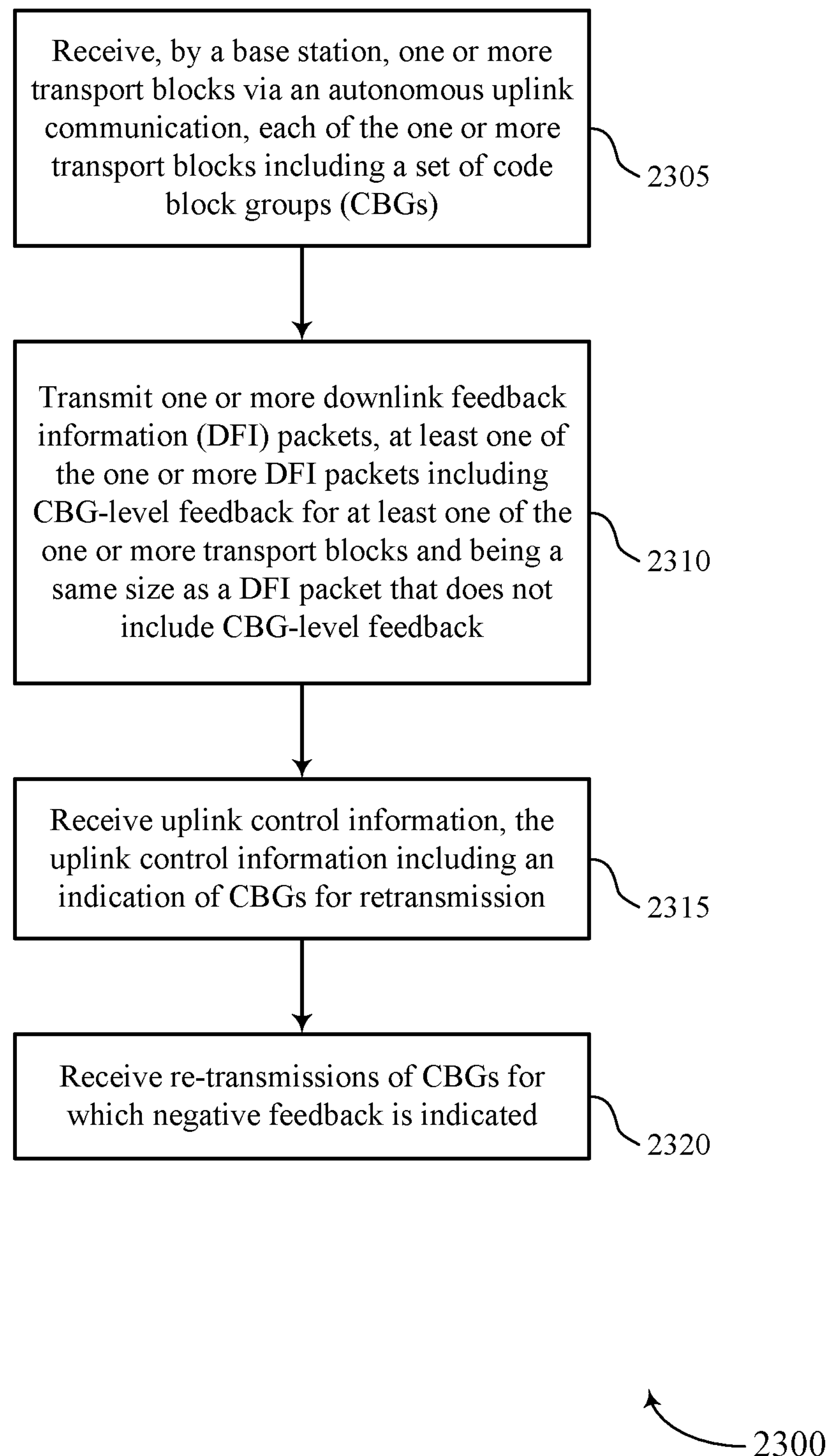

FIG. 23 shows a flowchart illustrating a method 2300 that supports code block group-based autonomous uplink transmission in accordance with aspects of the present disclosure. The operations of method 2300 may be implemented by a base station 105 or its components as described herein. For example, the operations of method 2300 may be performed by a communications manager as described with reference to FIGS. 16 through 19. In some examples, a base station may execute a set of instructions to control the functional elements of the base station to perform the functions described below. Additionally or alternatively, a base station may perform aspects of the functions described below using special-purpose hardware.

At 2305, the base station may receive one or more transport blocks via an autonomous uplink communication, each of the one or more transport blocks including a set of code block groups (CBGs). The operations of 2305 may be performed according to the methods described herein. In some examples, aspects of the operations of 2305 may be performed by a transport block processor as described with reference to FIGS. 16 through 19.

At 2310, the base station may transmit one or more downlink feedback information (DFI) packets, at least one of the one or more DFI packets including CBG-level feedback for at least one of the one or more transport blocks and being a same size as a DFI packet that does not include CBG-level feedback. The operations of 2310 may be performed according to the methods described herein. In some examples, aspects of the operations of 2310 may be performed by a DFI scheduler as described with reference to FIGS. 16 through 19.

At 2315, the base station may receive uplink control information, the uplink control information including an indication of CBGs for retransmission. The operations of 2315 may be performed according to the methods described herein. In some examples, aspects of the operations of 2315 may be performed by an UCI processor as described with reference to FIGS. 16 through 19.

At 2320, the base station may receive re-transmissions of CBGs for which negative feedback is indicated. The operations of 2320 may be performed according to the methods described herein. In some examples, aspects of the operations of 2320 may be performed by a CBG retransmission processor as described with reference to FIGS. 16 through 19.

Figure 24:
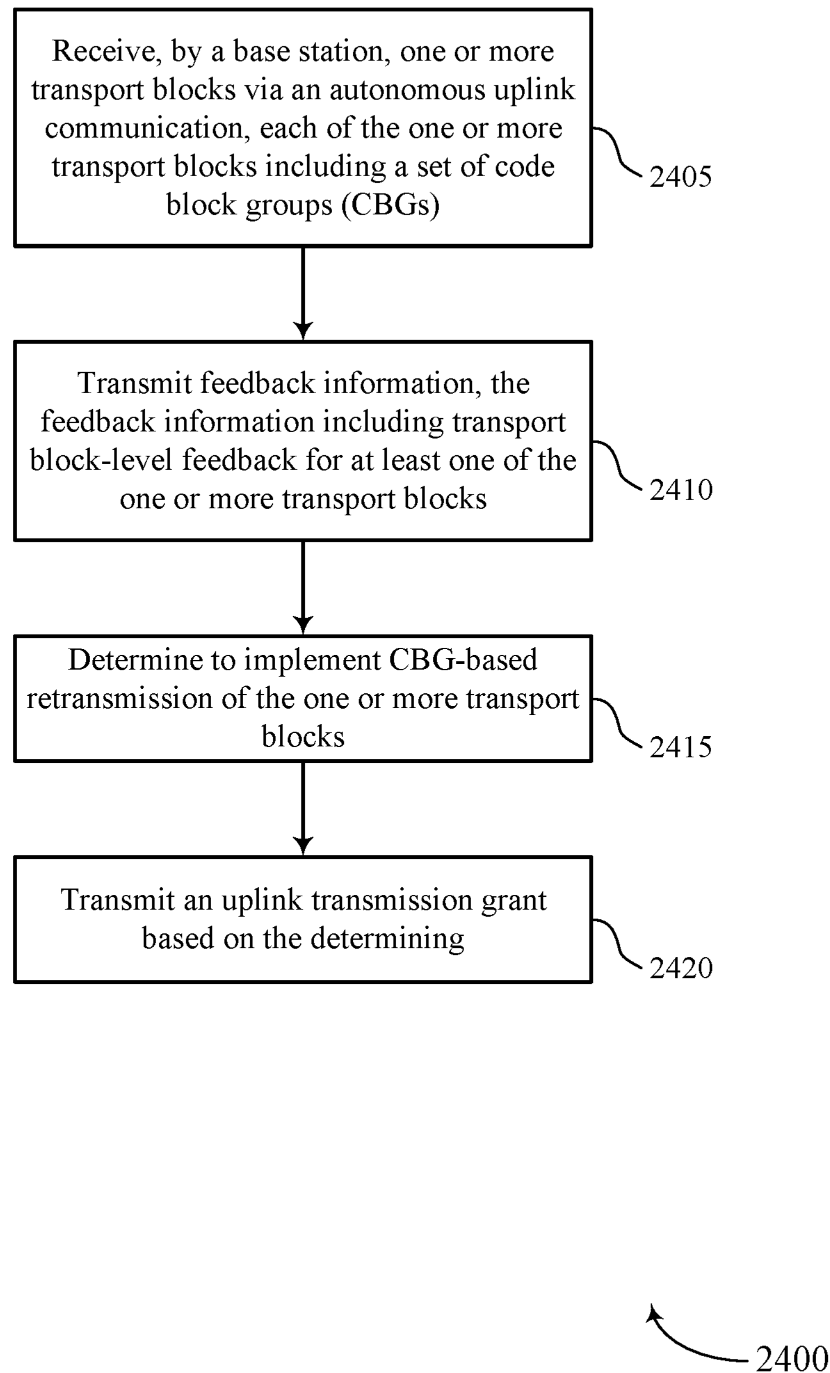

FIG. 24 shows a flowchart illustrating a method 2400 that supports code block group-based autonomous uplink transmission in accordance with aspects of the present disclosure. The operations of method 2400 may be implemented by a base station 105 or its components as described herein. For example, the operations of method 2400 may be performed by a communications manager as described with reference to FIGS. 16 through 19. In some examples, a base station may execute a set of instructions to control the functional elements of the base station to perform the functions described below. Additionally or alternatively, a base station may perform aspects of the functions described below using special-purpose hardware.

At 2405, the base station may receive one or more transport blocks via an autonomous uplink communication, each of the one or more transport blocks including a set of code block groups (CBGs). The operations of 2405 may be performed according to the methods described herein. In some examples, aspects of the operations of 2405 may be performed by a transport block processor as described with reference to FIGS. 16 through 19.

At 2410, the base station may transmit feedback information, the feedback information including transport block-level feedback for at least one of the one or more transport blocks. The operations of 2410 may be performed according to the methods described herein. In some examples, aspects of the operations of 2410 may be performed by a DFI scheduler as described with reference to FIGS. 16 through 19.

At 2415, the base station may determine to implement CBG-based retransmission of the one or more transport blocks. For example, the base station may determine whether to implement CBG-based retransmission of prior AUL transmissions using SUL. The operations of 2415 may be performed according to the methods described herein. In some examples, aspects of the operations of 2415 may be performed by a CBG-level determination unit as described with reference to FIGS. 16 through 19.

At 2420, the base station may transmit an uplink transmission grant based on the determining. The operations of 2420 may be performed according to the methods described herein. In some examples, aspects of the operations of 2420 may be performed by an uplink transmission grant scheduler as described with reference to FIGS. 16 through 19.

Figure 25:
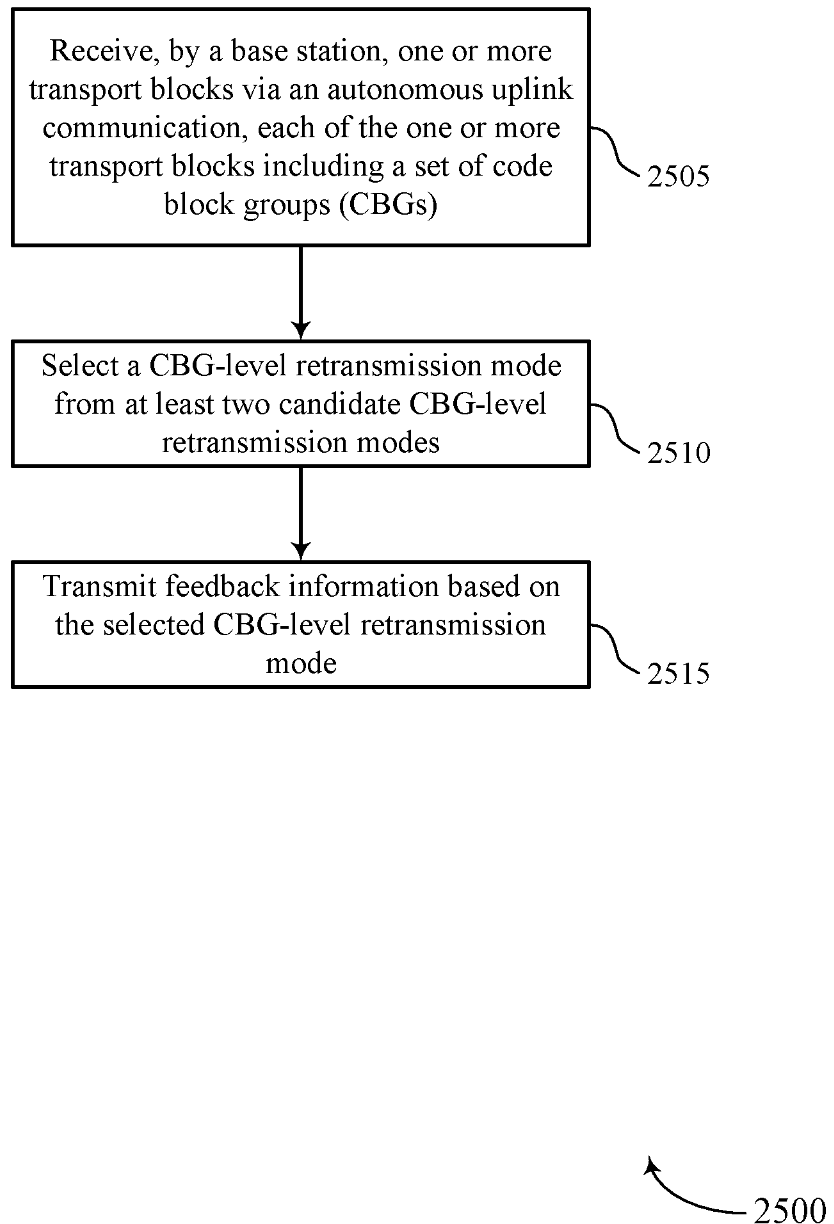

FIG. 25 shows a flowchart illustrating a method 2500 that supports code block group-based autonomous uplink transmission in accordance with aspects of the present disclosure. The operations of method 2500 may be implemented by a base station 105 or its components as described herein. For example, the operations of method 2500 may be performed by a communications manager as described with reference to FIGS. 16 through 19. In some examples, a base station may execute a set of instructions to control the functional elements of the base station to perform the functions described below. Additionally or alternatively, a base station may perform aspects of the functions described below using special-purpose hardware.

At 2505, the base station may receive one or more transport blocks via an autonomous uplink communication, each of the one or more transport blocks including a set of code block groups (CBGs). The operations of 2505 may be performed according to the methods described herein. In some examples, aspects of the operations of 2505 may be performed by a transport block processor as described with reference to FIGS. 16 through 19.

At 2510, the base station may select a CBG-level retransmission mode from at least two candidate CBG-level retransmission modes. The operations of 2510 may be performed according to the methods described herein. In some examples, aspects of the operations of 2510 may be performed by a retransmission mode determination unit as described with reference to FIGS. 16 through 19.

At 2515, the base station may transmit feedback information based on the selected CBG-level retransmission mode. The operations of 2515 may be performed according to the methods described herein. In some examples, aspects of the operations of 2515 may be performed by a feedback information scheduler as described with reference to FIGS. 16 through 19.

Figure 26:
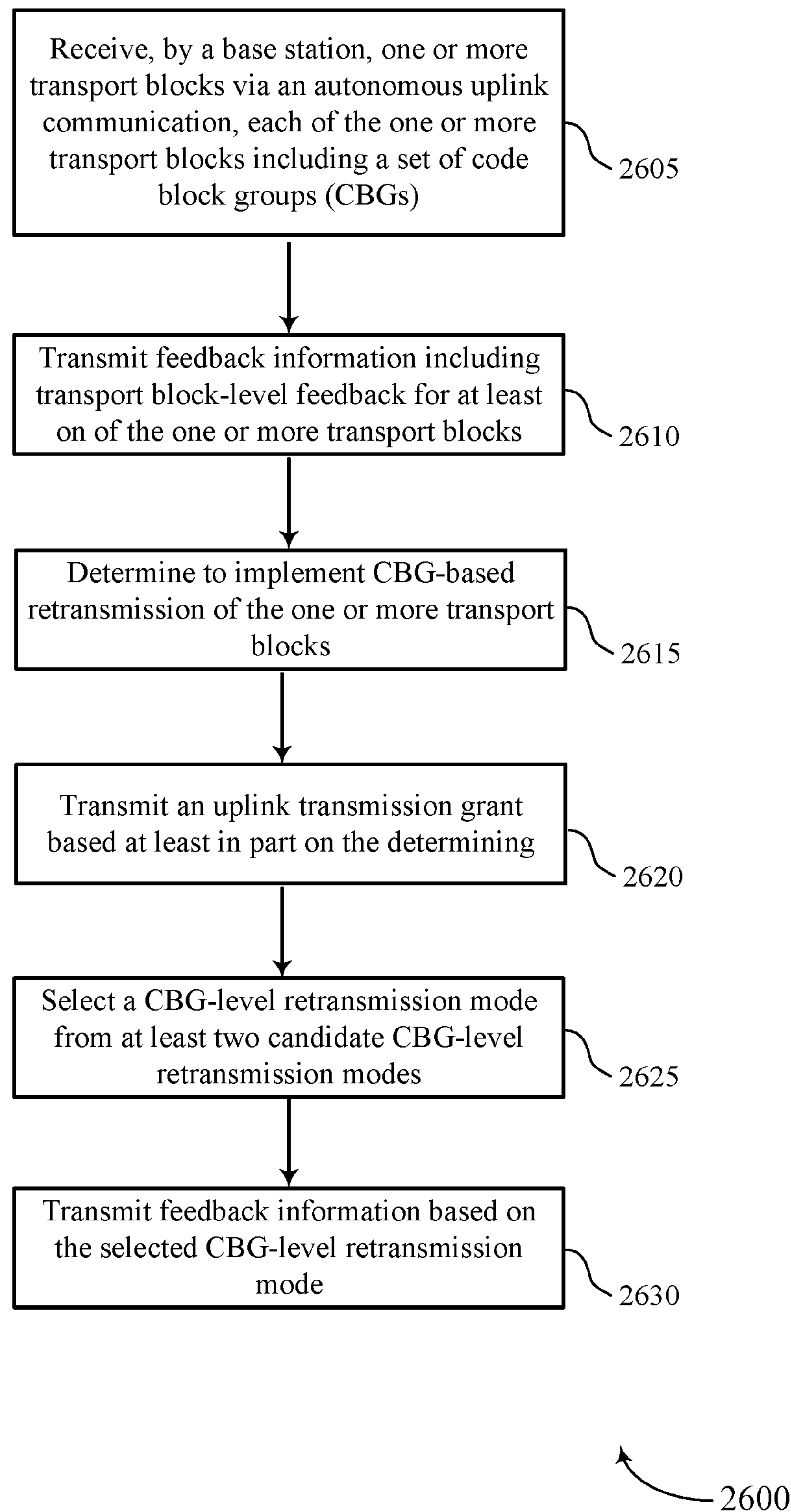

FIG. 26 shows a flowchart illustrating a method 2600 that supports code block group-based autonomous uplink transmission in accordance with aspects of the present disclosure. The operations of method 2600 may be implemented by a base station 105 or its components as described herein. For example, the operations of method 2600 may be performed by a communications manager as described with reference to FIGS. 16 through 19. In some examples, a base station may execute a set of instructions to control the functional elements of the base station to perform the functions described below. Additionally or alternatively, a base station may perform aspects of the functions described below using special-purpose hardware.

At 2605, the base station may receive one or more transport blocks via an autonomous uplink communication, each of the one or more transport blocks including a set of code block groups (CBGs). The operations of 2605 may be performed according to the methods described herein. In some examples, aspects of the operations of 2605 may be performed by a transport block processor as described with reference to FIGS. 16 through 19.

At 2610, the base station may transmit feedback information, the feedback information including transport block-level feedback for at least one of the one or more transport blocks. The operations of 2610 may be performed according to the methods described herein. In some examples, aspects of the operations of 2610 may be performed by a DFI scheduler as described with reference to FIGS. 16 through 19.

At 2615, the base station may determine to implement CBG-based retransmission of the one or more transport blocks. For example, the base station may determine whether to implement CBG-based retransmission of prior AUL transmissions using SUL. The operations of 2615 may be performed according to the methods described herein. In some examples, aspects of the operations of 2615 may be performed by a CBG-level determination unit as described with reference to FIGS. 16 through 19.

At 2620, the base station may transmit an uplink transmission grant based on the determining. The operations of 2620 may be performed according to the methods described herein. In some examples, aspects of the operations of 2620 may be performed by an uplink transmission grant scheduler as described with reference to FIGS. 16 through 19.

At 2625, the base station may select a CBG-level retransmission mode from at least two candidate CBG-level retransmission modes. The operations of 2625 may be performed according to the methods described herein. In some examples, aspects of the operations of 2625 may be performed by a retransmission mode determination unit as described with reference to FIGS. 16 through 19.

At 2630, the base station may transmit feedback information based on the selected CBG-level retransmission mode. The operations of 2630 may be performed according to the methods described herein. In some examples, aspects of the operations of 2630 may be performed by a feedback information scheduler as described with reference to FIGS. 16 through 19.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1×, 1×, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:

transmitting, by a user equipment (UE), one or more transport blocks via an autonomous uplink communication, each of the one or more transport blocks comprising a plurality of code block groups (CBGs);

receiving one or more downlink feedback information (DFI) packets, at least one of the one or more DFI packets comprising CBG-level feedback for at least one of the one or more transport blocks and being a same size as a DFI packet that does not include CBG-level feedback; and re-transmitting a quantity of CBGs associated with a transport block for which negative feedback is indicated based at least in part on the one or more DFI packets, wherein the quantity of CBGs that are retransmitted is less than a total quantity of CBGs associated with the transport block.

2. The method of claim 1, wherein receiving the one or more DFI packets comprises:

receiving a transport block-level feedback indicator for each of the one or more transport blocks, wherein at least one of the transport block-level feedback indicators indicates a negative acknowledgement for a corresponding transport block; and receiving the CBG-level feedback for the corresponding transport block.

3. The method of claim 1, wherein receiving the one or more DFI packets comprises:

receiving a first DFI packet, the first DFI packet comprising a first portion of the CBG-level feedback and an indication that a second DFI packet is to be transmitted; and receiving the second DFI packet comprising a second portion of the CBG-level feedback.

4. The method of claim 3, further comprising:

receiving the first DFI packet in a first symbol in a first slot; and receiving the second DFI packet in a second symbol in the first slot.

5. The method of claim 3, further comprising:

receiving the first DFI packet in a first slot; and receiving the second DFI packet in a second slot.

6. The method of claim 3, wherein the first portion of the CBG-level feedback includes first CBG-level feedback for a first portion of the one or more transport blocks, while the second portion of the CBG-level feedback includes second CBG-level feedback for a second portion of the one or more transport blocks.

7. The method of claim 3, wherein the second DFI packet is received a pre-specified time period after the first DFI packet.

8. The method of claim 1, further comprising:

transmitting uplink control information, the uplink control information comprising an indication of CBGs for retransmission.

9. The method of claim 8, wherein the indication of CBGs for retransmission comprises a CBG bitmap identifying CBGs to be retransmitted.

10. The method of claim 8, wherein the indication of CBGs for retransmission comprises an indication of a retransmission mode that indicates whether the UE will re-transmit negative acknowledge transport blocks or negative acknowledgement CBGs.

11. A method for wireless communication, comprising:

receiving, by a base station, one or more transport blocks via an autonomous uplink communication, each of the one or more transport blocks comprising a plurality of code block groups (CBGs);

transmitting one or more downlink feedback information (DFI) packets, at least one of the one or more DFI packets comprising CBG-level feedback for at least one of the one or more transport blocks and being a same size as a DFI packet that does not include CBG-level feedback; and receiving re-transmissions of a quantity of CBGs associated with a transport block for which negative feedback is indicated, wherein the quantity of CBGs that are received is less than a total quantity of CBGs associated with the transport block.

12. The method of claim 11, wherein transmitting the one or more DFI packets comprises:

transmitting a transport block-level feedback indicator for each of the one or more transport blocks, wherein at least one of the transport block-level feedback indicators indicates a negative acknowledgement for a corresponding transport block; and transmitting a CBG-level feedback indicator for the corresponding transport block.

13. The method of claim 11, wherein transmitting the one or more DFI packets comprises:

transmitting a first DFI packet, the first DFI packet comprising a first portion of the CBG-level feedback and an indication that a second DFI packet is to be transmitted; and transmitting the second DFI packet comprising a second portion of the CBG-level feedback.

14. The method of claim 13, further comprising:

transmitting the first DFI packet in a first symbol in a first slot; and transmitting the second DFI packet in a second symbol in the first slot.

15. The method of claim 13, further comprising:

transmitting the first DFI packet in a first slot; and transmitting the second DFI packet in a second slot.

16. The method of claim 13, wherein the first portion of the CBG-level feedback includes first CBG-level feedback for a first portion of the one or more transport blocks, and the second portion of the CBG-level feedback includes second CBG-level feedback for a second portion of the one or more transport blocks.

17. The method of claim 13, further comprising:

transmitting the second DFI packet a pre-specified time period after the first DFI packet.

18. The method of claim 11, further comprising:

receiving uplink control information, the uplink control information comprising an indication of CBGs for retransmission, wherein the indication of CBGs for retransmission comprises a CBG bitmap identifying CBGs to be retransmitted.

19. The method of claim 18, wherein the indication of CBGs for retransmission comprises an indication of a retransmission mode that indicates whether a user equipment (UE) will re-transmit negative acknowledge transport blocks or negative acknowledgement CBGs.

20. The method of claim 11, further comprising:

generating the one or more DFI packets based at least in part on an autonomous CBG configuration.

21. The method of claim 20, wherein the autonomous CBG configuration includes a same number of CBGs or fewer than a number of CBGs as are included in a CBG configuration for a scheduled uplink transmission.

22. The method of claim 20, wherein the autonomous CBG configuration includes a number of CBGs that is independent of a number of CBGs included in a CBG configuration for a scheduled uplink transmission.

23. An apparatus for wireless communication at a user equipment (UE), comprising:

a processor, memory coupled with the processor; and instructions stored in the memory and executable by the processor to cause the apparatus to:

transmit, by the UE, one or more transport blocks via an autonomous uplink communication, each of the one or more transport blocks comprising a plurality of code block groups (CBGs);

receive one or more downlink feedback information (DFI) packets, at least one of the one or more DFI packets comprising CBG-level feedback for at least one of the one or more transport blocks and being a same size as a DFI packet that does not include CBG-level feedback; and re-transmit a quantity of CBGs associated with a transport block for which negative feedback is indicated based at least in part on the one or more DFI packets, wherein the quantity of CBGs that are retransmitted is less than a total quantity of CBGs associated with the transport block.

* * * * *